US012484709B2

(12) United States Patent
Jayaraman et al.

(10) Patent No.: US 12,484,709 B2
(45) Date of Patent: Dec. 2, 2025

(54) SYSTEMS AND METHODS FOR ENHANCING COMFORT INDIVIDUALS IN CONTACT WITH SURFACES

(71) Applicant: Georgia Tech Research Corporation, Atlanta, GA (US)

(72) Inventors: Sundaresan Jayaraman, Atlanta, GA (US); Sungmee Park, Atlanta, GA (US); Kyle W. Motter, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 601 days.

(21) Appl. No.: 17/910,093

(22) PCT Filed: Mar. 11, 2021

(86) PCT No.: PCT/US2021/021997
§ 371 (c)(1),
(2) Date: Sep. 8, 2022

(87) PCT Pub. No.: WO2021/183823
PCT Pub. Date: Sep. 16, 2021

(65) Prior Publication Data
US 2023/0127818 A1 Apr. 27, 2023

Related U.S. Application Data

(60) Provisional application No. 62/988,058, filed on Mar. 11, 2020.

(51) Int. Cl.
*A47C 31/12* (2006.01)
*A47C 7/74* (2006.01)
(Continued)

(52) U.S. Cl.
CPC .......... *A47C 31/12* (2013.01); *F15B 15/1471* (2013.01); *F15B 15/1485* (2013.01);
(Continued)

(58) Field of Classification Search
CPC ......... A47C 7/744; A47C 7/748; A47C 31/12; A47C 31/123; A47C 31/126; F15B 15/1471; F15B 15/1485
See application file for complete search history.

(56) References Cited

U.S. PATENT DOCUMENTS 4,799,276 A * 1/1989 Kadish ................. A61G 7/0573
5/613
4,890,235 A * 12/1989 Reger .................. A61G 5/1043
264/222

(Continued)

FOREIGN PATENT DOCUMENTS

DE 19633318 C1 * 1/1998 ........... A47C 31/123

OTHER PUBLICATIONS

DE19633318C1 machine translation thereof (Year: 1998).*
(Continued)

*Primary Examiner* — Matthew Wiblin
(74) *Attorney, Agent, or Firm* — Meunier Carlin & Curfman LLC

(57) ABSTRACT

Described herein are devices, systems, and methods relating to making individuals comfortable when in contact with surfaces (e.g., seats and beds) including preventing pressure injuries on subjects. In embodiments, disclosed herein are pressure injury prevention systems comprising actuator assemblies that can simultaneously provide immersion and offloading of pressure while allowing a subject to retain balance. In other embodiments, moisture control devices and/or sensing networks can be used in conjunction with said actuator assemblies to prevent pressure injuries in a (Continued)

subject in need thereof. In embodiments, also described herein are computing devices and applications that alert a manual intervention or trigger an automated intervention between the individual and the intervention surface based on a risk determination. Such interventions can send instructions to the system to relieve pressure and/or moisture at one or more interface locations on the interface surface between the system and a subject according to a set of rules based on a predetermined profile, data collected continuously in real time, or both.

22 Claims, 49 Drawing Sheets

(51) Int. Cl.
    *A47C 21/04*      (2006.01)
    *F15B 15/14*      (2006.01)

(52) U.S. Cl.
    CPC .............. *A47C 7/744* (2013.01); *A47C 7/748* (2013.01); *A47C 21/044* (2013.01); *A47C 21/048* (2013.01); *A47C 31/123* (2013.01); *A47C 31/126* (2013.01); *F15B 15/1404* (2013.01)

(56) References Cited

U.S. PATENT DOCUMENTS

| | | | | |
|---|---|---|---|---|
| 5,237,501 | A * | 8/1993 | Gusakov | A61G 7/0573 |
| | | | | 600/587 |
| 5,865,089 | A * | 2/1999 | Langer | F15B 15/1471 |
| | | | | 901/22 |
| 5,930,152 | A * | 7/1999 | Dumont | B60N 2/02246 |
| | | | | 128/845 |
| 9,841,076 | B2 * | 12/2017 | Compton | G01B 7/28 |
| 2006/0054016 | A1 | 3/2006 | Davies et al. | |
| 2011/0120300 | A1 | 5/2011 | Fletcher et al. | |
| 2020/0405217 | A1 * | 12/2020 | Jayaraman | A61B 5/746 |

OTHER PUBLICATIONS

International Search Report and Written Opinion for WO 2021/183823 (PCT/US2021/021997), dated May 26, 2021, pp. 1-8.
Dinsdale S. M., Decubitus ulcers: role of pressure and friction in causation. Archives of Physical Medicine & Rehabilitation 1974; 55(4):147-152.
National Pressure Ulcer Advisory Panel, 2016, Washington, D.C.
Houghton PE, Campbell KE and CPG Panel (2013). Canadian Best Practice Guidelines for the Prevention and Management of Pressure Ulcers in People with Spinal Cord Injury: A resource handbook for Clinicians.
Lamid S, El Ghatit AZ. Smoking, spasticity and pressure sores in spinal cord injured patients. Amer Journ Phys Med 1983; 62 (6):300-306.
Crenshaw RP, Vistnes LM. A decade of pressure sore research: 1977-1987. J Rehabil Res Dev, 1989; 26:63-74.
Bogie KM, Nuseibeh I, Bader DL. Early progressive changes in tissue viability in the seated spinal cord injured subject. Paraplegia 1995; 33:141-147.
Consortium for Spinal Cord Medicine. Pressure ulcer prevention and treatment following spinal cord injury: A clinical practice guideline for health care professionals, 2000.
Byrne DW, Salzberg CA. Major risk factors for pressure ulcers in the spinal cord disabled: a literature review. Spinal Cord 1996; 34:255-263.
Centers for Medicare & Medicaid Services (CMS). Medicare program; changes to the hospital inpatient prospective payment system and fiscal year 2008 rates. Fed Register. Aug. 22, 2007; 72(162):47205.
https://hub.permobil.com/blog/offloading-vs-immersion-wheelchair-cushions-for-pressure-injuries, Last Accessed: Jun. 5, 2019.
https://www.comfortcompany.com, Last Accessed: Jun. 14, 2019.
Groah. S.L., Schalden, M., Pineda, C.G., and Hsieh, C.J., Prevention of Pressure Ulcers among People with Spinal Cord Injury: A Systematic Review, PM&R, vol. 7, #6, 2015, pp. 613-636.
Hobson D. A., Comparative effects of posture on pressure and shear at the body-seat interface. Journal of Rehabilitation Research & Development 1992; 29(4):21-31.
Jan, Y.K., Brienza, D., Tissue mechanics and blood flow factors in pressure ulcers of people with spinal cord injury. In: Gefen, A., editor. The Pathomechanics of Tissue Injury and Disease, and the Mechanophysiology of Healing: Research Signpost. 2009. p. 241-259.
Zhang M., Roberts V.C., The effect of shear forces externally applied to skin surface on underlying tissues. Journal of Biomedical Engineering 1993; 15(6):451-456.

* cited by examiner

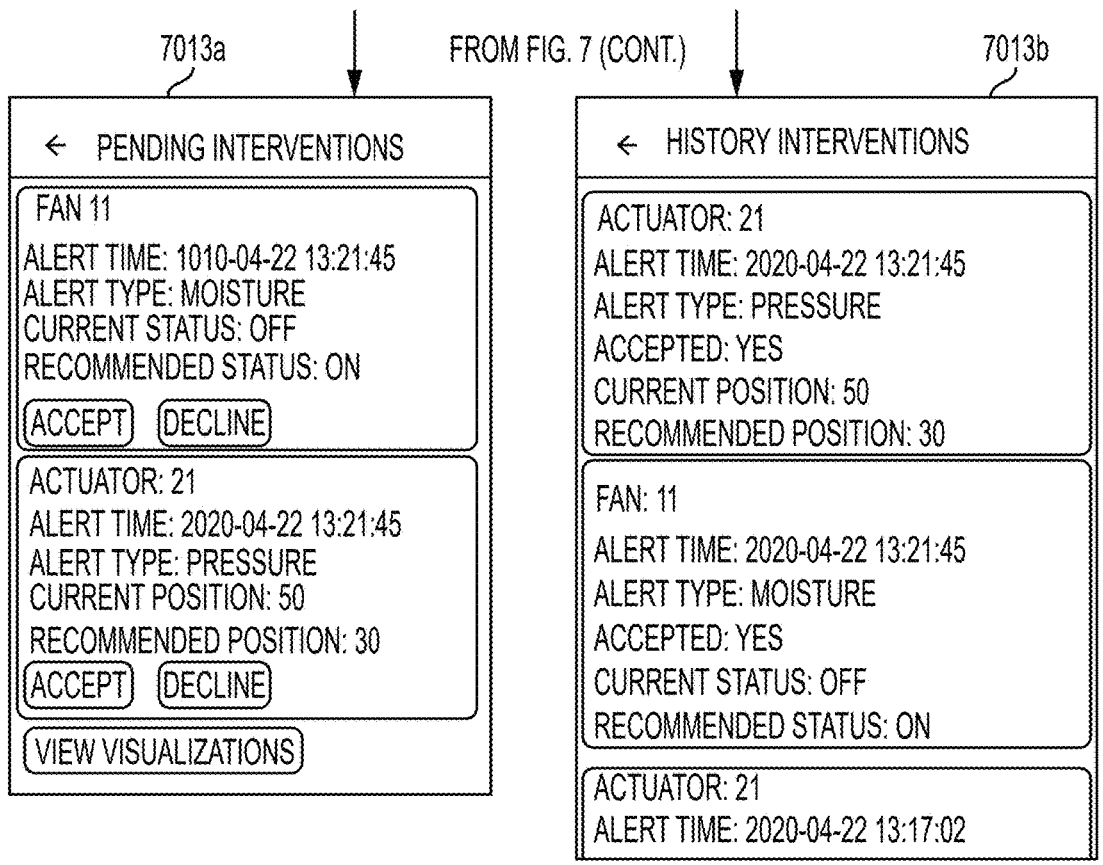
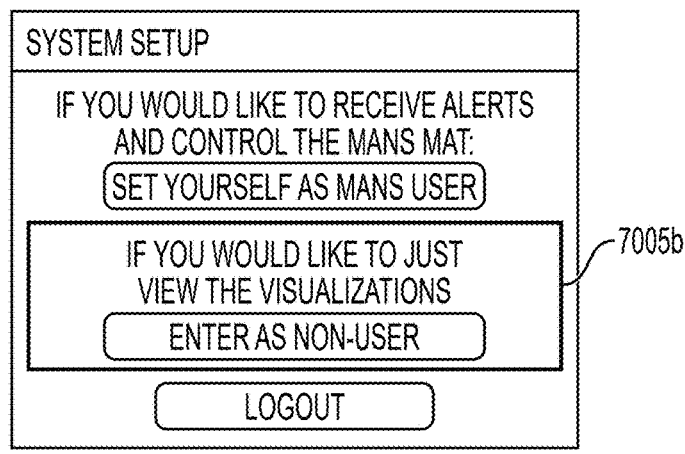
FIG. 7 (CONT.1)

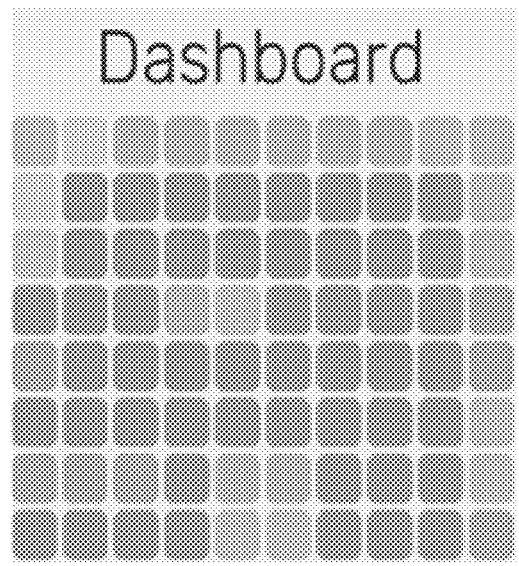
FIG. 22B
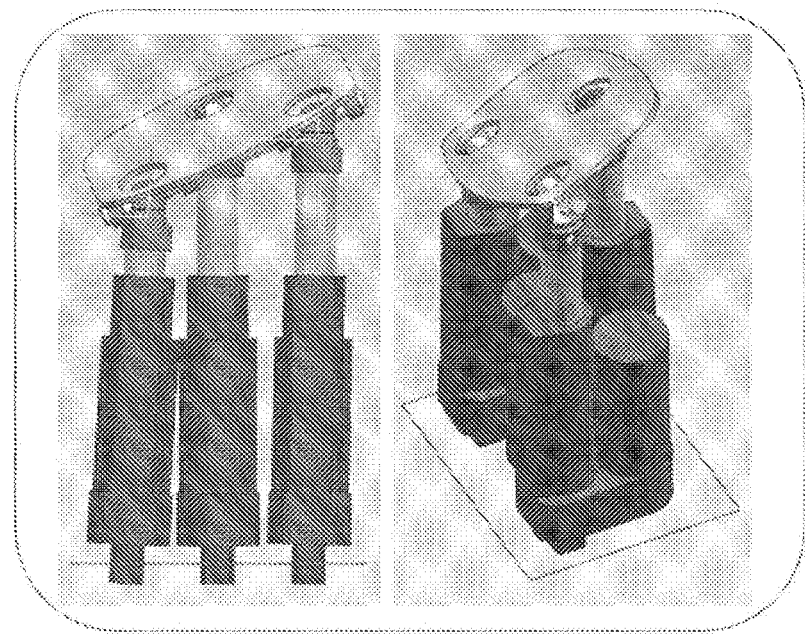
FIG. 23A          FIG. 23B

FIG. 24A
FIG. 24B
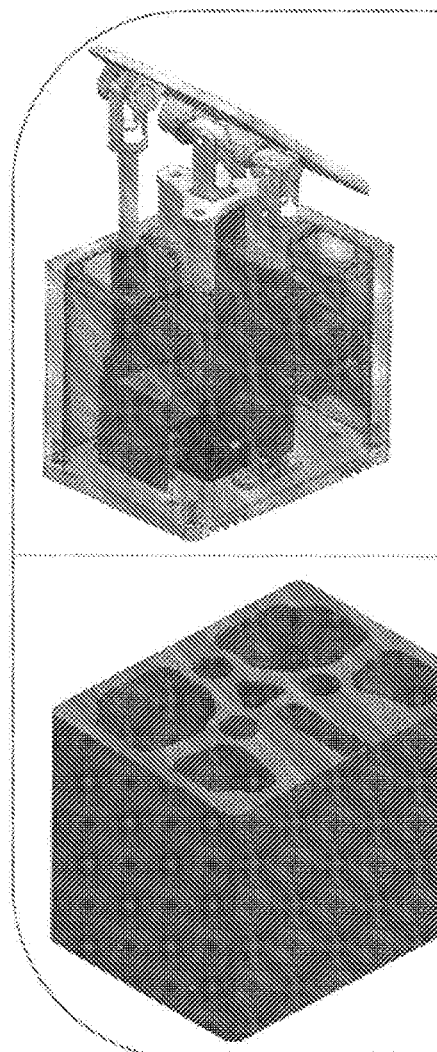
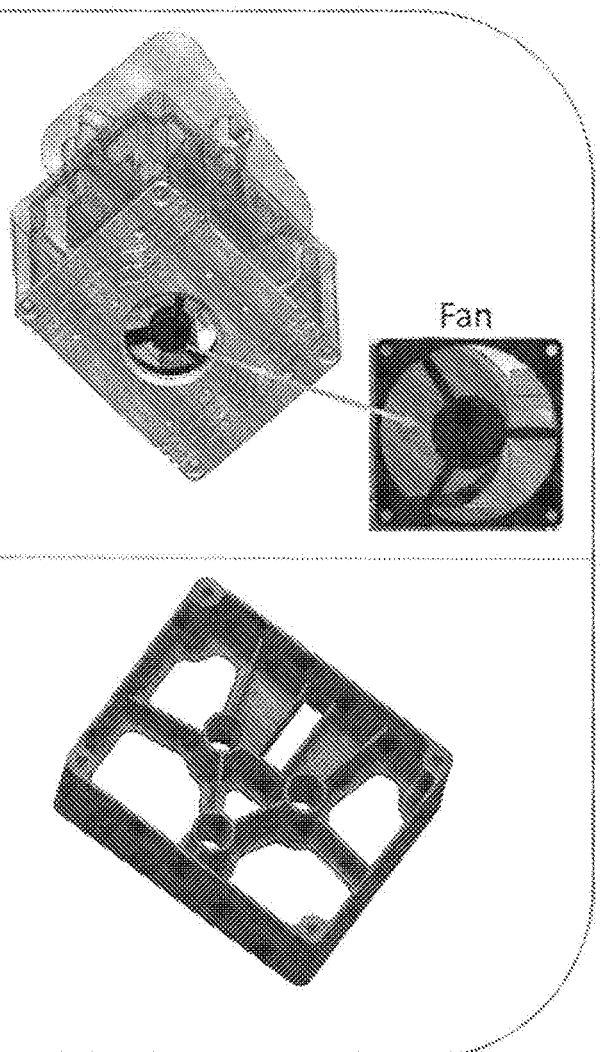
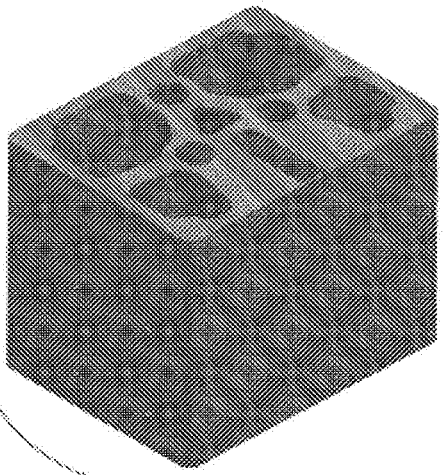
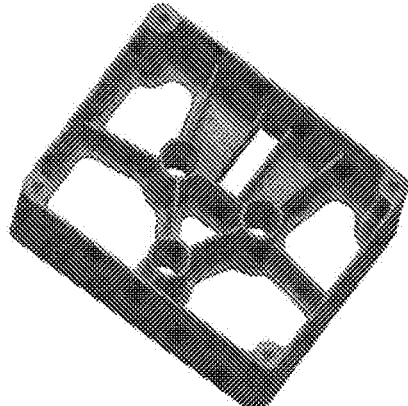
FIG. 24C
FIG. 24D

SYSTEMS AND METHODS FOR ENHANCING COMFORT INDIVIDUALS IN CONTACT WITH SURFACES

CROSS-REFERENCE TO RELATED APPLICATIONS

This application is the National Stage of International Application No. PCT/US2021/021997, filed Mar. 11, 2021, which claims priority to U.S. 62/988,058, filed Mar. 11, 2020, which are entirely incorporated herein by reference.

TECHNICAL FIELD

The present disclosure generally relates to systems and methods for relieving pressure and/or moisture under an individual's surface contact point (e.g., with bed, cribs, wheelchairs, office chairs, automobile seats) to enhance comfort and/or reduce the risk of pressure injury, deep-vein thrombosis (DVT), back pain, and other symptoms and injuries associated with surface contact injuries, in particular pressure injuries.

BACKGROUND

Pressure injuries (also referred to herein as pressure ulcers), DVT, and back pain are injuries and/or symptoms associated with surface contact injuries that result from prolonged surface contact of an individual with a surface. Pressure injuries in particular are high-cost adverse events across the spectrum of healthcare settings and populations including spinal cord injury (SCI) individuals and pediatric care. Conventional techniques for mitigating the effects of surface contact injuries (for example controlling pressure ulcers) involve envelopment and immersion into cushions, offloading pressure, and turning or repositioning an individual on a periodic basis. These techniques are not always feasible depending on the circumstances of the individual. Additionally, such techniques can be costly and can negatively impact an individual's quality of life for individuals that are immobilized in one way or another. Therefore, there is a need for systems and methods that can detect, predict, alleviate or slow the formation and/or prevent pressure injuries.

SUMMARY

Disclosed herein are pressure injury (aka pressure ulcer) prediction, alleviation prevention systems, and/or intervention systems and methods to address the aforementioned deficiencies.

Described herein are actuation systems that can be used in pressure injury prevention systems. In embodiments of actuation systems described herein, an actuation system, comprises: one or more actuator assemblies, wherein each of the one or more actuator assemblies comprises: an actuator; an actuator head; and a piston tubing operably connected to the actuator or actuator head wherein a space exists between the actuator body and the piston tubing.

In embodiments of actuation systems described herein, each actuator of the one or more actuator assemblies can be independently configured as pneumatic actuators, hydraulic actuators, mechanical actuators or a combination thereof. In embodiments of actuation systems described herein, each actuator of the one or more actuator assemblies can be linear actuators. In embodiments of actuation systems described herein, the piston tubing encircles a body of the actuator and operably connects to the actuator head, wherein the piston tubing does not extend a longest dimension of the longitudinal axis of the actuator.

In embodiments of actuation systems described herein, the actuator head has a plurality of apertures in an outermost surface of the actuator head opposite the actuator body. In embodiments of actuation systems described herein, the plurality of apertures can be configured to pass air moving along the axis of extension of the one or more actuators outwardly from and inwardly into the housing. In embodiments of actuation systems described herein, the actuator head further has a plurality of channels extending across an outer surface of the actuator head and orthogonal to a longitudinal axis of the actuator body, wherein each of the plurality of channels fluidically connects two or more apertures. In embodiments of actuation systems described herein, the plurality of channels have a cross-section that is concave inwardly from the outer surface of the actuator head along a longitudinal axis of the channels.

In embodiments of actuation systems described herein, the channels extend across any width of the actuator head along an axis orthogonal to the axis of extension of the actuator, and can be configured to pass air across and away from the actuator head along an axis orthogonal to the axis of extension.

In embodiments of actuation systems described herein, each of the one or more actuator heads is wider than a cross-section of the actuator body taken along an axis orthogonal to a longitudinal axis of the actuator body. In embodiments of actuation systems described herein, actuator head is fixed in position in relation to the actuator body or is pivotally connected to the actuator body.

In embodiments of actuation systems described herein, actuator systems further comprise an actuator assembly housing, wherein the actuator assembly housing is configured to contain the one or more actuator assemblies and has one or more apertures configured to secure the piston tubing of the one or more aperture assemblies. In embodiments of actuation systems described herein, the one or more actuators can be configured to, at least in part, extend along an axis outwardly from the housing and retract inwardly into the housing. In embodiments of actuation systems described herein, each of the one or more actuators has a length and the actuator is configured, at least in part, to extend outwardly from and retract inwardly into the housing longitudinally along its length.

In embodiments of actuation systems described herein, actuation systems according to the present disclosure further comprise one or more moisture control devices. In embodiments of actuation systems described herein, the moisture control device comprises one or more heating coils, a thermoelectric element, or a fan. In embodiments of actuation systems described herein, the moisture control device is a fan secured to a side of the actuator assembly housing opposite the actuator heads. In embodiments of actuation systems described herein, the fan is configured to move air through each of the spaces between each of the actuators and the piston tubings of the one or more actuator assemblies. In embodiments of actuation systems described herein, the actuation system comprises an array of actuator assemblies.

Described herein are intervention systems, which can be pressure injury intervention systems. In embodiments of intervention systems described herein, an intervention system, comprises one or more actuator systems as described herein; and a computing device.

In embodiments of intervention systems described herein, intervention systems further comprise one or more sets of actuation instructions. In embodiments of intervention systems described herein, intervention systems further comprise logic that, when executed on the computing device, receives pressure data, moisture data, or both, from the intervention system. In embodiments of intervention systems described herein, the logic, when executed on the computing device, transmits the actuation instructions to the actuation system. In embodiments of intervention systems described herein, the one or more actuation systems comprises an array of actuator assemblies. In embodiments of intervention systems described herein, the array of actuator assemblies is a 6×6 array of actuator assemblies.

In embodiments of intervention systems described herein, the computing device is configured to provide actuation instructions to the actuator system, the instructions including instructions to extend or retract, at least in part, one or more of the actuators, operate one or more of the moisture control devices, or both.

In embodiments of intervention systems described herein, intervention systems as described herein further comprise a sensor network configured to receive pressure data from the intervention surface, moisture data from the intervention surface, or both. In embodiments of intervention systems described herein, the sensor network provides the pressure data, the moisture data, or both, to the computing system. In embodiments of intervention systems described herein, the sensor network is a fabric-based sensor network. In embodiments of intervention systems described herein, intervention systems as described herein further comprise an intervention surface in contact with each of the one or more actuator heads. In embodiments of intervention systems described herein, the intervention surface comprises one or more interface points, or one or more interface areas, where in the interface area can comprise one or more interface points within the interface area.

In embodiments of intervention systems described herein, the intervention surface is configured as a seat or a mattress of a bed, crib, bassinet, wheelchair, office chair, a seat in a personal or commercial passenger transportation vehicle.

In embodiments of intervention systems described herein, the computing device is configured to receive computing instructions from a user, the sensor network, or both.

Described herein are methods of preventing pressure injury or ulcer in a subject in need thereof, comprising: providing an intervention system according to the present disclosure; executing the instructions of the intervention system; actuating the one or more actuators of the one or more actuator assemblies based on the provided instructions. In embodiments of methods as described herein, methods as described herein further comprise operating the one or more moisture control devices based on the provided instructions.

In embodiments of methods as described herein, methods as described herein further comprise receiving pressure data from the sensor network, moisture data from the sensor network, or both. In embodiments of methods as described herein, methods as described herein further comprise comparing the received pressure data, moisture data, or both, to a set of pre-determined threshold values. In embodiments of methods as described herein, methods as described herein further comprise generating an alert if the compared pressure data, moisture data, or both, exceed the pre-determined threshold. In embodiments of methods as described herein, the intervention instructions can be provided based on the alert. In embodiments of methods as described herein, the instructions of the intervention system comprise instructions to actuate one or more of the actuators of the one or more actuator systems, instructions to operate the one or more moisture control devices of the one or more actuator systems, or both. In embodiments of methods as described herein, the instructions can be generated by a user. In embodiments of methods as described herein, the instructions can be generated by the subject in need thereof. In embodiments of methods as described herein, the instructions can be determined based on real-time pressure readings from the sensor network, real-time moisture readings from the sensor network, or both. In embodiments of methods as described herein, the instructions can be determined based on continuous real-time pressure readings from the sensor network, continuous real-time moisture readings from the sensor network, or both. In embodiments of methods as described herein, the instructions can be determined based on a pre-determined profile according to a load on the intervention system of the subject in need thereof. In embodiments of methods as described herein, the methods further comprise adjusting the instructions after execution by a user or by the subject in need thereof. In embodiments of methods as described herein, the subject in need thereof is an infant, an airline passenger, a commercial truck driver, a subject working at a desk, or an individual who has sustained an injury. In embodiments of methods as described herein, the subject in need thereof is an individual who has sustained a spinal cord injury.

Other systems, methods, features, and advantages of the present disclosure for a pressure ulcer system, will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 4B depicts an embodiment of a user interface showing an intensity based on pressure rendered in a 12×24 grid

FIGS. 22A-22B shows a reduced to practice of testing system and informal testing of the system. FIG. 22A shows a subject sitting on a prototype of the fabric-based sensor network as described herein and FIG. 22B shows an embodiment of a visualization of pressure distribution in the application.

FIGS. 23A-23B show an embodiment of an actuation assembly controlling the intervention surface according to the present disclosure.

FIGS. 24A-24D show an embodiment of an actuation system according to the present disclosure.

FIG. 39A shows at start when the actuator assembly is up at the 50 mm position. FIG. 39B is when two of the actuator assemblies are selected to be down at the 30 mm position and the rest of the actuator assemblies remaining up at the 50 mm position.

FIGS. 40A-40L are snapshots of an embodiment of a MANS application according to the present disclosure. According to the embodiment shown, the application is configured as a mobile application for a smartphone or tablet.

DETAILED DESCRIPTION

Figure 1:
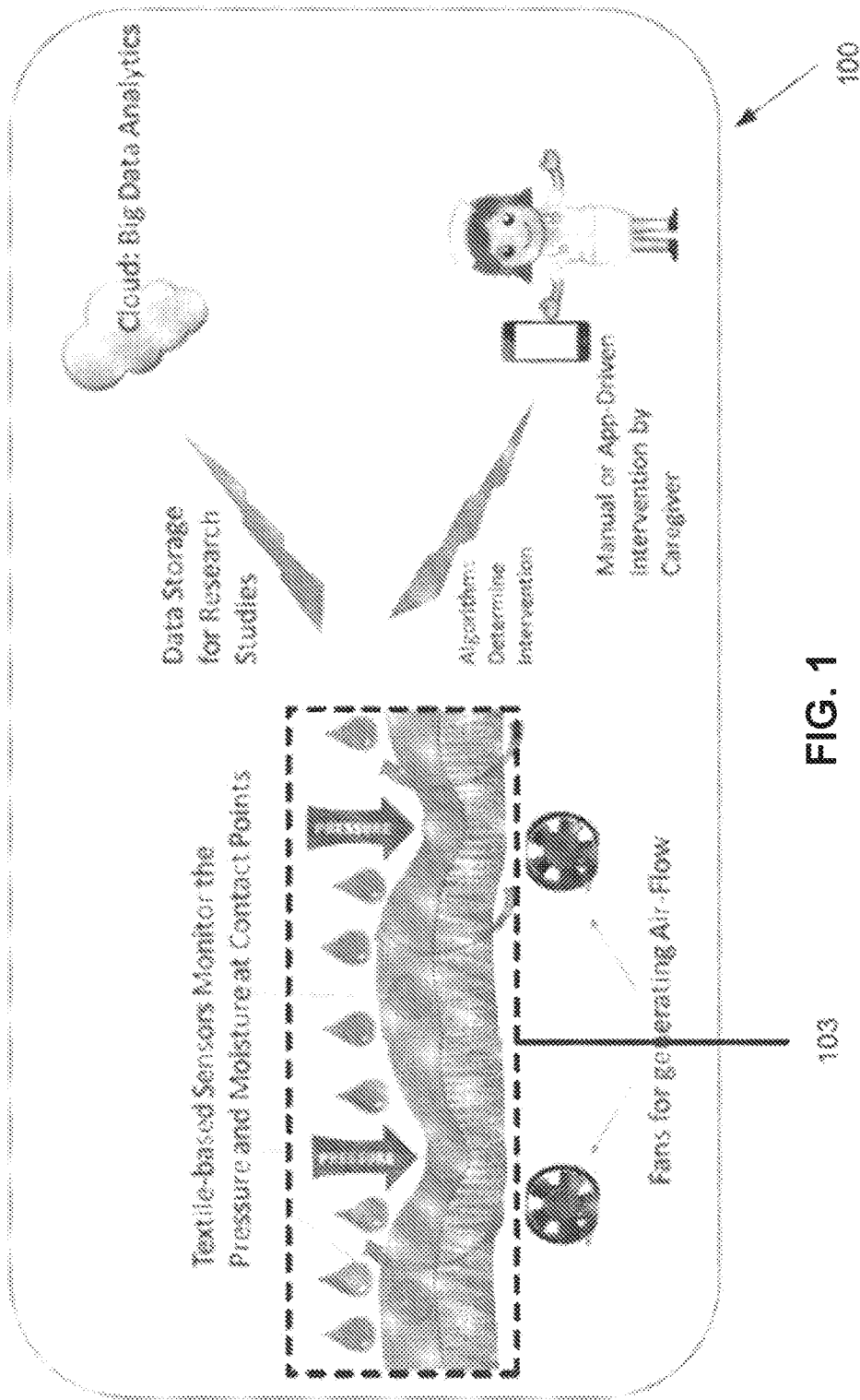
FIG. 1 depicts an embodiment of a prevention system having an optional unit cell of a fabric-based sensor of a fabric-based sensor network of the present disclosure.

The current disclosure is directed to systems and methods relieving pressure and moisture under an individual's surface contact point (e.g., with bed, cribs, wheelchairs, office chairs, automobile seats) and reduce the risk of pressure injury, DVT, back pain and enhancing comfort. In an embodiment, the system (also called GT-IntSys) can be triggered either manually by the user or the intervention can be triggered automatically by the system. In embodiments, the system can be optionally interfaced with a fabric-based sensor network to determine the pressure and moisture distribution to trigger the intervention through the set of actuator assemblies and fans comprising the system.

Described below are various embodiments of aspects of a pressure injury (aka pressure ulcer) prevention system, systems themselves, and methods of use. Although particular embodiments are described, those embodiments are mere exemplary implementations of the system, method, and non-transitory computer-readable medium. One skilled in the art will recognize other embodiments are possible. All such embodiments are intended to fall within the scope of this disclosure. Moreover, all references cited herein are intended to be and are hereby incorporated by reference into this disclosure as if fully set forth herein. While the disclosure will now be described in reference to the above drawings, there is no intent to limit it to the embodiment or embodiments disclosed herein. On the contrary, the intent is to cover all alternatives, modifications and equivalents included within the spirit and scope of the disclosure.

Before the present disclosure is described in greater detail, it is to be understood that this disclosure is not limited to particular embodiments described, as such may, of course, vary. It is also to be understood that the terminology used herein is for the purpose of describing particular embodiments only and is not intended to be limiting.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are incorporated by reference as if each individual publication or patent were specifically and individually indicated to be incorporated by reference and are incorporated by reference to disclose and describe the methods and/or materials in connection with which the publications are cited. The citation of any publication is for its disclosure prior to the filing date and should not be construed as an admission that the present disclosure is not entitled to antedate such publication by prior disclosure. Further, the dates of publication provided could differ from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments and aspects without departing from the scope or spirit of the present disclosure. Any recited method can be carried out in the order of events recited or in any other order logically possible.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, lengths, etc.), but some errors and deviations should be accounted for.

It is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

DISCUSSION

Background

Pressure injuries (aka pressure ulcers) have been defined as a "localized damage to the skin and/or underlying soft tissue usually over a bony prominence or related to a medical or other device. The injury can present as intact skin or an open ulcer and may be painful. The injury occurs as a result of intense and/or prolonged pressure or pressure in combination with shear. The tolerance of soft tissue for pressure and shear may also be affected by microclimate, nutrition, perfusion, co-morbidities and condition of the soft tissue" [1].

The primary cause of pressure injuries (aka pressure ulcers) is externally applied pressure for a prolonged period of time over bony prominences such as the sacrum and ischial tuberosities [2]. FIGS. 10A-10D show the major locations of pressure injuries (aka pressure ulcers) in an individual with SCI seated in a wheelchair and when lying down, respectively.

Figure 11:
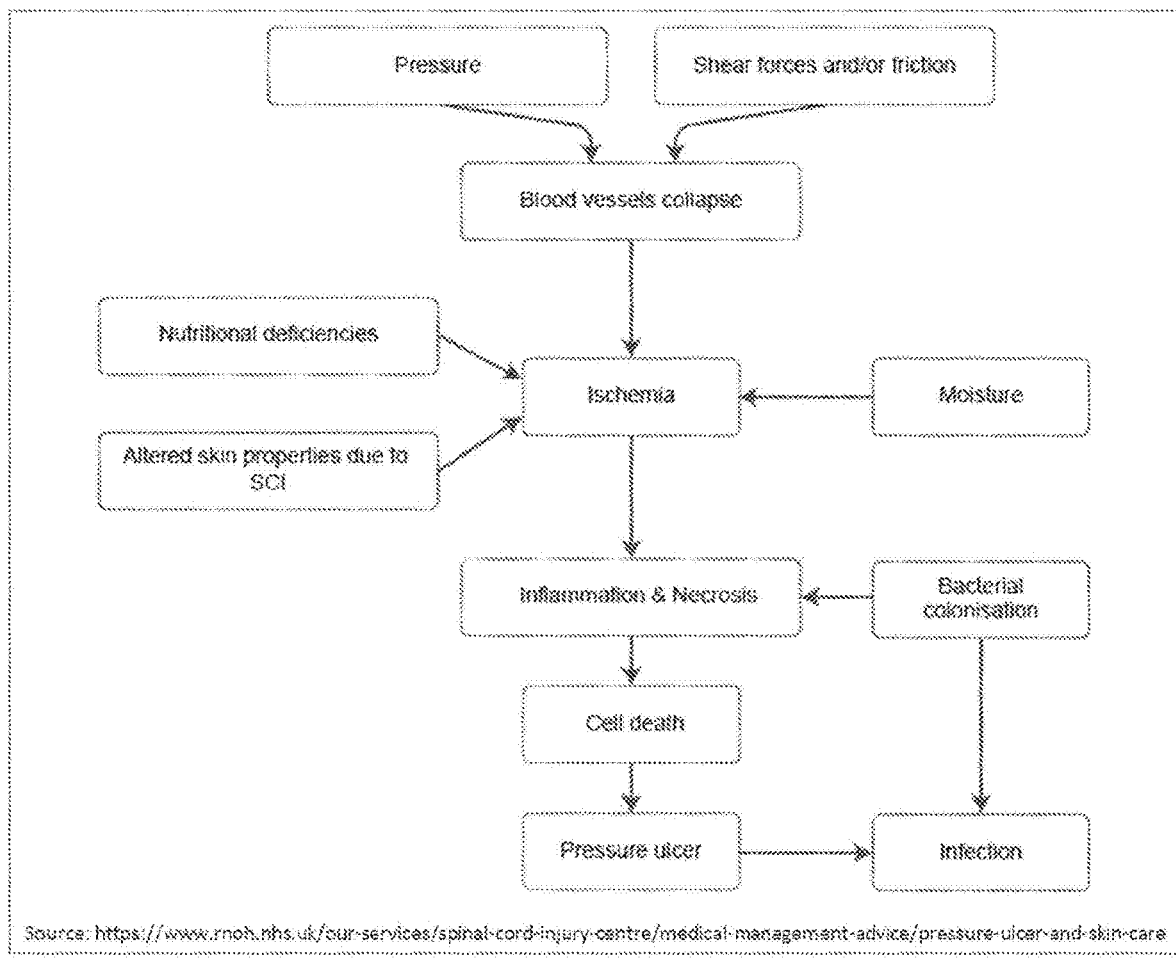
FIG. 11 is a schematic showing the roles of pressure and shear friction in causing tissue necrosis (pressure injuries aka pressure ulcers).

As shown in FIG. 11, applied pressure and the shear forces on the skin at the point of contact lead to collapse of blood vessels resulting in decreased blood supply to the overlying soft tissues (i.e., tissue ischemia) and can ultimately cause tissue necrosis [3], [4], [5]. This is further exacerbated in the case of individuals with SCI since their sensory perception may be compromised. Moreover, nutritional deficiencies, in conjunction with the skin properties altered by SCI, may further compound the issue and contribute to ischemia as shown in the figure.

Therefore, pressure injuries (aka pressure ulcers) are a serious, lifelong secondary complication of SCI that have the potential to "interfere with physical, psychological and social well-being and to impact overall quality of life" [6]. While preventable in most situations, when pressure injuries (aka pressure ulcers) occur, they may "disrupt rehabilitation, prevent individuals with SCI from attending work or school, and interfere with community reintegration" [2].

According to Byrne, pressure injuries (aka pressure ulcers) are an underestimated healthcare problem, particularly for individuals with SCI. The annual incidence of pressure injuries (aka pressure ulcers) among individuals with SCI is between 23% and 30% [7]. Between 7% and 8% of these will die due to complications from pressure injuries (aka pressure ulcers). More than 70% of SCI individuals with a pressure injury (aka pressure ulcer) have multiple ulcers. Each year, in the United States, 60,000 deaths are attributed to complications resulting from pressure ulcers. It has been estimated that the cost of care for pressure injuries (aka pressure ulcers) is about $1.3 billion annually while prevention could cost about one-tenth of this amount [5]. In October 2008, CMS stopped paying providers for hospital-acquired conditions including Pressure Ulcers [8]. At hospitals, such as the Children's Healthcare of Atlanta (CHOA), nurses assess and intervene every two hours (e.g., move patients around) to prevent pressure injuries (aka pressure ulcers) and a dedicated nurse does "skin rounds" weekly. Thus, there is a critical need for a cost-effective intervention that will address a significant issue affecting the quality of care (and hence quality of life) for individuals with SCI, and, in the process, reduce healthcare costs, which currently account for 17.9% of GDP in our nation.

The Adverse Consequences of Prolonged Sitting

Individuals who have to sit continuously and without moving for long periods of time, e.g., drivers, especially long-haul drivers, programmers, manufacturing workers, customer service representatives in offices and call centers, among others, also experience discomfort with adverse consequences, such as deep vein thrombosis (DVT), severe back pain, among others.

There is therefore a need to mitigate the risks to individuals throughout the continuum of life—from babies to senior citizens—from prolonged sitting or lying down in both healthcare and everyday activities (outside of healthcare settings) and enhance their comfort. The present intervention is targeted to meet this critical need.

Traditional Methods of Mitigating Pressure Injury

Figures 12A, 12B:
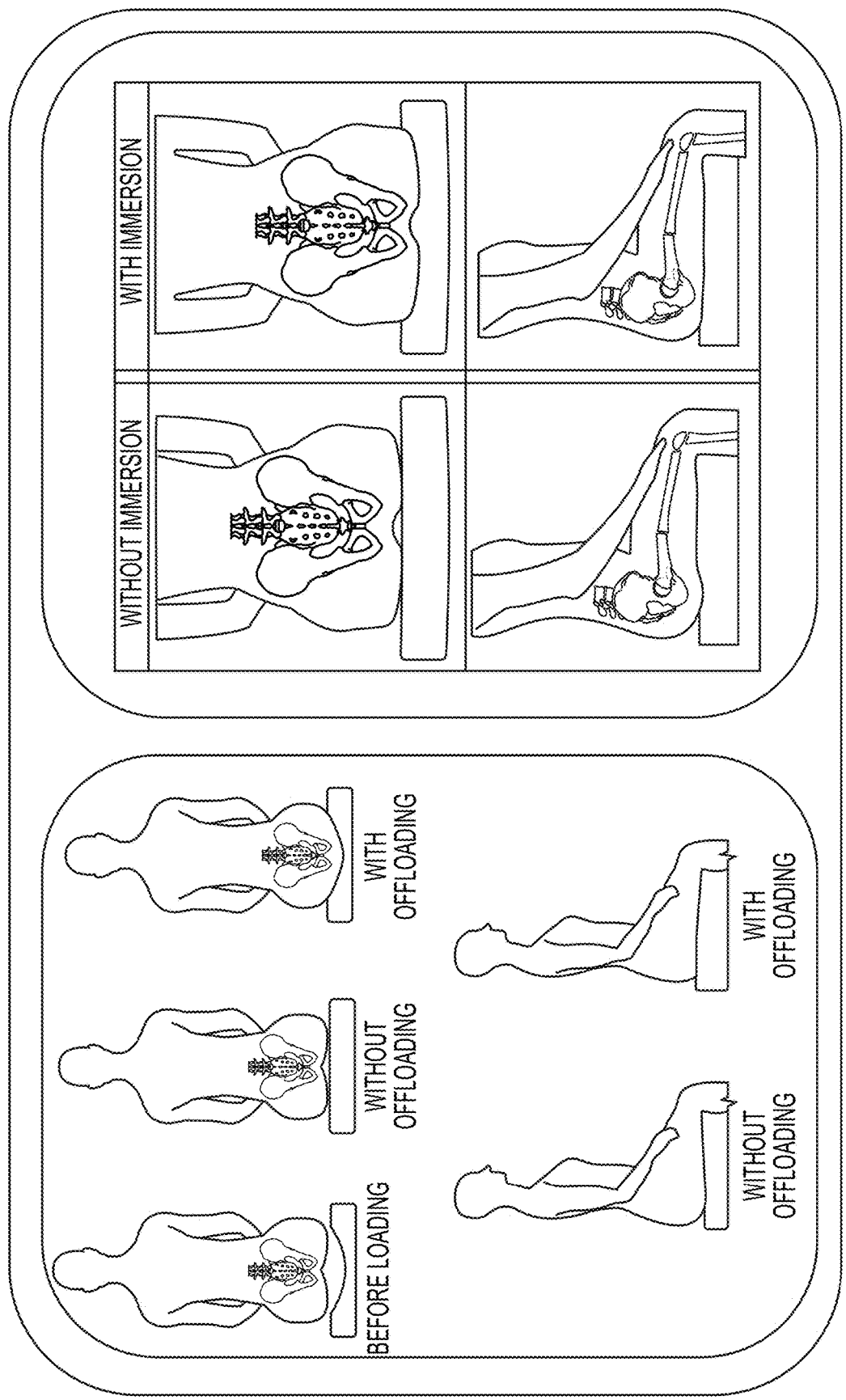
FIGS. 12A and 12B are illustrations of the concepts of off-loading and immersion, respectively.

Two different methods are used in practice to mitigate the potential for pressure injury; they are off-loading [9] and immersion [10], respectively. As shown in FIGS. 12A-12B, the peak pressure under the Ischial Tuberosity (IT) is relieved and transferred to the trochanters and femur bones.

Figure 13A:
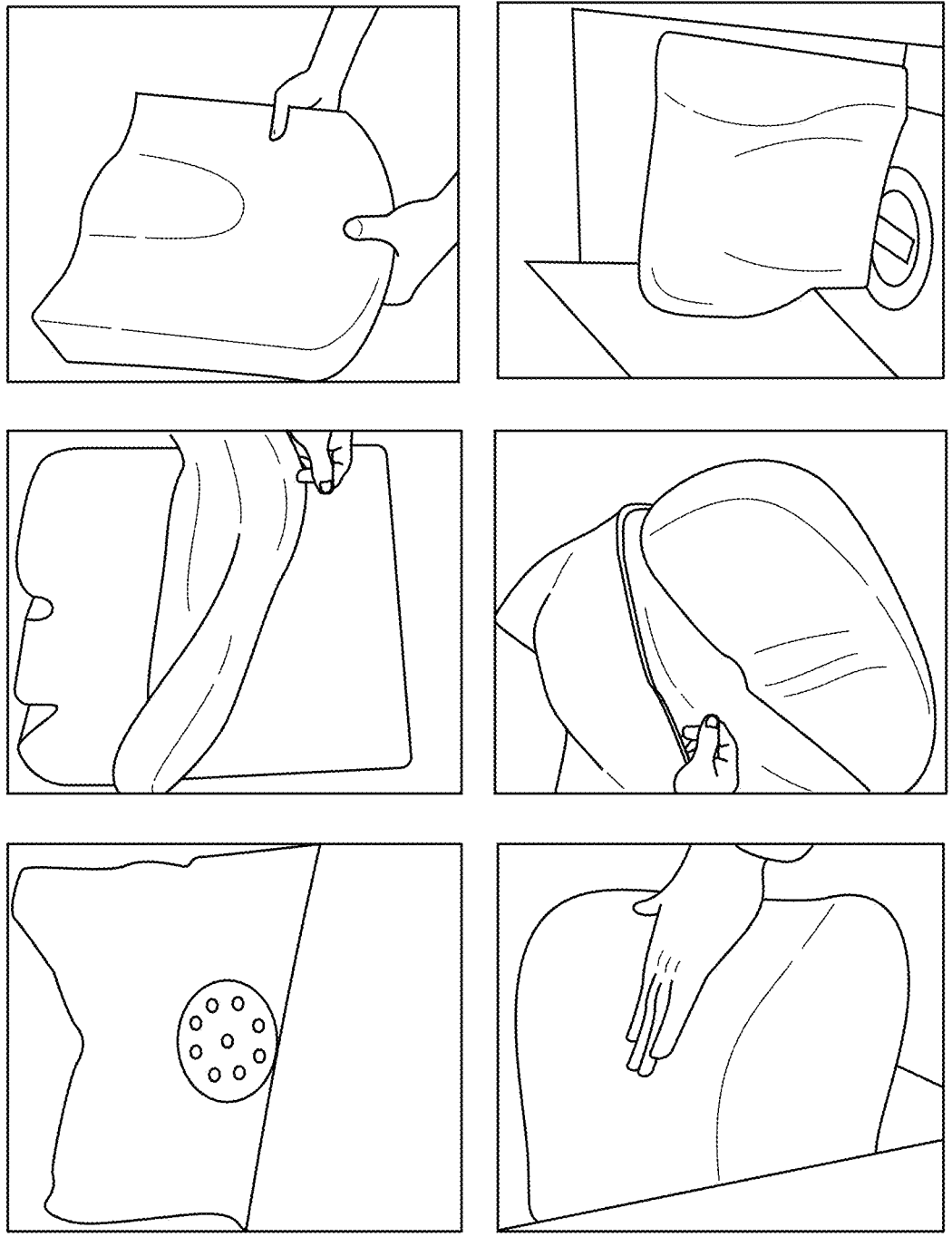
FIGS. 13A-13B shows photographs of cushions that are utilized for conventional methods of pressure injury intervention, which the present disclosure improves upon.
Figures 13A, 13B:
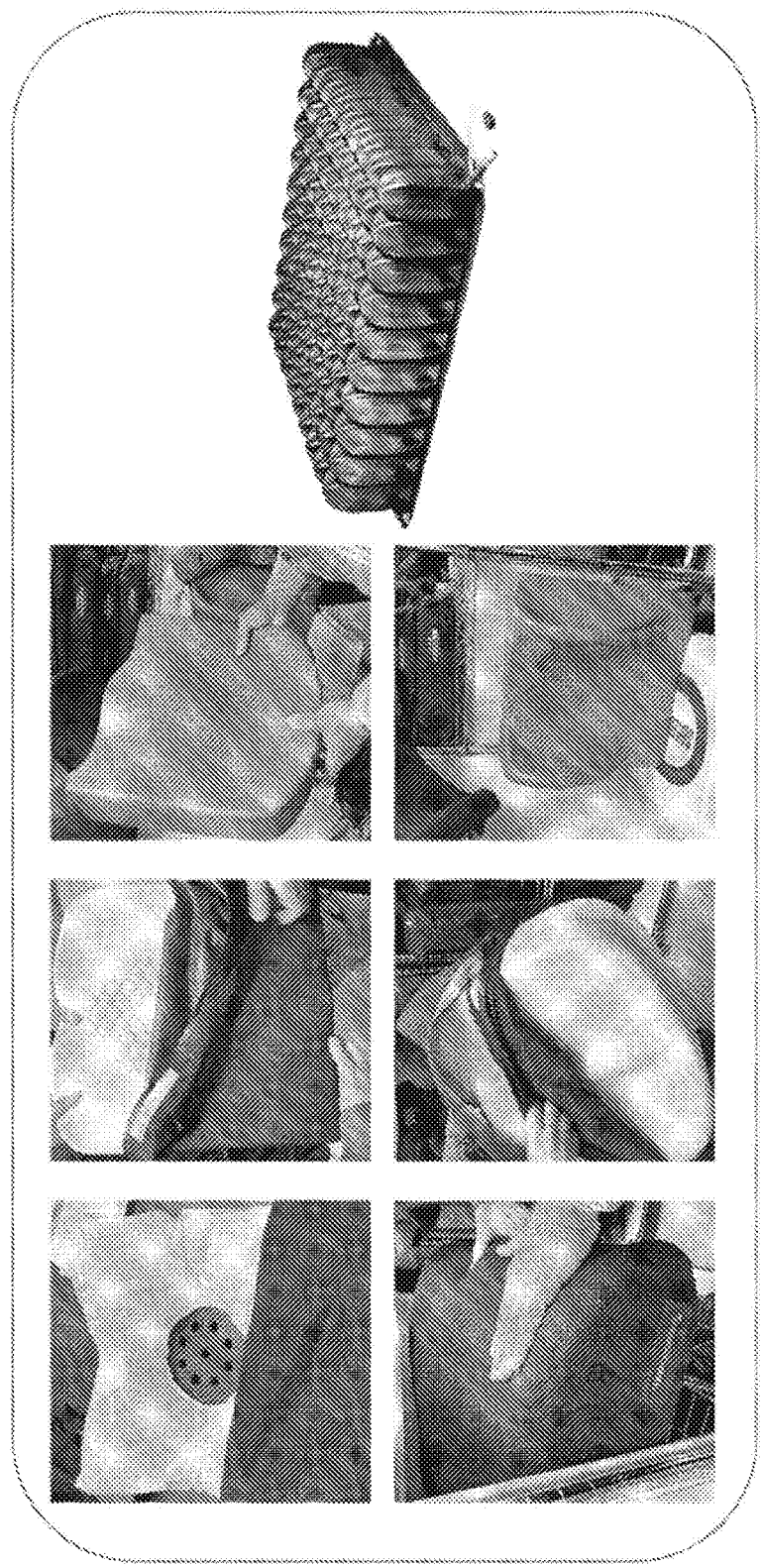

FIGS. 13A-13B show the various types of cushions in the market, including some that are custom-made. The types of materials used in these cushions range from gels and nylon covers to custom-made plastic molds and spacer fabric.

Advantages of the Present Disclosure Over Existing Technologies

No technology is known to exist for reducing pressure and moisture under seats today in an intelligent manner. There is no competitive technology that takes into account both pressure and moisture for assessing the potential for pressure injury and triggering an intervention. Over 500,000 critically ill children are admitted to an intensive care unit each year in the United States and they are at the highest risk for developing pressure injuries (aka pressure ulcers)—a significant market size. However, the critically ill population only represents 6.6% of the ~7.5 million yearly pediatric hospital admissions. According to the US Census Bureau, there are 7.2 million children younger than 18 years-old with severe disability. Many of these children are bedridden or use a wheelchair for mobility, both severe risk factors for the development of pressure injuries (aka pressure ulcers). Thus, there is a critical need for the systems and methods herein and the market size will be sizeable—a prerequisite for successful commercialization. Furthermore, the proposed system can be equally effective in adult healthcare settings, thus providing a larger market, which is critical for commercial success. According to a recent database review of almost 52,000 hospitalized individuals, approximately 4.5% of all admitted patients developed a new pressure injury/ulcer during their hospital stay. The National Pressure Ulcer Advisory Panel (NAUAP) reports wide ranges of prevalence among patients in the United States (US) estimated to be 1.3 to 3 million with projected costs at $2.2-$3.6 billion a year.

Advantages of features and embodiments of the present disclosure over existing intervention technologies include a customizable degree of relief to the user, retaining balance of the user while relieving pressure, and the accomplishment of immersion and offloading at the same time with systems and methods as described herein. The relief of pressure can be accomplished while simultaneously distributing it to neighboring surface contact points.

Exemplary Applications of the Present Disclosure

While the present disclosure references a pressure injury (also referred to herein as a pressure ulcer) system that can detect, ameliorate, slow the progression and/or prevent the formation of pressure injuries (aka pressure ulcers) in individuals (sometimes referred to as a "pressure ulcer prevention system" or "pressure injury prevention system" for short), it should be appreciated that the present systems and methods can be used by office workers, drivers, and any other individuals in contact with a piece of equipment or device (e.g., the individual is sitting on a chair for a prolonged period of time). The systems and methods herein can detect and give relief to lower back pain and/or other discomfort associated with contact between the individual and a piece of equipment or device (such as described herein).

The pressure injury prevention systems, methods and components can help detect, ameliorate, slow the progression, and/or prevent the formation of pressure injuries in individuals—from newborn to the elderly.

The settings in which pressure injuries or ulcers can occur can include hospitals, homes, office places, automobiles, transportation.

The types of surfaces that can cause pressure injuries or ulcers include surfaces of beds, infant bassinets, cribs, chairs, car seats, truck seats, etc.

Other exemplary applications or settings include long haul trucking and aircraft.

Actuation Systems

Described herein are actuation systems for relieving the pressure and/or decreasing moisture (wetness) on a surface of an individual, or on a surface which contacts an area with an individual that is subject to generate a pressure injury on the individual if such contact is made for a prolonged period of time. Actuation systems as described herein can comprise one or more actuator assemblies, one or more actuator pods, or an array of actuator assemblies or actuator pods. In embodiments, actuation systems as described herein comprise an array of actuator pods.

Actuation systems as described herein can comprise one or more actuator assemblies. An actuator assembly as described herein can comprise an actuator, an actuator head on an end of the actuator (for example on an outward or distal end of the actuator), and a piston tubing encasing and operably connected with the actuator. While referred to as "piston tubing", the skilled artisan would understand that the embodiment of a piston tubing set forth is broadly a tubing that encloses the actuator body or the actuating portion of the actuator body, for example a piston of a linear actuator. The piston tubing can operably connected with the actuator through portions of the actuator, for example the actuator head or the actuator body. The actuator and the actuator body can each have a length and a longitudinal axis. In embodiments, the actuator is a linear actuator. In embodiments, the actuator can have a piston. In embodiments, the actuator can have an actuator body that comprises a piston. In embodiments, the piston tubing is connected to the outer edge of the actuator head. In certain aspects, the piston tubing can be a metallic or hard plastic piston tubing. In embodiments, there is a space between the body of the actuator and the piston tubing that extends radially outward from the body of the actuator. In embodiments, there is a space between the body of the actuator and the actuator body, for example to permit air flow there between. In embodiments, the actuator is configured to move the actuator head and the actuator body (such as the tubing encasing the actuator) relative to the actuator assembly, for example relative to a housing for the actuator assembly. In embodiments, the actuator is configured to extend the actuator head and the actuator body (such as the tubing encasing the actuator) outwardly from the actuator assembly, for example relative to a housing for the actuator assembly, and retract the actuator head and actuator body from an extended position. the piston tubing can extend radially outwardly from the body of the actuator.

In embodiments, the one or more actuators are configured as pneumatic actuators, hydraulic actuators, mechanical actuators or a combination thereof. In embodiments, the actuator is configured, at least in part, to extend the actuator head and the actuator body outwardly from and retract inwardly into the actuator assembly or housing longitudinally along their length. In embodiments, the actuator is configured to extend the actuator head and actuator body outwardly from and retract inwardly into the actuator assembly or housing to varying degrees of extension and retraction.

In embodiments, actuator heads as described herein can comprise a plurality of apertures configured to allow fluid to flow from the piston tubing (i.e., space between the piston tubing and the actuator) up through the tubing and out of the actuator head. In embodiments, the plurality of apertures of the actuator head are in an outermost surface of the actuator head opposite the actuator body. In embodiments, the actuator heads according to the present disclosure are created by three-dimensional printing (i.e., 3D printing also known as additive manufacturing). In embodiments, the plurality of apertures are configured to pass air moving along the axis of extension of the one or more actuators outwardly from and inwardly into the housing.

In embodiments, the actuator head further has a plurality of channels extending across an outer surface of the actuator head and orthogonal to a longitudinal axis of the actuator body, wherein each of the plurality of channels fluidically connects two or more apertures. In embodiments, the plurality of channels have a cross-section that is concave inwardly from the outer surface of the actuator head along a longitudinal axis of the channels. In embodiments, the channels extend across any width of the actuator head along an axis orthogonal to the axis of extension of the actuator, and are configured to pass air across and away from the actuator head along an axis orthogonal to the axis of extension. In embodiments, the actuator head is fixed in position in relation to the actuator body. In embodiments, the actuator head is pivotally connected to the actuator body. In embodiments, actuator heads according to the present disclosure are produced through additive manufacturing.

In embodiments, without intending to be limiting, the actuator head is wider than a cross-section of the actuator body taken along an axis orthogonal to a longitudinal axis of the actuator body. Those of skill in the art would understand that the width along across this surface can vary.

In embodiments, the one or more actuation assemblies can be placed inside a housing that houses the actuator and piston tubing so that the head[s] protrudes from the housing. Housings according to the present disclosure can be produced via additive manufacturing.

Optionally, actuation systems as described herein can further comprise a moisture control device. In certain aspects, the moisture control device (A) can be activated when moisture is detected to dry the surface and/or (B) can also be activated when the actuator of the actuator assembly retracts to "cool" the seat to make the individual comfortable.

In embodiments, the moisture control device is a ventilation and/or heating system. In embodiments, the moisture control device is a fan. A fan of an actuation system as described herein can be placed or configured to pass air through the piston tubing and head of an actuator assembly.

In other embodiments, the moisture control device can be a thermoelectric device (utilizing the Peltier effect), heating coils, or other such devices.

In embodiments, any components of an actuator assembly can be configured as an actuator pod. In embodiments, an actuator pod comprises one or more or two actuation assemblies. In embodiments, an actuator pod comprises two actuation assemblies in a housing. In embodiments, an actuator pod comprises two actuation assemblies in a housing and a moisture control device. In embodiments, an actuator pod comprises two actuation assemblies in a housing and a fan.

In embodiments, the actuator system comprises an array of actuator assemblies or actuator pods. In embodiments, the actuator system is a 3×3 array of actuator pods (6×6 array of actuator assemblies). In embodiments, the actuation pod further comprises brackets to anchor the one or more actuation assemblies. In embodiments, the actuator assemblies of the actuator pod are offset relative to one another along a longest longitudinal axis of the actuator pod.

Actuation pods and systems as described herein can further comprise electronics (such as transistors, for example MOSFET transistors, H-bridge to switch the polarity of the voltage applied to allow the DC motor to run forward and backward, i.e., the actuator to go up/down) and other wires that are configured and enable it to receive instructions to drive the actuator[s] and/or moisture control devices, such as those instructions described below and herein.

Figures 28A, 28B:
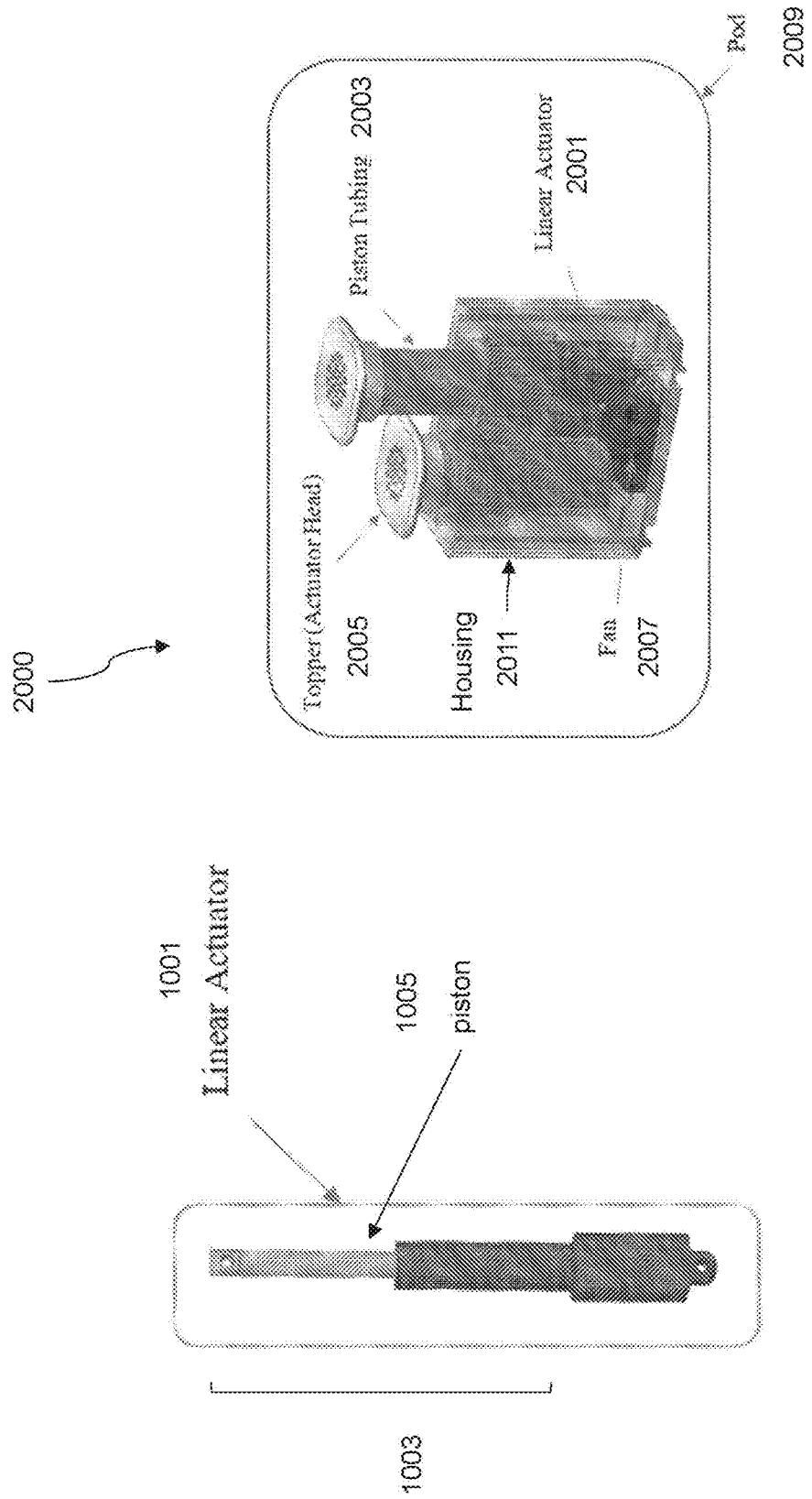
FIGS. 28-A-28B show the linear actuator and an embodiment of the actuation system incorporating the linear actuator.

An embodiment of an actuator 1001 is shown in FIG. 28A that shows an example of a linear actuator. In the embodiment of the actuator 1001 of FIG. 28A, the actuator 1001 has an actuator body 1003 comprising a piston 1005 that extends and retracts along a longitudinal axis X. In certain aspects, the actuator body is the portion of that actuator that moves in relation to other portions of the actuator, or the portion of the actuator that houses the portion of the actuator that moves in relation to other parts of the actuator (for example a piston) or both.

An embodiment of an actuator assembly and pod 2000 according to the present disclosure is shown in FIG. 28B. An actuator 2001 (a linear actuator in this example) is shown in relation to a piston tubing 2003 and actuator head 2005. FIG. 28B also shows an aspect of the system described as an actuator pod with two actuator assemblies in a housing 2011 with an optional moisture control device 2007 (a fan in this example).

Figure 29:
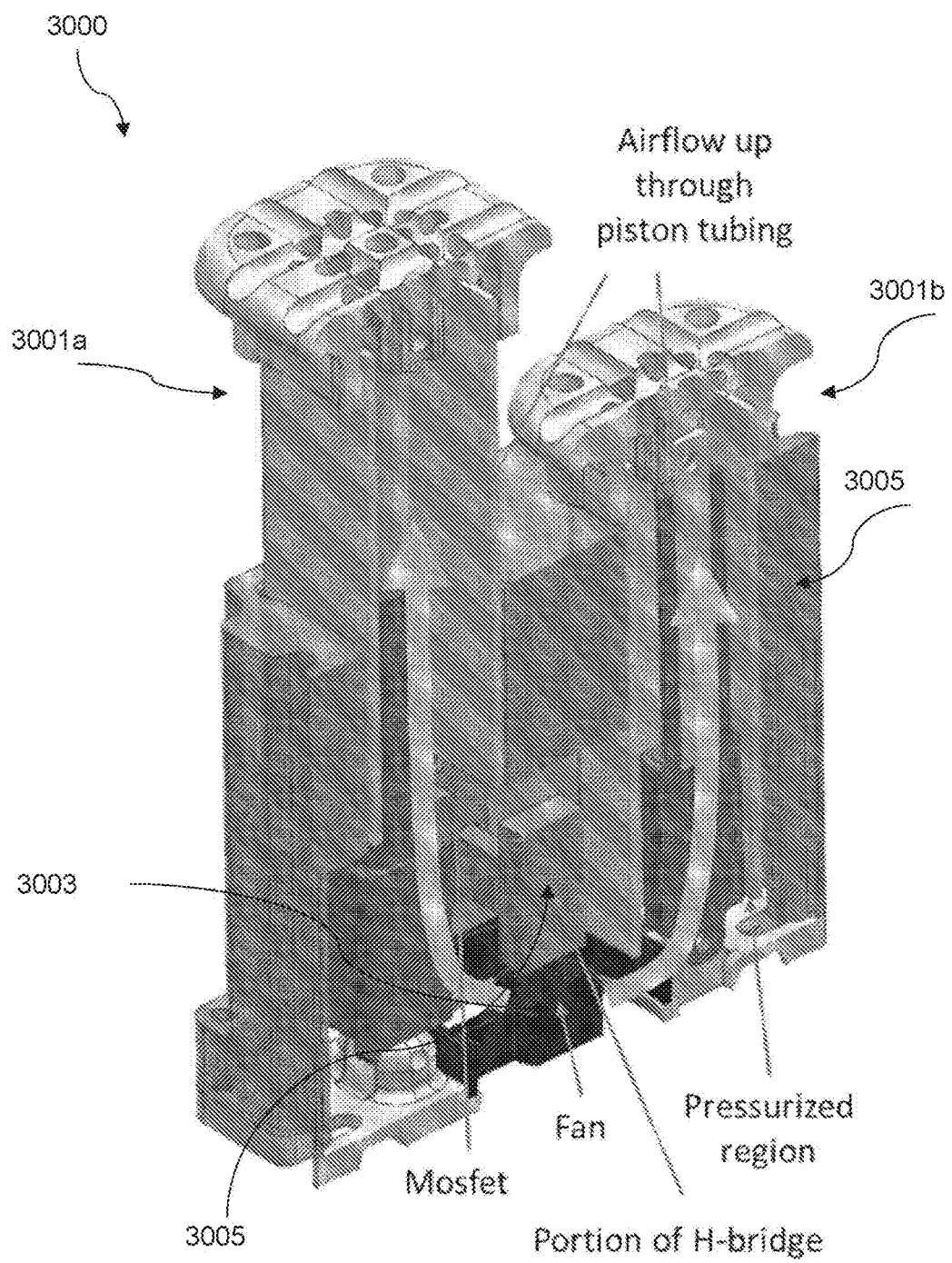
FIG. 29 shows a cross-section of an embodiment of an actuation system as described herein.

A cross-sectional view of a pod 3000 showing two cross-sectional views of actuator assemblies 3001a and 3001b according to the present disclosure is also presented in FIG. 29, wherein the embodiment is shown with a moisture control device 3003 (a ventilation or fan in this example). The actuator assembly housing 3005 is shown, as well as the anchoring of the actuator assemblies 3001a and 3001b to the base of pod 3000. Other electronics and aspects 3007 of the pod are also shown.

Actuation Instructions

Actuation instructions according to the present disclosure can be sent to the actuation system in order to enact a desired intervention (i.e. extend or retract one or more actuator assemblies, turn on/off the optional moisture control device, or both).

In embodiments of actuation instructions according to the present disclosure, actuation instructions can be sent to the actuation system by a computing device (wired computer or wireless computing device, such as a smartphone or tablet or Raspberry Pi or an FPGA). Such instructions can be sent automatically from an application based on determined pressure and/or moisture values (from a database or continuous measurements in real-time) from a sensing device, or based on pre-determined values calibrated by a user that are specific to the individual.

In embodiments, actuation instructions can use the real-time data from the sensing device (such as a fabric-based sensor network) or it can be programmed independently so that the system can operate without the fabric-based sensor network.

In embodiments, the actuation instructions can first detect pressure and/or moisture from a sensing device. Based on the detected pressure, the actuation instructions can send an alert to the user based on a comparison of the detected values to a pre-determined threshold value (either from a database or from a value that has been calibrated to the user).

In embodiments, the actuation instructions can further specify a desired intervention. In embodiments, the desired intervention can extend or retract one or more actuator assemblies of the actuation system and/or turn on the one or more moisture control devices (for example, the fan).

In additional embodiments of actuation instructions according to the present disclosure, the instructions can detect and/or retrieve pressure data from a sensing component of systems as described herein, moisture data from a sensing component of systems as described herein, or both.

Pressure Intervention Systems

In any one or more embodiments, provided herein are pressure injury (or ulcer) prevention systems, methods and components to address the aforementioned deficiencies. The present pressure injury prediction, alleviation and/or prevention systems and methods help predict, alleviate or slow, and/or prevent the formation of pressure injuries in individuals—from newborn to the elderly.

Pressure intervention systems as described herein can comprise an actuation system and a computing device. In embodiments, pressure intervention systems as described herein can comprise an actuation system, a computing device, and actuation instructions. Optionally, pressure intervention systems as described herein comprise an application (executable on a computing device, for example a mobile personal computing device such as a smartphone or a tablet) that allows the user to visualize aspects of the intervention system and/or send instructions to the system. Optionally, pressure intervention systems may further comprise a sensing component (which can be a fabric-based sensing components according to embodiments of the present disclosure).

Pressure intervention systems according to the present disclosure can further comprise an intervention surface comprising one or more interface locations between systems as described herein and a subject/user. The intervention surface abuts the actuator heads of the actuator assemblies of the actuation system, and is a surface that would contact an area of an individual (creating one or more interface locations). In embodiments, the intervention surface is a seating or bed surface for an individual to sit or lie on. In embodiments, the intervention surface is a cushion or fabric sheet that is configured as a seat of a wheelchair, an office chair, a crib or bassinet cushion. As used herein "an interface location" means a point of contact, area of contact, or an area of contact points between the individual or a part of the body of the individual and the equipment or device, or a surface of the equipment or device (i.e. the intervention surface), with which the individual is in contact through the fabric-based sensor or the actuator heads of the actuator assemblies of the actuator pods, it being understood that the fabric-based sensor would be placed or positioned between the individual and the equipment or device to obtain the various measurements described herein.

In embodiments, pressure intervention systems according to the present disclosure are configured as a seating or bed surface, for example for a wheelchair, an office chair, an airplane chair, a long-haul truck chair, a train seat, a mattress for a crib and/or bassinet, and the like. In embodiments according to the present disclosure, pressure intervention systems as described herein further comprise a built-in display (for example a display positioned on a wheelchair or bed that can be seen and operated via touchscreen or wired/wireless remote control by a subject or other user that is not the subject) that could display all the information; in another embodiment, another version of this display could be interactive with the user triggering the intervention manually A pressure injury system can optionally include a fabric-based sensing component ("fabric-based sensor") and a computing device. The fabric-based sensor can include one or more sensors comprising a pressure sensor or a moisture sensor or both. The computing device can include a processor and an application that can include program instructions stored in memory and executable by the processor that, when executed, can cause the computing device to determine that an individual is at risk for developing a pressure injury at an interface location between the individual and a surface of a piece of equipment or device with which the individual is in contact through the fabric-based sensor, and in response to determining that the individual is at risk for developing the pressure injury at the interface location, alert a manual intervention or trigger an automated intervention or both. The surface can be a surface of any of the aforementioned equipment or devices, such as a chair, crib, bed, wheel chair, or other equipment or a device (such as a body brace or cast), and the fabric-based sensor can be between the individual and the surface.

In embodiments, systems as described herein can include a prediction/prevention application, an analytics application, and/or a caregiver application for implementation on various computing environments including a single-board computer or a server, smartphone, a tablet, laptop, or other computing device. The systems and methods can alert or trigger a manual intervention or an automated intervention regarding the individual and the individual's contact with the equipment. The manual intervention can include intervention by a user of the equipment, including in particular an individual in contact with an intervention surface of an actuation assembly as described herein.

In an embodiment, a system for predicting, alleviating or slowing, and/or preventing the formation of pressure injuries is provided. The system can include a fabric-based sensing component (also referred to herein as a "fabric-based sensor"). The fabric-based sensor can include one or more sensors such as one or more pressure sensors or one or more moisture sensors or both. In some examples, the fabric-based sensor can include a pressure sensing component, or a moisture sensing component, or both. When both a pressure sensing component and a moisture sensing component are provided an insulator can be provided between the moisture sensing component and the pressure sensing component. The fabric-based sensor can be configured to be placed between an individual and a wheelchair, seat, bed, crib, or other equipment or device upon which the individual can sit or lie or with which the individual is in contact (such as a body brace, e.g., a neck brace, a knee brace, etc., or a body cast). In any one or more aspects, the pressure sensing component can include two high conductive fabrics configured to make contact through a low conductive fabric forming a pressure sensor. It can be configured to detect or measure a pressure at an interface location between the fabric-based sensor and the individual. In any one or more aspects, the moisture sensing component can include two conductive fabrics placed adjacent or next to each other forming a moisture sensor, the two conductive fabrics optionally separated by an insulating fabric, wherein moisture closes the circuit in the moisture sensor when moisture passes or percolates from one of the conductive fabrics to the other of the conductive fabrics. It can be configured to detect or measure moisture at an interface location between the fabric-based sensor and the individual. The fabric-based sensor can also include interconnections to route signals from the one or more pressure sensing components and the one or more moisture sensing components or both to a network or a computing device.

In any one or more aspects, the system(s) can include a computing device with a processor, a data store, and an application that, when executed, causes the computing device to determine that an individual is at risk for developing a pressure injury at an interface location between the individual and the equipment or device with which the individual is in contact through the sensing device (that can be a fabric-based sensor) that can include a pressure sensing and/or a moisture sensing component.

In any one or more aspects, the system(s) can include a computing device with a processor, a data store, and an application that, when executed by the user, causes the computing device to send instructions (also referred to herein as rules) to the intervention system.

The pressure injury system can include a data store. The program instructions can cause the computing device to store the at least one measurement in the data store. The pressure injury system can include an analytics system configured to apply machine learning techniques to the at least one measurement to create a knowledge base for anticipating, avoiding and/or preventing formation of pressure injuries.

In an embodiment, a pressure injury system is provided, comprising: a fabric-based sensing component; and a computing device comprising: a processor; and an application comprising program instructions stored in memory and executable by the processor that, when executed, cause the computing device to: determine that an individual is at risk for developing a pressure injury at an interface location between the individual and a surface with which the individual is in contact through the fabric-based sensing component; and in response to determining that the individual is at risk for developing a pressure injury at the interface location, alert a manual intervention or trigger an automated intervention between the individual and the surface.

In any one or more aspects of the system, the program instructions can cause the computing device to obtain, from the fabric-based sensing component, at least one measurement corresponding to at least one of: a pressure or a moisture value associated with at least one contact point between the individual and the surface through the fabric-based sensing component at the interface location. The program instructions can cause the computing device to process the at least one measurement of the pressure or the moisture value. Determining that the individual is at risk for developing the pressure injury can comprise determining that the at least one measurement exceeds a designated threshold value. The system can comprise a data store and the program instructions can cause the computing device to store the at least one measurement in the data store. The system can further comprise an analytics system configured to apply machine learning techniques to the at least one measurement to create a knowledge base for anticipating and avoiding formation of pressure injuries. The program instructions can cause the computing device to obtain a reading of an environmental condition. The alert for a manual intervention can require a caregiver for the individual to acknowledge the alert by entering a response into the system. The at least one measurement can be transmitted to a data store for storing electronic medical records. The fabric-based sensing component can comprise a pressure sensing component or a moisture sensing component or both.

Sensing Components (for Example, Fabric-Based Sensor[s]

In embodiments, pressure and/or moisture sensing components are provided as aspects of pressure intervention systems as described herein.

In an embodiment, a fabric-based sensing component is provided, comprising: a pressure sensing component; a moisture sensing component; and an insulator between the moisture sensing component and the pressure sensing component. In any one or more aspects, the pressure sensing component is configured to detect a pressure at an interface location between an individual and a surface with which the individual is in contact through the fabric-based sensing component. The moisture sensing component is configured to detect a moisture at an interface location between an individual and a surface with which the individual is in contact through the fabric-based sensing component. The pressure sensing component can comprise two high conductive fabrics configured to make electrical contact through a low conductive fabric. The moisture sensing component can comprise two conductive fabrics configured to make contact through moisture between the two conductive fabrics. The fabric-based sensing component can comprise interconnections to route signals from the pressure sensing component and the moisture sensing component to a computing device.

A fabric-based sensing component ("fabric-based sensor") is provided that can include a pressure sensing component, or a moisture sensing component, or both and optionally an insulator between the moisture sensing component and the pressure sensing component. The pressure sensing component can be configured to detect a pressure at an interface location between an individual and a surface (such as described herein) with which the individual is in contact through the fabric-based sensor. The pressure sensing component can include two high conductive fabrics configured to make contact through a low conductive fabric. The moisture sensing component can be configured to detect a moisture at an interface location between an individual and a surface (such as described herein) with which the individual is in contact through the fabric-based sensor. The moisture sensing component can include two conductive fabrics placed next to or adjacent each other such that when moisture passes from one of the conductive fabrics to the other of the conductive fabrics, the moisture closes a circuit between the fabrics. Optionally, a substrate or insulating fabric can be provided between the two conductive fabrics through which the moisture can pass from the one conductive fabric to the other conductive fabric to form the moisture sensing component. The pressure sensing component can include an array of pressure sensors and the moisture sensing component can include an array of moisture sensors configured to obtain pressure and moisture readings at multiple interface locations between the individual and the surface of the equipment or device. The fabric-based sensor can also include interconnections to route signals from the pressure sensing component and the moisture sensing component to a computing device. In various aspects herein, the fabric-based sensor can include both a pressure sensing component and a moisture sensing component (such as described in any one or more aspects herein), one of the sensing components formed as a layer on top of the other sensing component, optionally with an insulating layer placed in between the two sensing component layers.

In any one or more aspects of any one or more embodiments herein the fabric-based sensing component can comprise a plurality of sensors comprising at least a pressure sensor or a moisture sensor. The pressure sensing component can comprise a plurality of pressure sensors for detecting or measuring a pressure at a plurality of interface locations. The moisture sensing component can comprise a plurality of moisture sensors for detecting or measuring a moisture at a plurality of interface locations. The plurality of pressure sensors can be located or positioned in an array to cover an area or the entire body of the individual. The plurality of moisture sensors can be located or positioned in an array to cover an area or the entire body of the individual. The array of pressure sensors and/or the array of moisture sensors can be configured to obtain pressure and/or moisture readings at multiple interface locations between the individual and the surface. The surface can be a surface of a chair, crib, bed, wheelchair, or other equipment or device for supporting a body or a body part of the individual, and the fabric-based sensing component can be placed between the individual and the surface.

In various aspects, the present systems and methods can comprise one or more fabric-based sensors that can be placed between an individual and a wheelchair, seat, bed, crib, or other equipment or device upon which the individual can sit or lie or with which the individual is in contact. The fabric-based sensor(s) can comprise a combination of material types, fabric structures (single, multilayer, and their inherent variations), and manufacturing technologies (weaving, knitting and fabric finishing, and combinations thereof) and a combination of woven/knitted structures and sensors.

In certain embodiments, the system can include a fabric-based sensing component ("fabric-based sensor") that interacts with one or more components of the system. In any one or more aspects, embodiments of systems described herein include a fabric-based sensing component ("fabric-based sensor") configured to be placed between an individual and a wheelchair, seat, crib, or other equipment or device upon which the individual can sit or lie or with which the individual is in contact. The fabric-based sensor can include a combination of material types, fabric structures (single, multilayer, and their inherent variations), and manufacturing technologies (weaving, knitting and fabric finishing, and combinations thereof) and a combination of woven/knitted/nonwoven structures.

The fabric-based sensor can include one or more sensors such as one or more pressure sensors and/or one or more moisture sensors. In some aspects, the fabric-based sensor includes a pressure sensing component. In some aspects, the fabric-based sensor includes a moisture sensing component. In some aspects, the fabric-based sensor includes a pressure sensing component, a moisture sensing component, and an insulator between the moisture sensing component and the pressure sensing component. The fabric-based sensor can be configured to be placed between an individual and a wheelchair, seat, crib, or other equipment or device (such as a body brace or cast) upon which the individual can sit or lie or with which the individual is in contact. In any one or more aspects thereof, the pressure sensing component can include two high conductive fabrics configured to make contact through a low conductive fabric. As used herein "fabric" can mean or include pieces of fabric, such as fabric patches. The pressure sensing component can be configured to detect a pressure at an interface location. The moisture sensing component includes two conductive fabrics configured to make contact through the flow or percolation of moisture therebetween. It is configured to detect moisture at an interface location. For either or both sensing components the interface location can be a location, and/or point of contact between the individual and a piece of equipment or device (such as described herein) through the fabric-based sensing component. The fabric-based sensor can also include interconnections to route signals from the pressure sensing component, the moisture sensing component, or both, to a computing device.

Computing Device[s]

The system(s) can also include a computing device (or a series of interconnected computing devices that form a computing system) with a processor, a data store, and an application that, when executed, causes the computing device to determine that an individual is at risk for developing a pressure injury at the interface location. The application can obtain, from the fabric-based sensor, at least one measurement corresponding to a pressure, a moisture, or both, associated with at least one contact point at the interface location between the individual and the piece of equipment or device through the sensing component. The system(s) can also obtain a reading of an environmental condition such as temperature or relative humidity in a local area at or about the point of contact or interface location between a wheelchair, seat, bed, crib, or other equipment or device (such as a body brace or cast). Additional aspects of computing devices and computing systems as described herein are provided in the Examples below.

The components executed on the computing device 303, for example, include an application 315, an analytics application 318, and other applications, services, processes, systems, engines, or functionality not discussed in detail herein. The application 315 is executed in order to predict, alleviate or slow and/or prevent the formation of a pressure injury (also known as pressure injury) at an interface or point of contact between an individual and a surface, such as an underlying surface in the case of a wheelchair 321 or bed, crib, or other equipment 324 or an adjacent surface of a device such as in the case of a brace or cast. Equipment 324 is not limited to beds and cribs, and can include automobile seats, office chairs, neck braces, respiratory equipment, or any other equipment where an individual is in contact with a surface of the equipment or device and the individual is at risk for the formation of a pressure injury at an interface or point of contact between the individual and the other equipment 324.

Applications

Figure 3:
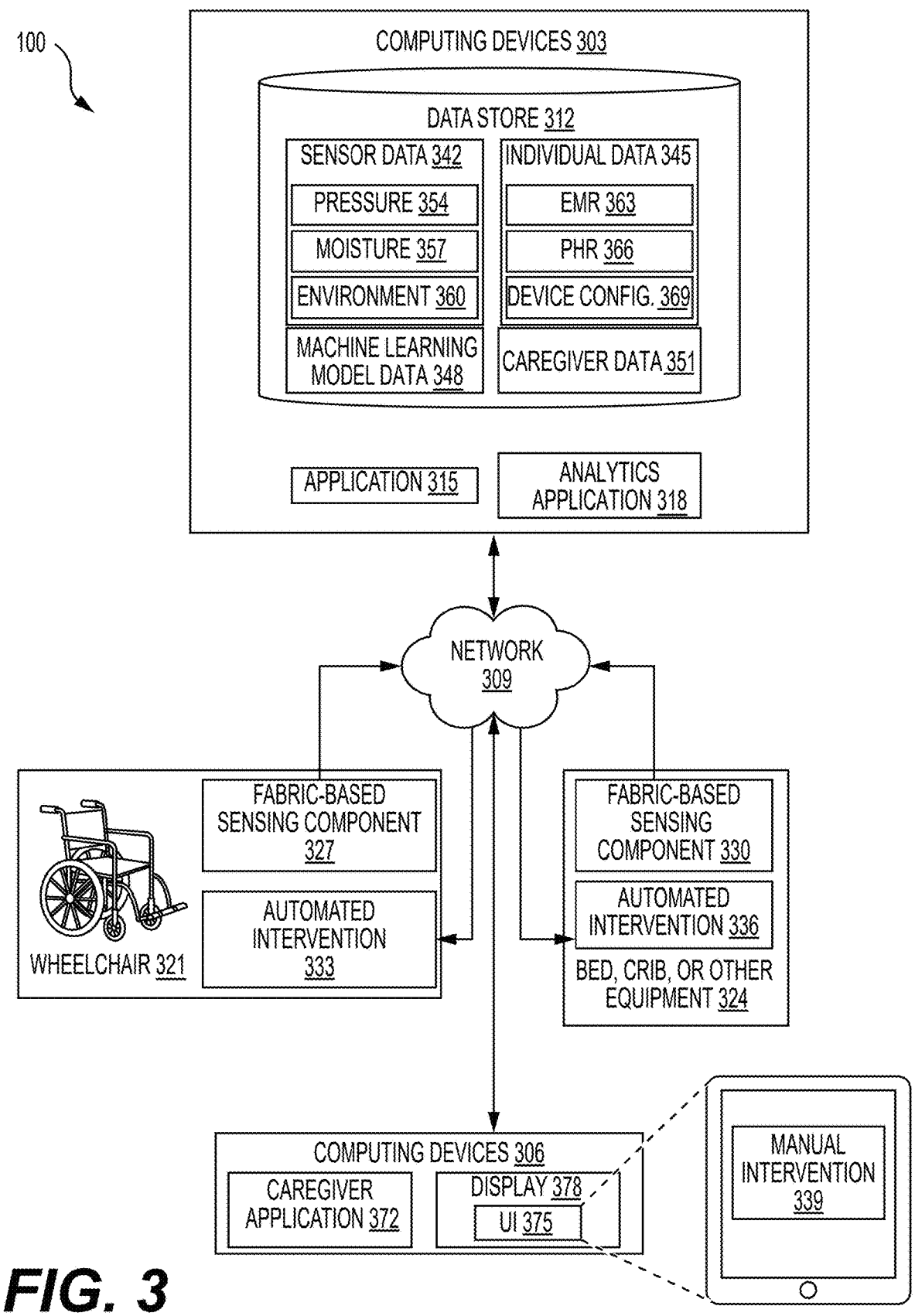
FIG. 3 is a schematic block diagram of a prevention system according to various embodiments of the present disclosure
Figure 8:
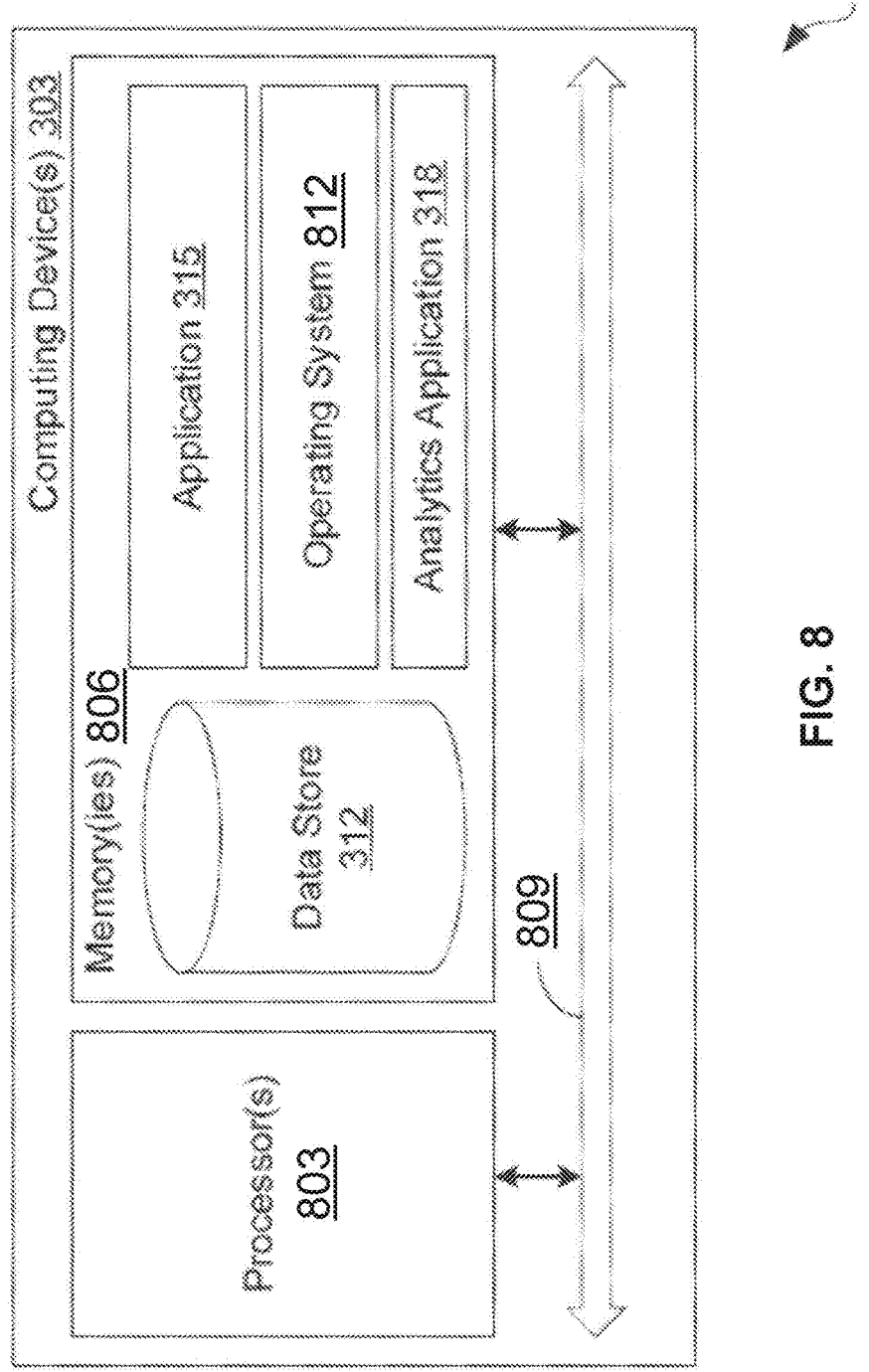
FIG. 8 is a schematic diagram of an example of a computing device used to implement a prevention system of the present disclosure

With reference to FIGS. 3 and 8, The application 315 can perform various functions associated with the prediction, alleviation or slowing and/or prevention of pressure injuries as will be described. To this end, the application 315 can trigger automated intervention 333, automated intervention 336, or manual intervention 339 as described in any aspect herein.

The application can obtain, from the fabric-based sensor, at least one measurement corresponding to a pressure and/or a moisture associated with at least one point of contact through the fabric-based sensor between the individual and an interface location. The system(s) can also obtain a reading of an environmental condition such as a temperature or a relative humidity in relation to or at or about the interface location.

The application 315 can trigger automated interventions 333, 336 in a number of ways. Actuator assemblies can be triggered for example to vibrate segments of the surface of the equipment, such as an individual's seat on the wheelchair 321. In some examples, actuator assemblies can actively control portions of the wheelchair 321 or the equipment 324. Actuator assemblies can raise or lower slats in the wheelchair 321, or position the equipment 324 to relieve pressure, or cause the individual to change position to relieve the pressure at a given determined contact point. Based on a pressure at a contact point with the wheelchair 321, the application 315 can determine that a particular slat of the wheelchair 321 needs to be lowered (or raised) and cause an actuator assembly to lower (or raise) the particular slat. Or, the application 315 can cause a head of bed elevation (HOBE) of the bed 324 to be adjusted. The application 315 can also turn on one or more fans to ventilate one or more contact surface points associated with the wheelchair 321 or the equipment 324 to relieve moisture or wetness at such points. The application 315 can also generate network pages such as web pages or other types of network content that are provided to computing device 306 for the purposes of viewing pressure and moisture levels and actuator assembly positions along with environmental conditions as will be described.

The manual intervention 339 can be a web page that is rendered to alert a caregiver or an individual, for example an individual in contact with an actuator assembly as described herein or in contact with an intervention surface of an actuator assembly as described herein, to take some manual action, such as to flip or reposition the individual. One particular advantage of the system 100 is that the manual intervention 339 can be alerted or triggered as needed, rather than requiring manual interventions on a set periodic schedule (e.g., every 15 minutes or two hours in some protocols). For example, the application 315 can refrain from triggering a manual intervention 339 if a child in a crib 324 has recently been picked up and thus the risk of developing a pressure injury is lower. The application 315 can determine that a threshold has not been reached, and thus a caregiver does not need to come to reposition the child.

Figure 2:
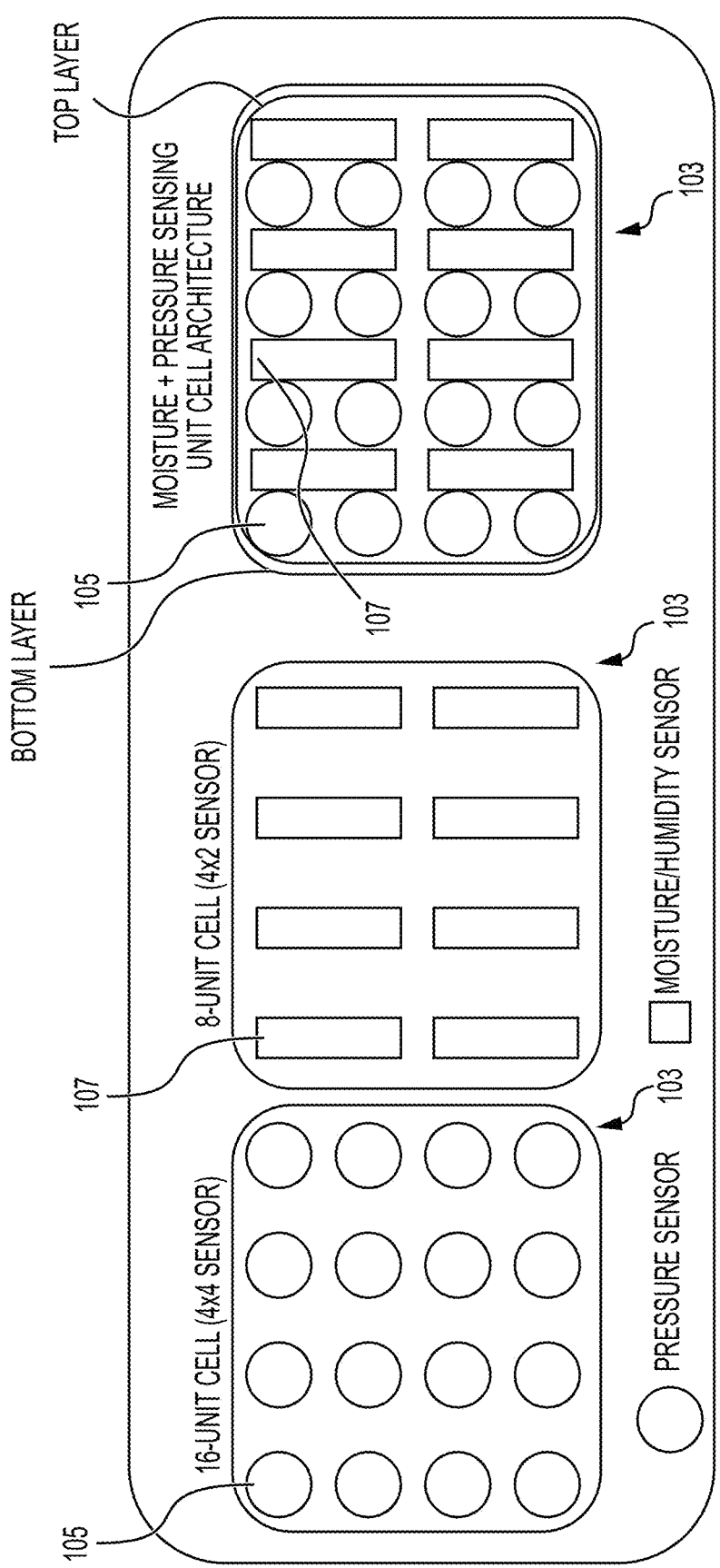
FIG. 2 is an embodiment of an architecture of a unit cell of a fabric-based sensor of a fabric-based sensor network of the present disclosure

The application 315 is configured to monitor and receive readings or signals from the sensors 105, 107 representative of a pressure or a moisture level of a fabric-based sensor 327 associated with the wheelchair 321 and/or sensors of a fabric-based sensing component 330 associated with the equipment 324. The fabric-based sensing component 327, 330 can have multiple layers, for example one or more layers that make up a pressure sensing component or one or more layers that make up a moisture sensing component or both. One or more layers can be made up of a number of unit cells 103 (as depicted in FIGS. 1 & 2). Additionally, the fabric-based sensing component 327, 330 can include an insulator or an insulating layer between a moisture sensing component and a pressure sensing component. While the present disclosure focuses on the sensors 105, 107 for obtaining one or more measurements representative of the pressure or the moisture level of a fabric-based sensing component 327, 330, it should be appreciated that any type of sensor may be used to monitor parameters at the contact surface points between an individual and the underlying surface. The system 100 can include a sensor to measure surface friction and/or surface shear, which is another parameter that can affect the formation of pressure injuries.

The analytics application 318 provides an easy-to-use platform or information infrastructure to acquire the data to carry out "Big Data" analytics. The analytics application 318 can apply machine learning techniques to machine learning model data 348 stored in the data store 312. The analytics application 318 can develop strategies to anticipate the formation of pressure injuries and thereby avoid them. The analytics application 318 can also further the design (redesign and/or modification) of equipment (wheelchairs, prosthetics, cribs, beds, neck braces, automobile seats, etc.) for individuals. For example, applying machine learning techniques to the machine learning model data 348 stored in the data store 312 can provide the foundational data for enhancing the design of the equipment. Another aspect of the analytics application 318 can be to create an index for degree of comfort of seating, which can be based on data stored in the data store 312, and can provide an objective index of seating comfort.

Caregiver application 372 or UI 375 can display for example the pressure 354 and/or moisture 357 over time along with the environmental data 360 (e.g., changing ambient conditions). One or more manual intervention 339 can be rendered on the display 378. The manual intervention 339 can also vibrate the computing device 306 or send an audio alarm so that the individual (or caregiver) can take the appropriate intervention to prevent the formation of a pressure injury. "Caregivers" as described herein, without intending to be limiting, can be non-user individuals such as trainers, rehab therapists, wellness coaches, nurses, doctors, and other medical personnel.

Also, any logic or application described herein, including the application 315, analytics application 318, caregiver application 372 that comprises software or code can be embodied in any non-transitory computer-readable medium for use by or in connection with an instruction execution system such as, for example, a processor 803 in a computer system or other system. In this sense, the logic can comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including, for example, static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Methods of Using Pressure Intervention Systems

Methods of using pressure intervention systems according to the present disclosure include providing one or more actuation systems and/or pressure intervention systems according to the present disclosure. In embodiments, methods as described herein can further comprise positioning a subject in relation to actuation systems or pressure intervention systems according to the present disclosure. In embodiments, methods of using pressure intervention systems according to the present disclosure can include executing a set of actuation instructions that are provided to the actuation system or pressure intervention system by the user and/or a caregiver.

Risk Determination and Methods of Prevention

Methods of predicting, alleviating or slowing, and/or preventing pressure injuries (for example pressure injuries) are also provided. Aspects of methods of the present disclosure include determining that an individual (i.e. subject in need thereof) is at risk for developing a pressure injury can include the application determining that the pressure or the moisture measured or sensed by the sensing component exceeds a threshold. The threshold can be, for example, a particular pressure or a particular moisture level or value, and/or a particular period of time or time duration during which the pressure and/or moisture threshold is exceeded.

Methods according to the present disclosure can include automatic interventions. Automatic interventions are interventions determined by systems and/or applications of the present disclosure that provide instructions to actuation systems and/or moisture control systems as described herein without user and/or caregiver input. Such automatic interventions can be instigated by systems as described herein, for example, if values received from a sensing network cross a set or pre-determined thresholds (set/determined by a database according to best patient practices or one programmed according to a specific patient's profile, for example).

Methods according to the present disclosure can include manual interventions. In embodiments, manual interventions as described herein can comprise the user executing or otherwise sending instructions from an application (e.g., from a smartphone, tablet) to the system to initiate an intervention either at will, in response to an alert generated by the system, or both. In embodiments, manual interventions as described herein can comprise a non-user caregiver providing instructions to a system used by a user/subject as described herein either at will, in response to an alert, or both.

In embodiments, determining that the individual is at risk for developing a pressure injury can include the application determining that the pressure and/or the moisture exceeds a threshold value, for example at an interface location. In response to determining that the individual is at risk for developing a pressure injury, the application can alert or trigger a manual intervention or an automated intervention or both regarding the individual and one or more points of contact, or interface locations, between the individual and the equipment or device. In embodiments, the systems can also include an analytics system configured to apply one or more machine learning techniques to create a knowledge base for anticipating and predicting, alleviating or slowing, and/or preventing formation of pressure injuries.

In embodiments, the methods can include obtaining, from a fabric-based sensing component ("fabric-based sensor"), one or more measurements corresponding to a pressure or a moisture associated with at least one point of contact at an interface location between the individual and the equipment or device through the fabric-based sensor that can include a pressure sensing and/or a moisture sensing component. The methods can also include determining that the individual is at risk for developing a pressure injury at an interface location based at least in part on one or more pressure and/or moisture measurements. In response to determining that the individual is at risk for developing a pressure injury, the method(s) can alert or trigger a manual intervention or an automated intervention between the individual and the equipment or device with which the individual is in contact, in particular at the interface location. Determining that the individual is at risk for developing a pressure injury can include determining that at least one of the measurements exceeds a threshold value. In any one or more aspects, determining that the individual is at risk for developing a pressure injury can include determining that a composite assessment of a pressure and a moisture exceeds a threshold value.

In response to determining that the individual is at risk for developing a pressure injury, the application can alert or trigger a manual intervention or an automated intervention. The system can also include an analytics system configured to apply machine learning techniques to create a knowledge base for anticipating and avoiding formation of pressure injuries based on the measured or sensed pressure(s) and moisture(s).

Methods of preventing pressure injuries are also provided. The methods can include obtaining, from a sensor (such as a fabric-based sensor) or measurements/values provided by a user, one or more measurements corresponding to a pressure or a moisture or both, associated with at least one contact point of an individual at an interface location between the individual and a piece of equipment or device (such as described herein) through the fabric-based sensor. The methods can also include determining that the individual is at risk for developing a pressure injury at the interface location based at least in part on the one or more measurements. In response to determining that the individual is at risk for developing a pressure injury, the method(s) can alert or trigger a manual intervention or an automated intervention or both. Determining that the individual is at risk for developing a pressure injury can include determining that at least one of the measurements exceeds a threshold or threshold value such as that described above. In any one or more aspects herein, determining that the individual is at risk for developing a pressure injury can include determining that a composite assessment of the pressure and the moisture measurements or measured values exceeds a threshold or threshold value such as that described above.

In some examples, the system 100 can trigger one or more automated interventions when specific thresholds of pressure, duration, environmental data, and/or calculated composite measurements are reached. Automated interventions can include activating actuator assemblies within or associated with the equipment or device to effect a controlled movement of an individual, vibrate a contact point, etc. Likewise, an automated intervention can include causing a fan or other air circulation system to provide ventilation to and reduce moisture at the contact point. In one embodiment, the user can affect the intervention, viz., move the actuator assembly, in particular one or more actuator heads via the movement of the actuator, and/or turn on the fan through the MANS App on the tablet or smartphone. The system 100 can trigger an intervention based on a particular sensor of a fabric-based sensor, or based on an aggregate of measurements of sensors to identify a body part affected. The system 100 can provide features of manual interventions for alerting caregivers in healthcare settings to intervene, e.g., move the patient or a specific part of the body of the patient or individual.

The system 100 can also serve as a data acquisition platform to facilitate Big Data analytics and the resulting insights should be valuable to clinicians and designers of equipment, such as wheelchairs, cribs, and beds. For example, patients are typically "turned around" every two hours to avoid the formation of pressure injuries. System 100 can provide real-time data that, over time, can lead to "evidence-based" decision-making thereby enhancing the quality of care for the SCI individual. In a non-hospital setting, the SCI individual can suitably alter the seating/usage pattern to avoid the formation of pressure injuries. Thus the system 100 can significantly enhance the quality of care for patients in long-term care in hospitals while reducing healthcare costs.

The roles of pressure and moisture or wetness at one or more points of contact between an individual and a surface, such as an underlying surface (a bed, chair, seat or crib) or an adjacent surface (for example, a surface of a brace or cast) in causing discomfort to individuals and the conditions for the onset of pressure injuries can be investigated in consultation with dermatologists, hospital intensivists, and expert physicians treating SCI individuals. Such investigation can lead to pressure and/or moisture values that are specific to a user and surface that generates pressure injuries on the user. Such values can be used to determine a set of actuation instructions that can be provided by a user and/or caregiver to an actuation system and/or pressure intervention system according to the present disclosure.

Transmission of the one or more measurements of pressure and/or moisture and/or processed signals of the one or more measurements can be over a wired or wireless connection, such as a network, to a laptop and subsequently migrated to wireless transmission through Bluetooth® or Zigbee® protocols to a remote device (e.g., a smartphone, a tablet, or a laptop). The developed algorithms can be implemented on the individual or caregiver's device (e.g., a smartphone, a tablet, or a laptop), which can present an intervention "alert" to the SCI individual or caregiver. In an automatic intervention mode, it can trigger the actuator assemblies and moisture control (i.e. ventilation system) to change the ambient conditions at the surface contact points.

A factor in predicting, alleviating, slowing, and/or preventing the formation of pressure injuries is to change the conditions at the contact points between the body and the underlying surface (wheelchair, seat, crib, bed, brace or cast) before a threshold (such as a pressure and/or moisture threshold) is reached. The system 100 can for example relieve and change pressure distribution by physically changing the contact points by actuating one or more of the actuation system components as in a piano keyboard. The system 100 can also change the localized atmospheric conditions at the surface contact points, and hence the moisture or wetness levels, by circulating air through a built-in ventilation system. As the skilled artisan would understand, changing localized moisture levels in the relation systems and the user/subject in need thereof can be accomplished by other means than a fan, for example heating, e.g., by incorporating heating coils, thermoelectric (Peltier effect), etc.

With reference again to FIGS. 3 and 8, various applications and/or other functionality can be executed in the computing device 303 according to various embodiments. Also, various data is stored in a data store 312 that is accessible to the computing device 303. The data store 312 can be representative of a plurality of data stores 312 as can be appreciated. The data stored in the data store 312, for example, is associated with the operation of the various applications and/or functional entities described below.

The components executed on the computing device 303, for example, include an application 315, an analytics application 318, and other applications, services, processes, systems, engines, or functionality not discussed in detail herein. The application 315 is executed in order to predict, alleviate or slow and/or prevent the formation of a pressure injury (also known as pressure injury) at an interface or point of contact between an individual and a surface, such as an underlying surface in the case of a wheelchair 321 or bed, crib, or other equipment 324 or an adjacent surface of a device such as in the case of a brace or cast. Equipment 324 is not limited to beds and cribs, and can include automobile seats, office chairs, neck braces, respiratory equipment, or any other equipment where an individual is in contact with a surface of the equipment or device and the individual is at risk for the formation of a pressure injury at an interface or point of contact between the individual and the other equipment 324.

The application 315 can perform various functions associated with the prediction, alleviation or slowing and/or prevention of pressure injuries as will be described. To this end, the application 315 can trigger automated intervention 333, automated intervention 336, or manual intervention 339 as described in any aspect herein.

The data stored in the data store 312 includes, for example, sensor data 342, individual data 345, machine learning model data 348, caregiver data 351, and potentially other data. The sensor data 342 includes information aggregated from a plurality of sensors in the fabric-based distributed sensor network of the system 100, including pressure 354 and/or moisture 357. The sensor data 342 can also include environmental data 360.

The system 100 can integrate the effects of parameters that can cause pressure injuries, for example: pressure 354 and moisture 357 at the interface of the individual and the surface the wheelchair 321 or the other equipment 324. Environmental data 360 can include measurements related to ambient conditions (temperature and relative humidity) that impact the skin's shear properties further exacerbating the individual's susceptibility to pressure injuries. The coefficient of friction is another parameter that can be measured at an interface as described herein. Capturing and storing these measurements, e.g., pressure 354 and moisture 357, in the data store 312 allows alerting or triggering an intervention based on a measurement of the pressure 354 or the moisture 357 or a composite assessment of two or more measured parameters.

The machine learning model data 348 can correspond to data for one or more machine learning models used to ascertain various thresholds for prevention of a pressure injury and where an automated intervention 333, automated intervention 336, or manual intervention 339 should be alerted or triggered. Thresholds can for example be based on the pressure 354, moisture 357, and/or environmental data 360. Also, a camera or other image acquisition device can be employed to take a picture of one or more interface(s) between an individual and the wheelchair 321 or the other equipment 324 to allow the system 100 to assess the condition of the interface(s) and make a determination.

Machine learning model data 348 can also help determine risk of pressure injuries based on correlations between sensor data 342 and individual data 345. Individual data 345 relates to an individual who may be at risk for a pressure injury at the interface between the individual and the wheelchair 321 or the other equipment 324. For example, the Braden Scale for Predicting Pressure Sore Risk describes a clinical assessment that includes Sensory Perception, Moisture, Activity, Mobility, Nutrition, and Friction and Shear associated with an individual who may be at risk for a pressure sore. Machine learning model data 348 can combine data from the sensor data 342 with the individual's electronic medical record (EMR) 363 and a personal health record (PHR) 366 to determine correlation between a pressure injury and various data, such as nutrition, that may be present in the EMR 363 or the PHR 366.

Individual data 345 also includes device configuration 369 which relates to configuration of one or more devices associated with the wheelchair 321 or the other equipment 324. For example, the computing device 303 can use the device configuration data 369 to configure the application 315 running on the computing device 306 (e.g., a smartphone, a tablet, or a laptop) to receive from the fabric-based sensing component 327, 330 and wirelessly (e.g., using Bluetooth® or Zigbee® protocols) trigger the automated intervention 333, automated intervention 336, or manual intervention 339. Device configuration data 369 can include configurations based on Apple's ResearchKit® open source software to facilitate integration with HealthKit®.

In some embodiments, the computing device 306 will process measurements obtained from fabric-based sensing component 327, 330 and determine whether to trigger an automated intervention 333, automated intervention 336, or alert a manual intervention 339. In some example embodiments, a single-board computer or an inexpensive processor can be used for signal processing. The manual intervention 339 can be sent to the computing device 306 (e.g., a smartphone, a tablet, or a laptop) associated with the individual or caregiver. The caregiver data 351 is stored to allow the system 100 to alert a caregiver to intervene, such as through manual intervention 339 (e.g., reposition an individual who may be at risk for a pressure injury). The manual intervention can require that the caregiver enter into the system the manual intervention action taken by the caregiver in response to the alert. This can take the form of the caregiver providing a description of the nature of the manual intervention given and entering it into the system. It can also take the form of requiring that the caregiver photograph the area of the individual that is the subject of the alert and capturing the photograph into the system.

The system 100 can also be used to develop a knowledge base for design of SCI aids. The data stored in the data store 312 of the system 100 can be processed and analyzed using machine learning algorithms. A knowledge base of rules establishing the relationship between the real-world data collected by the system 100 when using a wheelchair and its design can be developed applying the principles of knowledge engineering to develop knowledge-based decision support systems. The system 100 data and the knowledge base rules can be used for enhancing the design (and performance) of current generation of aids by equipment manufacturers (e.g., wheelchairs, beds, etc.). As described, the system 100 allows data to be acquired and analyzed from spinal cord injury individuals—both in real-time and over long periods of time—to better understand the individual's requirements and to enhance the design and performance of the current generation of assistance devices/equipment, such as wheelchairs and prosthetics. Such rules can include actuator assembly movements (extension and/or retraction of individual actuator assemblies), information on timing of movements, information on operation of the moisture control device, information on the movements, and the like.

Figure 4A:
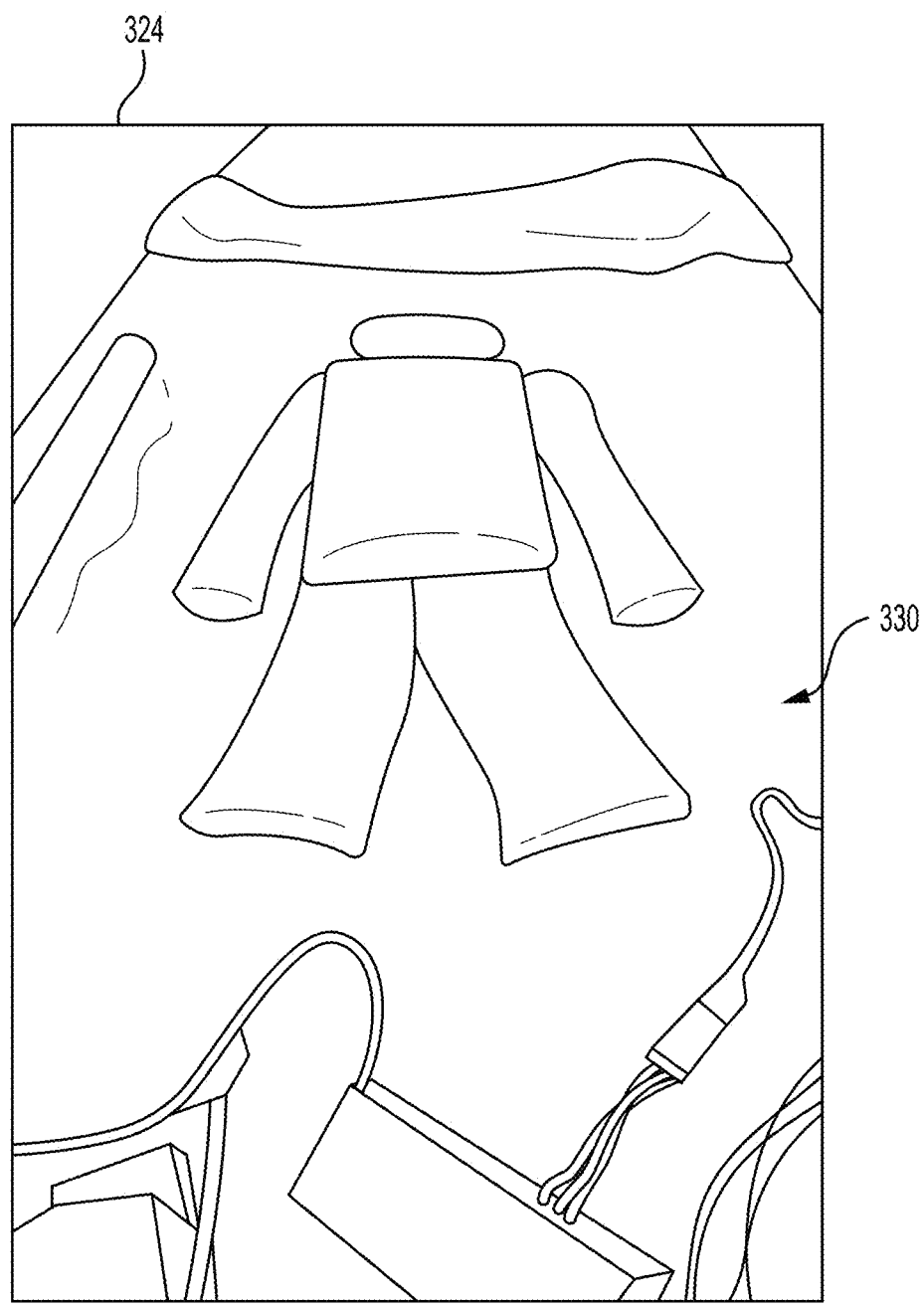
FIG. 4A depicts an embodiment of a fabric-based sensor that is configured to be between an individual and equipment of the present disclosure

FIG. 4B depicts an example user interface 450 showing an intensity based on pressure measurements rendered in a 12×24 grid or array. The user interface 450 is an example of the system 100 causing the computing device 306 to render the UI 375. In this example, an intensity based on pressure 354 is rendered in a 12×24 grid corresponding to aggregated measurements from a fabric-based sensing component 330 associated with other equipment 324 (FIG. 4A). In some examples, the user interface 450 can be used by an individual to visualize what is happening to him or her when sitting in the wheelchair 321 (FIG. 3) or when in contact with a surface of other equipment 324.

Figure 5:
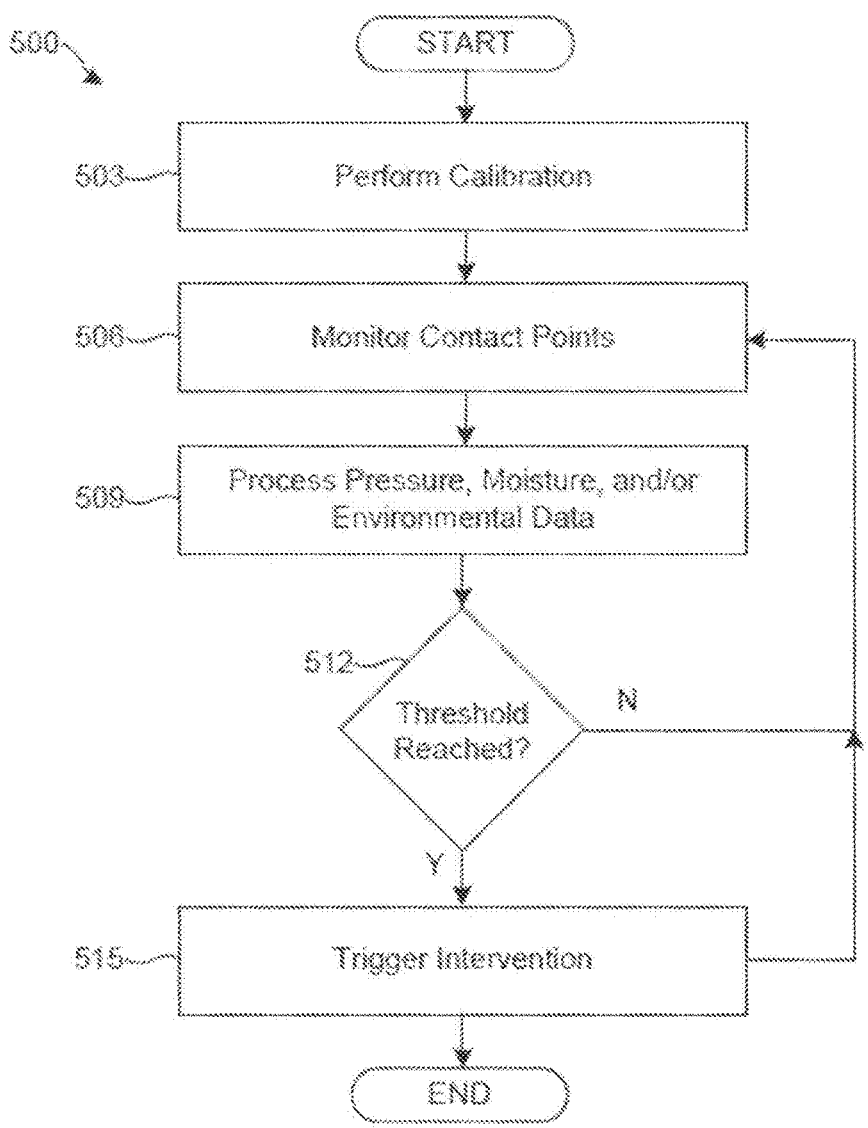
FIG. 5 shows an exemplary flow chart of a method according to the present disclosure.

With reference to FIG. 5, shown is a flowchart 500 that shows steps of a method implemented by the system 100. Alternatively, FIG. 5 provides one example of the execution of the application 315 for detecting, alleviating or slowing and/or preventing the formation of a pressure injury in accordance with various embodiments of the present disclosure. FIG. 5 can also be seen as an example flowchart 500 for a processor on a single board computer for a system 100 for detecting, alleviating or slowing and/or preventing the formation of a pressure injury in accordance with various embodiments of the present disclosure.

Accordingly, at box 503, the system 100 can perform a calibration process for detecting, alleviating or slowing and/or preventing the formation of a pressure injury. For example, the application 315 of the system 100 can use a calibration process to obtain reference points (e.g., a hardness) for the wheelchair 321 or the other equipment 324. Weights of the fabric-based sensing component 327, 330, or their pressure sensing components and moisture sensing components can also be obtained. Alternatively, the weight of the moisture sensing component, or any other weight, can be obtained periodically. The system 100 can also set a threshold for risk of pressure injury. For example, the application 315 can set a defined duration and degree of pressure 354 (or moisture 357) below which the risk of pressure injury is deemed to be acceptable. The threshold can also account for environmental data 360.

At box 506, the system 100 can monitor contact points by obtaining pressure 354, moisture 357, or environmental data 360 from the fabric-based sensing component 327, 330. The application 315 can monitor the fabric-based sensing component 327, 330 as calibrated in box 503. Accordingly, with the fabric-based sensing component 327, 330 in place on the wheelchair 321 or the other equipment 324, the contact points between the individual and the wheelchair 321 or the other equipment 324 can be sensed. In this way, the application 315 can obtain from the fabric-based sensing component 327, 330 a measurement that corresponds with an individual's risk of pressure injury.

At box 509, the application 315 can process pressure 354, moisture 357, or environmental data 360 obtained from the fabric-based sensing component 327, 330. The processing can for example aggregate pressure 354 to identify a body part affected. In other examples, the processing can use a weight of the moisture sensing component to increase a threshold for the pressure 354.

At box 512, the application 315 can determine whether the threshold is reached. For example, if the fabric-based sensing component 327, 330 detects a measurement that is above a threshold or threshold value defined in box 503 or box 509, this condition can be associated with an individual who is at risk for a pressure injury. The application 315 can determine that the individual is at risk for a pressure injury due for example to an assessment of pressure 354, moisture 357, environmental data 360 or a composite assessment of two or more of the data. If the application 315 determines that the individual is at risk for a pressure injury, the process continues to box 515.

If the application 315 determines that the threshold has not been reached, this condition can be associated with an individual who is not currently at risk for a pressure injury.

The application 315 can for example determine that a Braden scale score associated with the individual is below a threshold, or that a duration and degree of pressure 354 (or moisture 357) is below the threshold.

The application 315 can also use fabric-based sensing component 327, 330 to determine that the individual has recently been repositioned. Further, the application 315 can adjust the threshold based on individual data 345 such as the EMR 363 or the PHR 366. In this way, the application 315 can use non-time based factors to determine whether the threshold has been reached, and does not have to determine that a threshold has been reached based on whether the individual has been repositioned within a fixed amount of time (e.g., 15 minutes or two hours in some protocols). If the threshold is not reached, then the process can return to box 506. Alternatively, in some implementations, the process can end if the threshold is not reached or the individual is determined to not be at risk for a pressure injury.

At box 515, the application 315 can trigger the automated intervention 333, automated intervention 336, or alert a manual intervention 339. The application 315 can activate actuator assemblies to actively control portions of the wheelchair 321 or the other equipment 324. The automated intervention 333, 336 can also be triggered to turn on one or more fans to ventilate contact surface points associated with the wheelchair 321 or the other equipment 324.

The manual intervention 339 can also include an instruction for a caregiver to take a picture of an interface area (or a body party of the individual). The application 315 can receive the picture and store the picture in the data store 312, such as in individual data 345. The application 315 can determine, for example based on the picture and the data stored in the sensor data 342, that it is unnecessary for a wound specialist to physically visit the individual. An alert can also be sent that requires a confirmation by a caregiver, for example to be entered into and stored within the system 100. The application 315 can prevent the caregiver from acknowledging the alert when values of pressure 354 indicate the pressure has not been removed and/or based on the application 315 determining that an appropriate picture has not been received in the data store 312. In some embodiments, the system 100 can render a user interface to allow the wound specialist to view the picture, monitor the condition of the skin, and view and/or update assessments (e.g., Braden scale), and permit the wound specialist to refrain from physically visiting the individual. Thereafter, the process can return to box 506. Alternatively, in some implementations, the process can proceed to completion.

Figure 6:
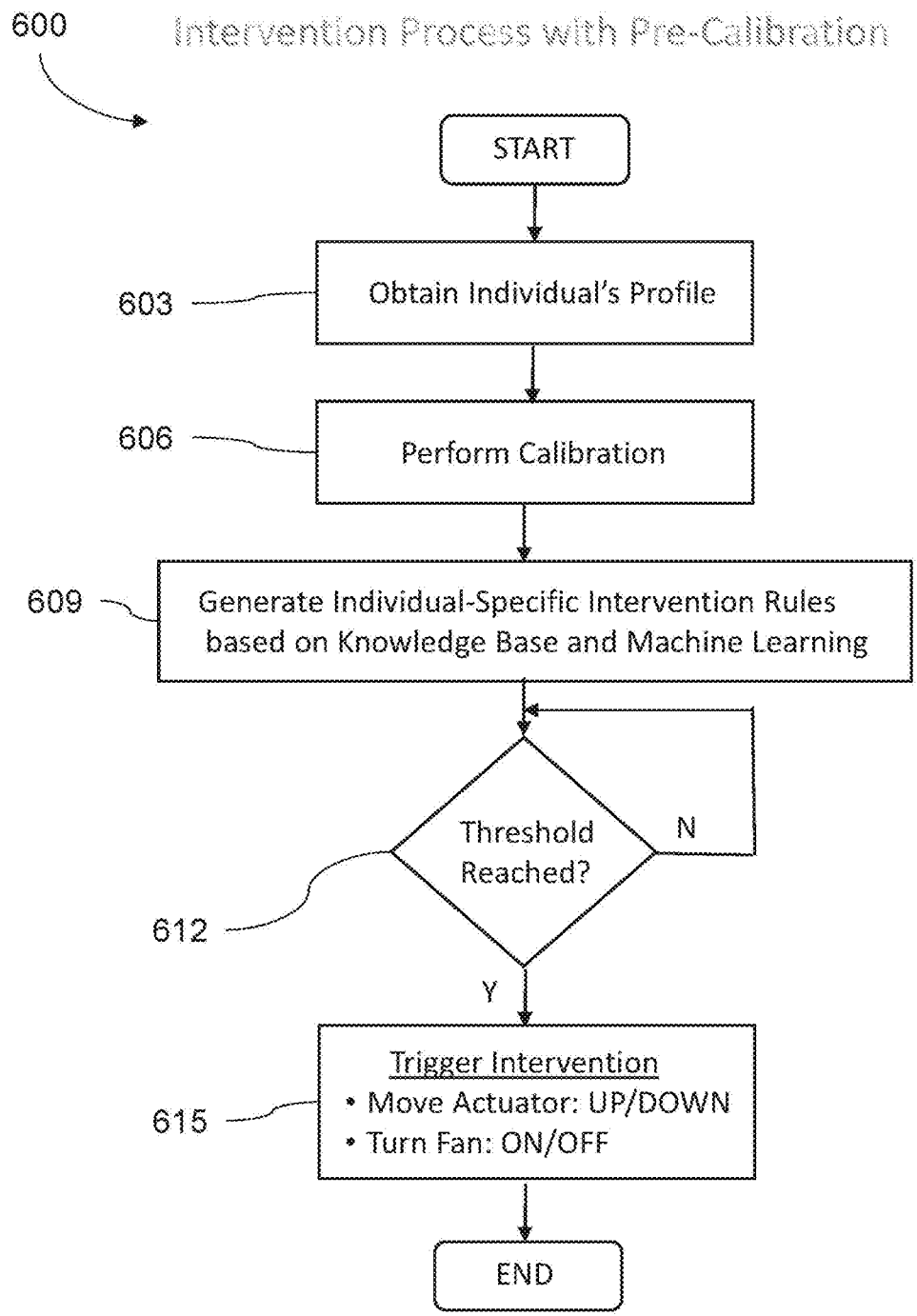
FIG. 6 shows another exemplary flow chart of a method according to the present disclosure.

With reference to FIG. 6, shown is a flowchart 600 that shows steps of a method implemented by the system 100. Alternatively, FIG. 6 provides one example of the execution of the application 315 for detecting, alleviating or slowing and/or preventing the formation of a pressure injury (i.e. injury) in accordance with various embodiments of the present disclosure. FIG. 6 can also be seen as an example flowchart 600 for a processor on a single board computer for a system 100 for detecting, alleviating or slowing and/or preventing the formation of a pressure injury in accordance with various embodiments of the present disclosure.

Accordingly, at box 603, the system 100 can obtain an individual's profile. Such a profile can be determined by a medical professional according to previous measurements of an individual, previous pressure injuries of an individual, or both. At box 606, the system 100 can perform a calibration process for detecting, alleviating or slowing and/or preventing the formation of a pressure injury based on the obtained profile in 603. For example, the application 315 of the system 100 can use a calibration process to obtain reference points (e.g., a hardness) for the wheelchair 321 or the other equipment 324. Weights of the fabric-based sensing component 327, 330, or their pressure sensing components can also be obtained. Alternatively, the weight of the moisture sensing component, or any other weight, can be obtained periodically. The system 100 can also set a threshold for risk of pressure injury. For example, the application 315 can set a defined duration and degree of pressure 354 (or moisture 357) below which the risk of pressure injury is deemed to be acceptable. The threshold can also account for environmental data 360.

At box 609, the system 100 (through automatic intervention) or application 315 (through manual intervention by a user) can generate individual-specific intervention rules based on a knowledge base and/or machine learning (from data stored locally, or via wireless or other cloud-based services). Such intervention rules can include information on movement of actuator assemblies of the system 100, such as degree and duration of movement, and can include information on moisture control system[s] (for example a ventilation system and/or one or more fans), such as on/off and degree and duration of operation.

At box 612, the system 100 and/or application 315 can determine whether the threshold is reached. For example, if a sensing component is used, the fabric-based sensing component 327, 330 can detect a measurement that is above a threshold or threshold value defined in box 603 or box 609, this condition can be associated with an individual who is at risk for a pressure injury. The application 315 can determine that the individual is at risk fora pressure injury due for example to an assessment of pressure 354, moisture 357, environmental data 360 or a composite assessment of two or more of the data. If the application 315 and/or system 100 determines that the individual is at risk for a pressure injury, the process continues to box 615.

If the application 315 determines that the threshold has not been reached, this condition can be associated with an individual who is not currently at risk for a pressure injury. The application 315 can for example determine that a Braden scale score associated with the individual is below a threshold, or that a duration and degree of pressure 354 (or moisture 357) is below the threshold.

The application 315 can also use fabric-based sensing component 327, 330 to determine that the individual has recently been repositioned. Further, the application 315 can adjust the threshold based on individual data 345 such as the EMR 363 or the PHR 366. In this way, the application 315 can use non-time based factors to determine whether the threshold has been reached, and does not have to determine that a threshold has been reached based on whether the individual has been repositioned within a fixed amount of time (e.g., 15 minutes or two hours in some protocols). If the threshold is not reached, then the process can return to box 606. Alternatively, in some implementations, the process can end if the threshold is not reached or the individual is determined to not be at risk for a pressure injury. In one embodiment, (for the process shown in slide #7 in updated deck), the first step is calibration so that the intervention can be customized and effected based on the knowledge base in the system and without continuous (real-time) monitoring of pressure and moisture under the seated individual.

At box 615, the application 315 can trigger the automated intervention 333, automated intervention 336, or alert a manual intervention 339 (a manual intervention that, for example, can be entered manually by a user through the application 315). The application 315 can activate actuator assemblies to actively control portions of the wheelchair 321 or the other equipment 324. The automated intervention 333, 336 can also be triggered to turn on one or more fans to ventilate contact surface points associated with the wheelchair 321 or the other equipment 324.

The manual intervention 339 can also include an instruction for a caregiver to take a picture of an interface area (or a body party of the individual) and/or passively monitor the pressure and/or moisture at the interface points. The application 315 can receive the picture and store the picture in the data store 312, such as in individual data 345. The application 315 can determine, for example based on the picture and the data stored in the sensor data 342, that it is unnecessary for a wound specialist to physically visit the individual. An alert can also be sent that requires a confirmation by a caregiver, for example to be entered into and stored within the system 100. The application 315 can prevent the caregiver from acknowledging the alert when values of pressure 354 indicate the pressure has not been removed and/or based on the application 315 determining that an appropriate picture has not been received in the data store 312. In some embodiments, the system 100 can render a user interface to allow the wound specialist to view the picture, monitor the condition of the skin, and view and/or update assessments (e.g., Braden scale), and permit the wound specialist to refrain from physically visiting the individual. Thereafter, the process can return to box 606. Alternatively, in some implementations, the process can proceed to completion.

Figure 7:
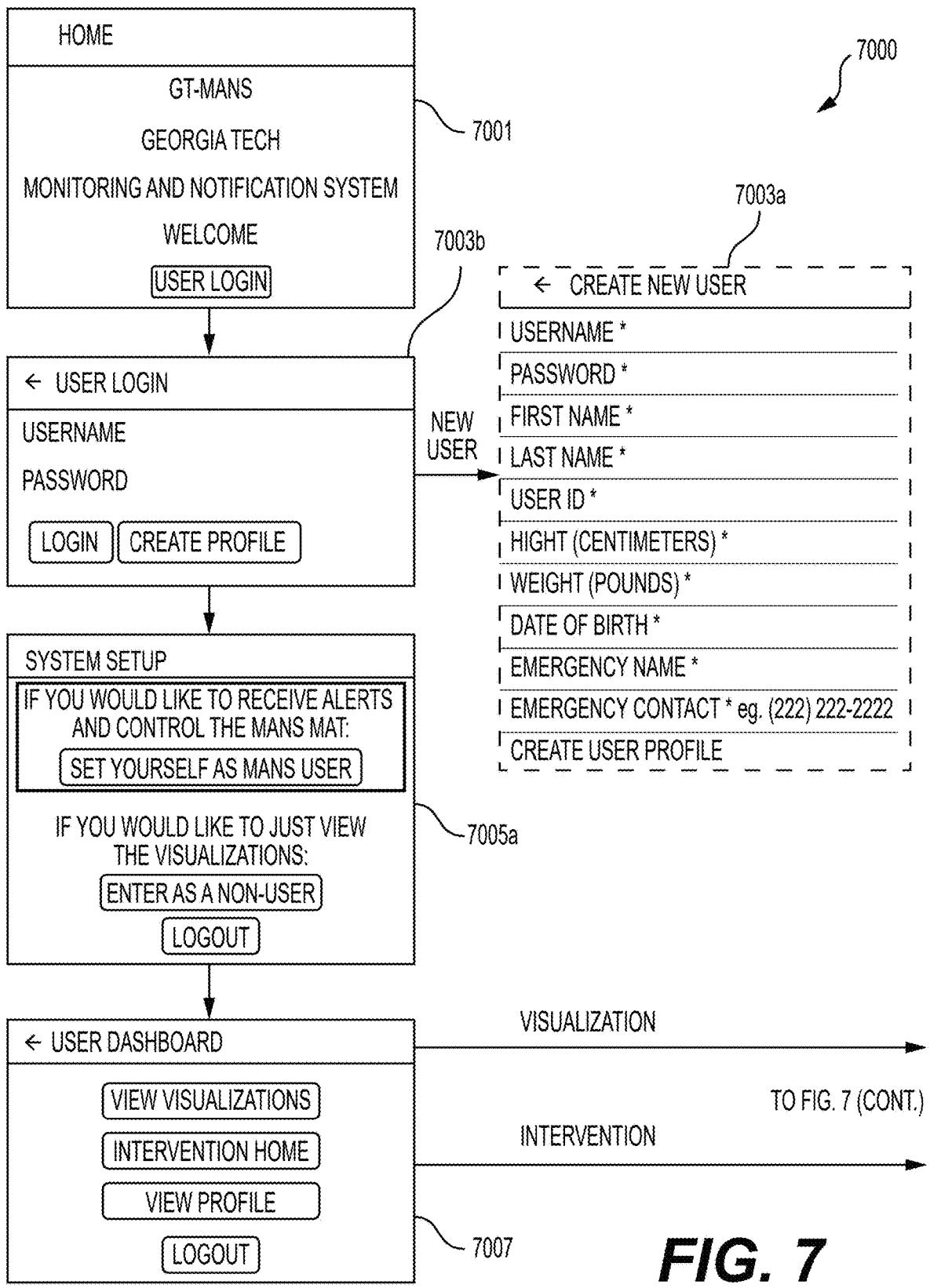
FIG. 7 shows screenshots illustrating the functioning of the MANS application (App) and the intervention system according to the present disclosure.
Figure 7:
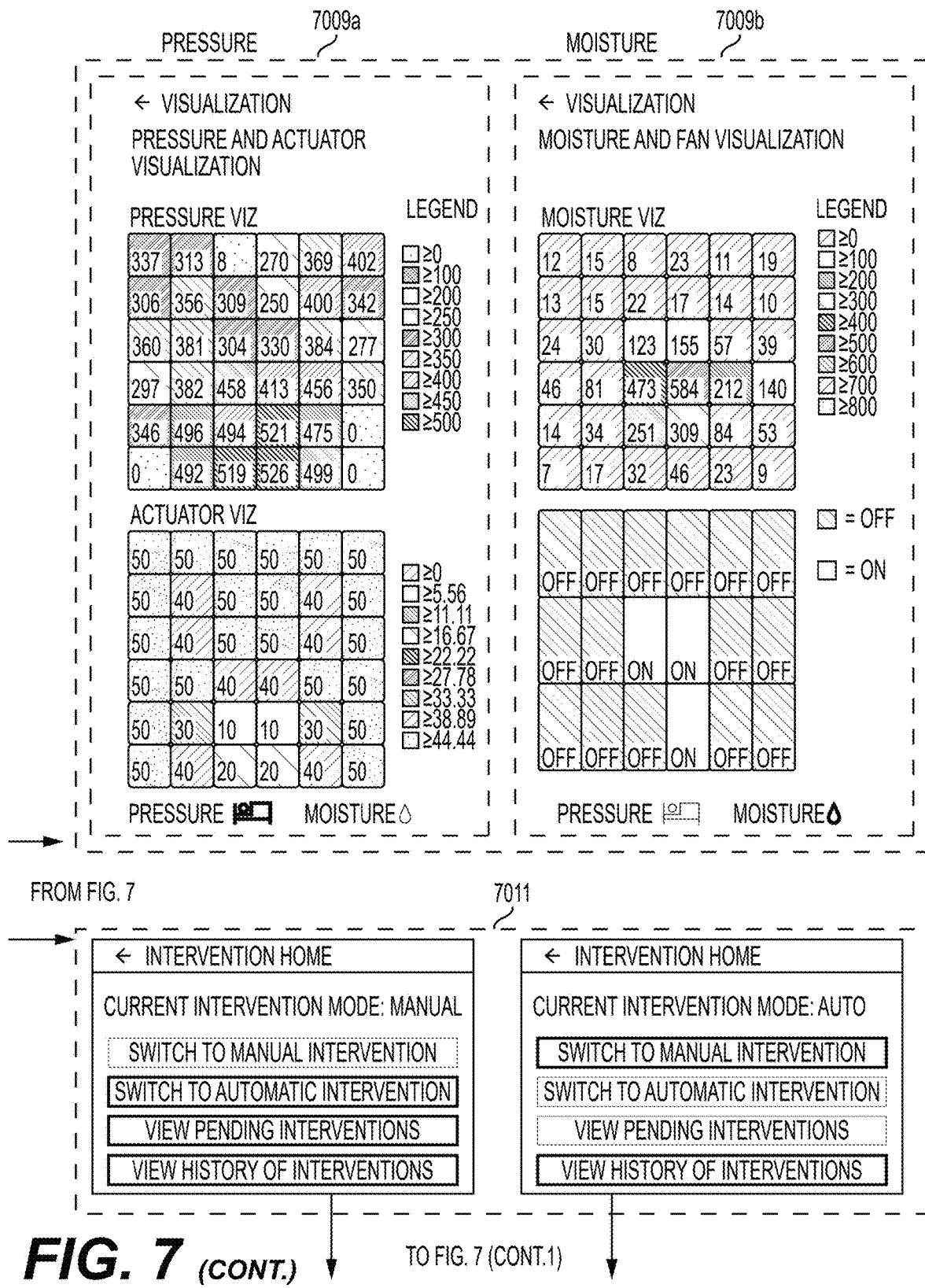

FIG. 7 shows an embodiment of a method 7000 of the present disclosure, in particular of method of executing steps on an application according to the present application. According to the method 7000, a welcome screen 7001 is populated upon execution. At the login screen 7003b, a user can either login, leading to the system setup screen 7005a, or create a new profile using the screen 7004a. After login though the login screen 7003b, a user enters the system setup screen 7005a and either identifies as a user 7005a or a non-user 7005b (option appropriated for caregivers and the like). After user status identification through screen 7005, the individual is taken a dashboard 7007. At the dashboard 7007, the individual can view pressure visualizations 7009a or moisture visualizations 7009b or go the intervention home 7011. From the intervention home 7011, an individual can then view pending interventions 7013a or a history of interventions 7013b. If, at system setup 7005, an individual identifies as a non-user 7005b, the manual and/or automatic intervention will be inactive, and the non-user will only be able to view the pressure visualization 7009a or moisture visualization 7009b from the user dashboard 7007, or view the history of interventions 7013b and/or pending interventions 7013a from the intervention home 7011. With reference to the embodiment of FIG. 7, the first step is calibration so that the intervention can be customized and effected based on the knowledge base in the system and without continuous (real-time) monitoring of pressure and moisture under the seated individual. The method 7000 can be executed by an application 315 as part of the system 100 or as part of a computing device that interfaces with the system 100.

With reference to the embodiment of FIG. 7, the first step is calibration so that the intervention can be customized and effected based on the knowledge base in the system and without continuous (real-time) monitoring of pressure and moisture under the seated individual.

Although the flowchart of FIGS. 5-7 show a specific order of execution, it is understood that the order of execution can differ from that which is depicted. For example, the order of execution of two or more blocks can be scrambled relative to the order shown. Also, two or more blocks shown in succession in FIGS. 5-7 can be executed concurrently or with partial concurrence. Further, in some embodiments, one or more of the blocks shown in FIGS. 5-7 can be skipped or omitted (in favor, e.g., conventional pressure injury risk mitigation approaches). In addition, any number of counters, state variables, warning semaphores, or messages can be added to the logical flow described herein, for purposes of enhanced utility, accounting, performance measurement, or providing troubleshooting aids, etc. It is understood that all such variations are within the scope of the present disclosure.

In various aspects, the present systems and methods can comprise one or more fabric-based sensors that can be placed between an individual and a wheelchair, seat, bed, crib, or other equipment or device upon which the individual can sit or lie or with which the individual is in contact. The fabric-based sensor(s) can comprise a combination of material types, fabric structures (single, multilayer, and their inherent variations), and manufacturing technologies (weaving, knitting and fabric finishing, and combinations thereof) and a combination of woven/knitted structures and sensors.

The present pressure injury prediction, alleviation and/or prevention systems and methods help predict, alleviate or slow, and/or prevent the formation of pressure injuries in individuals—from newborn to the elderly. They can include a prediction/prevention application, an analytics application, and/or a caregiver application for implementation on various computing environments including a single-board computer or a server, smartphone, a tablet, laptop, or other computing device. The systems and methods can alert or trigger a manual intervention or an automated intervention regarding the individual and the individual's contact with the equipment.

In an embodiment, a system for predicting, alleviating or slowing, and/or preventing the formation of pressure injuries is provided. The system can include a fabric-based sensing component (also referred to herein as a "fabric-based sensor"). The fabric-based sensor can include one or more sensors such as one or more pressure sensors or one or more moisture sensors or both. In some examples, the fabric-based sensor can include a pressure sensing component, or a moisture sensing component, or both. When both a pressure sensing component and a moisture sensing component are provided an insulator can be provided between the moisture sensing component and the pressure sensing component. The fabric-based sensor can be configured to be placed between an individual and a wheelchair, seat, bed, crib, or other equipment or device upon which the individual can sit or lie or with which the individual is in contact (such as a body brace, e.g., a neck brace, a knee brace, etc., or a body cast). In any one or more aspects, the pressure sensing component can include two high conductive fabrics configured to make contact through a low conductive fabric forming a pressure sensor. It can be configured to detect or measure a pressure at an interface location between the fabric-based sensor and the individual. In any one or more aspects, the moisture sensing component can include two conductive fabrics placed adjacent or next to each other forming a moisture sensor, the two conductive fabrics optionally separated by an insulating fabric, wherein moisture closes the circuit in the moisture sensor when moisture passes or percolates from one of the conductive fabrics to the other of the conductive fabrics. It can be configured to detect or measure moisture at an interface location between the fabric-based sensor and the individual. The fabric-based sensor can also include interconnections to route signals from the one or more pressure sensing components and the one or more moisture sensing components or both to a network or a computing device.

In any one or more aspects, the system(s) can include a computing device with a processor, a data store, and an application that, when executed, causes the computing device to determine that an individual is at risk for developing a pressure injury at an interface location between the individual and the equipment or device with which the individual is in contact through the fabric-based sensor that can include a pressure sensing and/or a moisture sensing component.

The application can obtain, from the fabric-based sensor, at least one measurement corresponding to a pressure and/or a moisture associated with at least one point of contact through the fabric-based sensor between the individual and an interface location. The system(s) can also obtain a reading of an environmental condition such as a temperature or a relative humidity in relation to or at or about the interface location.

Determining that the individual is at risk for developing a pressure injury can include the application determining that the pressure and/or the moisture exceeds a threshold value, for example at an interface location. In response to determining that the individual is at risk for developing a pressure injury, the application can alert or trigger a manual intervention or an automated intervention or both regarding the individual and one or more points of contact, or interface locations, between the individual and the equipment or device. The systems can also include an analytics system configured to apply one or more machine learning techniques to create a knowledge base for anticipating and predicting, alleviating or slowing, and/or preventing formation of pressure injuries.

Methods of predicting, alleviating or slowing, and/or preventing pressure injuries are also provided. The methods can include obtaining, from a fabric-based sensing component ("fabric-based sensor"), one or more measurements corresponding to a pressure or a moisture associated with at least one point of contact at an interface location between the individual and the equipment or device through the fabric-based sensor that can include a pressure sensing and/or a moisture sensing component. The methods can also include determining that the individual is at risk for developing a pressure injury at an interface location based at least in part on one or more pressure and/or moisture measurements. In response to determining that the individual is at risk for developing a pressure injury, the method(s) can alert or trigger a manual intervention or an automated intervention between the individual and the equipment or device with which the individual is in contact, in particular at the interface location. Determining that the individual is at risk for developing a pressure injury can include determining that at least one of the measurements exceeds a threshold value. In any one or more aspects, determining that the individual is at risk for developing a pressure injury can include determining that a composite assessment of a pressure and a moisture exceeds a threshold value.

A pressure injury system can optionally include a fabric-based sensing component ("fabric-based sensor") and a computing device. The fabric-based sensor can include one or more sensors comprising a pressure sensor or a moisture sensor or both. The computing device can include a processor and an application that can include program instructions stored in memory and executable by the processor that, when executed, can cause the computing device to determine that an individual is at risk for developing a pressure injury at an interface location between the individual and a surface of a piece of equipment or device with which the individual is in contact through the fabric-based sensor, and in response to determining that the individual is at risk for developing the pressure injury at the interface location, alert a manual intervention or trigger an automated intervention or both. The surface can be a surface of any of the aforementioned equipment or devices, such as a chair, crib, bed, wheel chair, or other equipment or a device (such as a body brace or cast), and the fabric-based sensor can be between the individual and the surface.

The program instructions can cause the computing device to obtain, from the fabric-based sensor, at least one measurement corresponding to at least one of: a pressure or a moisture value associated with at least one contact point between the individual and the equipment or device at an interface location. The program instructions can also cause the computing device to process the at least one measurement of the pressure or the moisture value. Determining that the individual is at risk for developing a pressure injury can comprise determining that the at least one measurement exceeds a designated threshold value. The program instructions can cause the computing device to obtain a reading of an environmental condition in relation to or at or about the interface location.

The pressure injury system can include a data store. The program instructions can cause the computing device to store the at least one measurement in the data store. The pressure injury system can include an analytics system configured to apply machine learning techniques to the at least one measurement to create a knowledge base for anticipating, avoiding and/or preventing formation of pressure injuries.

Methods for predicting, alleviating or slowing, and/or preventing pressure injuries are also provided, wherein the methods include obtaining, from a fabric-based sensing component ("fabric-based sensor"), one or more measurements corresponding to at least one of: a pressure and a moisture value associated with at least one contact point of an individual at an interface location between the individual and a surface with which the individual is in contact as described elsewhere herein. The surface can be a surface of a chair, crib, bed, wheelchair, or other equipment or a device (such as a body brace or cast), and the fabric-based sensor can be placed between the individual and the surface. The fabric-based sensor can include a pressure sensing component configured to detect or measure the pressure or a moisture sensing component configured to detect or measure the moisture or both at the interface location.

The method(s) can include determining that the individual is at risk for developing a pressure injury at one or more interface locations based at least in part on the one or more measurements, and in response to determining that the individual is at risk for developing the pressure injury, alerting a manual intervention or triggering an automated intervention or both. The fabric-based sensor can include a plurality of pressure sensors or moisture sensors or both.

In any one or more embodiments and aspects herein, the method(s) can include processing the one or more measurements. Determining that the individual is at risk for developing the pressure injury can include determining that at least one of the plurality of measurements exceeds a designated threshold value. Determining that the individual is at risk for developing a pressure injury can also include determining that a composite assessment of the pressure and the moisture value exceeds a designated threshold value or values. The methods can include obtaining a reading of an environmental condition in relation to or at or about the interface location.

A fabric-based sensing component ("fabric-based sensor") is provided that can include a pressure sensing component, or a moisture sensing component, or both and optionally an insulator between the moisture sensing component and the pressure sensing component. The pressure sensing component can be configured to detect a pressure at an interface location between an individual and a surface (such as described herein) with which the individual is in contact through the fabric-based sensor. The pressure sensing component can include two high conductive fabrics configured to make contact through a low conductive fabric. The moisture sensing component can be configured to detect a moisture at an interface location between an individual and a surface (such as described herein) with which the individual is in contact through the fabric-based sensor. The moisture sensing component can include two conductive fabrics placed next to or adjacent each other such that when moisture passes from one of the conductive fabrics to the other of the conductive fabrics, the moisture closes a circuit between the fabrics. Optionally, a substrate or insulating fabric can be provided between the two conductive fabrics through which the moisture can pass from the one conductive fabric to the other conductive fabric to form the moisture sensing component. The pressure sensing component can include an array of pressure sensors and the moisture sensing component can include an array of moisture sensors configured to obtain pressure and moisture readings at multiple interface locations between the individual and the surface of the equipment or device. The fabric-based sensor can also include interconnections to route signals from the pressure sensing component and the moisture sensing component to a computing device. In various aspects herein, the fabric-based sensor can include both a pressure sensing component and a moisture sensing component (such as described in any one or more aspects herein), one of the sensing components formed as a layer on top of the other sensing component, optionally with an insulating layer placed in between the two sensing component layers.

In an embodiment, a pressure injury system is provided, comprising: a fabric-based sensing component; and a computing device comprising: a processor; and an application comprising program instructions stored in memory and executable by the processor that, when executed, cause the computing device to: determine that an individual is at risk for developing a pressure injury at an interface location between the individual and a surface with which the individual is in contact through the fabric-based sensing component; and in response to determining that the individual is at risk for developing a pressure injury at the interface location, alert a manual intervention or trigger an automated intervention between the individual and the surface.

In any one or more aspects of the system, the program instructions can cause the computing device to obtain, from the fabric-based sensing component, at least one measurement corresponding to at least one of: a pressure or a moisture value associated with at least one contact point between the individual and the surface through the fabric-based sensing component at the interface location. The program instructions can cause the computing device to process the at least one measurement of the pressure or the moisture value. Determining that the individual is at risk for developing the pressure injury can comprise determining that the at least one measurement exceeds a designated threshold value. The system can comprise a data store and the program instructions can cause the computing device to store the at least one measurement in the data store. The system can further comprise an analytics system configured to apply machine learning techniques to the at least one measurement to create a knowledge base for anticipating and avoiding formation of pressure injuries. The program instructions can cause the computing device to obtain a reading of an environmental condition. The alert for a manual intervention can require a caregiver for the individual to acknowledge the alert by entering a response into the system. The at least one measurement can be transmitted to a data store for storing electronic medical records. The fabric-based sensing component can comprise a pressure sensing component or a moisture sensing component or both.

In an embodiment, a method for alleviating pressure injuries is provided, comprising: obtaining, from a fabric-based sensing component, one or more measurements corresponding to at least one of: a pressure or a moisture value associated with at least one contact point of an individual at an interface location between the individual and a surface with which the individual is in contact through the fabric-based sensing component; determining that the individual is at risk for developing a pressure injury at the interface location based at least in part on the plurality of measurements; and in response to determining that the individual is at risk for developing the pressure injury, alerting a manual intervention or triggering an automated intervention between the individual and the surface.

In any one or more aspects, the method can comprise: processing the one or more measurements; and wherein determining that the individual is at risk for developing a pressure injury can comprise determining that at least one of the one or more measurements exceeds a designated threshold value. Determining that the individual is at risk for developing a pressure injury can comprise determining that a composite assessment of the pressure and the moisture value exceeds a designated threshold value or values. The method can comprise obtaining a reading of an environmental condition. The fabric-based sensing component can comprise a pressure sensing component configured to detect a pressure, or a moisture sensing component configured to detect the moisture, or both, at the interface location. The method can further comprise: receiving a picture of the interface location; and rendering a user interface to allow a wound specialist to view the picture. The alert for a manual intervention can comprise requiring a caregiver for the individual to acknowledge the alert by entering a response into a system. The one or more measurements can be transmitted to a data store for storing electronic medical records.

In an embodiment, a fabric-based sensing component is provided, comprising: a pressure sensing component; a moisture sensing component; and an insulator between the moisture sensing component and the pressure sensing component. In any one or more aspects, the pressure sensing component is configured to detect a pressure at an interface location between an individual and a surface with which the individual is in contact through the fabric-based sensing component. The moisture sensing component is configured to detect a moisture at an interface location between an individual and a surface with which the individual is in contact through the fabric-based sensing component. The pressure sensing component can comprise two high conductive fabrics configured to make electrical contact through a low conductive fabric. The moisture sensing component can comprise two conductive fabrics configured to make contact through moisture between the two conductive fabrics. The fabric-based sensing component can comprise interconnections to route signals from the pressure sensing component and the moisture sensing component to a computing device.

In any one or more aspects of any one or more embodiments herein the fabric-based sensing component can comprise a plurality of sensors comprising at least a pressure sensor or a moisture sensor. The pressure sensing component can comprise a plurality of pressure sensors for detecting or measuring a pressure at a plurality of interface locations. The moisture sensing component can comprise a plurality of moisture sensors for detecting or measuring a moisture at a plurality of interface locations. The plurality of pressure sensors can be located or positioned in an array to cover an area or the entire body of the individual. The plurality of moisture sensors can be located or positioned in an array to cover an area or the entire body of the individual. The array of pressure sensors and/or the array of moisture sensors can be configured to obtain pressure and/or moisture readings at multiple interface locations between the individual and the surface. The surface can be a surface of a chair, crib, bed, wheelchair, or other equipment or device for supporting a body or a body part of the individual, and the fabric-based sensing component can be placed between the individual and the surface.

EXAMPLES

Now having described various embodiments of the disclosure, in general, the examples below describe some additional embodiments. While embodiments of the present disclosure are described in connection with the examples and the corresponding text and figures, there is no intent to limit embodiments of the disclosure to these descriptions. On the contrary, the intent is to cover all alternatives, modifications, and equivalents included within the spirit and scope of embodiments of the present disclosure.

Example 1

Embodiments of Systems of the Present Disclosure (Or Aspects Thereof)

FIG. 1 depicts one example of a system 100 of the present disclosure. The system 100 has a unit cell 103 of a fabric-based sensor of a fabric-based sensor network. The system 100 is a textile-based Pressure Injury Prevention System (PUPS) that is designed to predict, detect, alleviate or slow and/or prevent the occurrence of pressure injuries for individuals—from newborns to the elderly—who may be at risk for development of a pressure injury due, e.g., to lying or sitting for a prolonged period of time on a surface such as a bed, chair, crib or other equipment on which the individual may lie or sit, or for a prolonged period of time of contact with a surface of a device such as a brace or cast.

The unit cell 103 can have one or more sensors 105, 107 (see, e.g., FIG. 2) to monitor the parameters of pressure and/or wetness (moisture) at the contact surface points between an individual and the surface. The one or more pressure sensors 105 can be positioned in contact with or can comprise a low conductive fabric sandwiched in between high conductive fabric to form a pressure sensing component. The one or more moisture sensors 107 can be formed of two or more layers of conductive fabric positioned to make contact through the flow of moisture therebetween. The two or more layers can for example be positioned with a top and bottom layer (see, e.g., FIG. 2). When both a pressure sensing component and a moisture sensing component are provided together in the system 100 a moisture insulating layer or barrier can be placed between the pressure sensing and moisture sensing components to prevent moisture from passing through the barrier from the moisture sensing component to the pressure sensing component.

Sensor(s) 105, 107 can be monitored and measured periodically to determine a duration and/or a degree of pressure, amount and/or duration of moisture, etc. The system 100 can process the data using algorithms based on the duration and degree of pressure and/or moisture, and determine an appropriate intervention, which can be effected manually through an alert to the individual (or caregiver) or through actuator assemblies and/or a moisture control (for example a ventilation) system built on into the underlying surface, such as shown in FIG. 1. The data can also be stored to create large data sets on which analytics can be performed to develop better interventions and/or serve as a research database for pressure injuries in different populations. The intervention can be in the form of moving or causing the individual to move or roll over to relieve the pressure and/or reduce the moisture at the measured or determined interface or point of contact or otherwise transfer pressure from one point of contact to another point of contact.

FIG. 2 is an example architecture of a unit cell 103 of a sensing component of a fabric-based sensor network. Each moisture and pressure sensing unit cell 103 can have, for example, an array of 16 pressure and 8 moisture sensors distributed over a nominal 6"×6" surface area, which can be changed to meet specifications or as preferred. This density of sensors can give the desired sensitivity or resolution of the parameters for accurate monitoring of pressure and/or moisture at the surface contact points over different areas. The elegance of the proposed sensor architecture and its realization in a textile fabric lies in the ability to configure and customize the resolution to suit the desired monitoring location. For instance, the number of sensors for monitoring the ischial tuberosities will be different from that needed at the lateral malleolus. A unit cell 103 can easily be combined with other unit cells 103 to create sensing component comprising the sensors 105, 107 and fabric-based sensor of a needed dimension, for example 12"×12" or 18"×18". In developing a unit cell 103, processing capabilities (I/O pins) of the hardware have been taken into consideration so that the unit cell 103 can be scaled up or down to meet the desired application.

As depicted in FIG. 2, a unit cell 103 can include one or more pressure sensors 105 positioned in contact with or can comprise a low conductive fabric sandwiched in between high conductive fabric to form a pressure sensing component. The unit cell 103 can also include one or more moisture sensors 107 positioned to make contact through the flow of moisture therebetween. The unit cell 103 as depicted can include a top layer and a bottom layer. In some aspects, one or more pressure sensors 105 can be disposed in the bottom layer and one or more moisture sensors 107 can be disposed in the top layer. Example applications, as will be discussed further with respect to FIG. 3, can include a fabric sensing component that can be used by an individual in a wheelchair, or other chair or seat, bed, or crib, or a brace or cast. The fabric sensing component can monitor the parameters of pressure and/or wetness at the contact surface points of individuals, e.g., spinal cord injury (SCI) individuals in wheelchairs and in beds or individuals having to wear a brace or a cast for a prolonged period of time.

With reference to FIG. 3, shown is a schematic block diagram of a system 100 that provides monitoring, analysis, and notification for enhancing the quality of life of individuals susceptible to pressure injuries. The system 100 includes at least one computing device 303 and one or more computing devices 306, which are in data communication with each other via a network 309. The network 309 includes, for example, the internet, intranets, extranets, wide area networks (WANs), local area networks (LANs), wired networks, wireless networks, cable networks, satellite networks, or other suitable networks, etc., or any combination of two or more such networks.

The computing device 303 can comprise, for example, a server computer or any other system providing computing capability. Alternatively, the computing device 303 can employ a plurality of computing devices that can be arranged, for example, in one or more server banks, computer banks, or other arrangements. Such computing devices can be located in a single installation or can be distributed among many different geographical locations. For example, the computing device 303 can include a plurality of computing devices that together can comprise a hosted computing resource, a grid computing resource, and/or any other distributed computing arrangement. In some cases, the computing device 303 can correspond to an elastic computing resource where the allotted capacity of processing, network, storage, or other computing-related resources can vary over time.

In some examples, the fabric-based sensing component 327, 330 includes a pressure sensing component, a moisture sensing component, and an insulator between the moisture sensing component and the pressure sensing component. The fabric-based sensor 327, 337 is configured to be placed between an individual and the wheelchair 321 or other equipment 324 as described herein. The pressure sensing component of the fabric-based sensing component 327, 337 can include two high conductive fabrics configured to make contact through a low conductive fabric and is configured to detect a pressure at an interface location, as described in any one or more aspects herein. The moisture sensing component of the fabric-based sensing component 327, 337 can include two conductive fabrics configured to make contact through moisture and configured to detect and measure moisture at an interface location, as described in any one or more aspects herein. In any one or more aspects herein, high conductive can refer to a surface resistivity of between about 0.002 and about 8 ohms per square, and low conductive can refer to a surface resistivity of between about 10E3 and 10E13 ohms per square. The surface resistivity can also be a resistivity of one or more of a silver coated nylon thread, a metal clad nylon or aramid yarn, a carbon-based sheath, a conductive ink, and/or plastic such as Polyethylene (PE)/Polypropylene (PP)/Polyethylene terephthalate (PET). The fabric-based sensing component 327, 337 can also include interconnections to route signals representative of a pressure and/or moisture level from the pressure sensing component or the moisture sensing component or both to the computing device 303 or the computing device 306.

In any one or more aspects herein, the interface location refers to at least one contact point of the individual and the wheelchair 321 or the other equipment 324 or device through the fabric-based sensing component. As described, the fabric-based sensing component 327, 330 can be placed between the individual and the wheelchair 321 or the other equipment 324 or device. The system 100 can obtain, from the fabric-based sensing component 327, 330, at least one measurement corresponding to a pressure 354 and/or a moisture 357 associated with the at least one contact point between the individual and the associated surface, such as the wheelchair 321 or the other equipment 324 or device. As the fabric-based sensing component 327, 330 can be between the individual and the wheelchair 321 or the other equipment 324, contact can be through the fabric-based sensing component 327, 330. The fabric-based sensing component 327, 330 can be in contact with a body or a portion of a body of the individual and/or the underlying surface such as the wheelchair 321 or the bed, crib, or other equipment 324 or device.

The fabric-based sensing component 327, 330 can include one or more unit cells 103 with sensors 105, 107 and data buses that have been integrated using weaving, knitting, embroidery, sewing/stitching, printing or other manufacturing techniques. Proposed manufacturing technologies and design parameters are also discussed with regards to FIG. 9. The performance of these techniques can determine a preferred method for the production of the fabric-based sensing component 327, 330. Interconnections route the signals from sensors 105, 107 to the network 309. The fabric-based sensing component 327, 330 can be soft, comfortable, shape-conformable, and produced so that it does not impede the mobility or position of the individual due to its presence at the interface of the body and the surface (wheelchair or bed, etc., respectively).

The fabric-based sensing component 327, 330 can be made from any textile fabric, like knitted fabric, woven fabric, and metamaterial such as thin foil or film. A fabric-based distributed sensor network is provided that is unobtrusive, shape-conforming, breathable, comfortable, and customizable. The fabric-based sensing component 327, 330 can be a part of a bedsheet on equipment 324, or a seat (or seat cushion) on wheelchair 321 or device and like any other natural article used by an individual. Moreover, one or more sensor densities in the fabric-based sensing component 327, 330 can be varied to suit the degree of desired resolution in each location on the body thus providing an additional degree of flexibility in customizing the solution.

The modularity built into the design of the system 100 allows deployment of the fabric-based sensing component 327, 330 to selective pressure points (e.g., only on the back of the head and heels) and yet enable the seamless integration of the data from all the desired locations. This flexibility is helpful for the clinician to target specific body locations that are more likely to be susceptible to pressure injuries. Likewise, it can help the SCI individual focus on specific vulnerable areas depending on the nature and level of activity when using the wheelchair 321 or other equipment.

Sensors 105, 107 of the fabric-based sensor network can be distributed according to the application, such as wheelchair 321 or other equipment 324. In the example of fabric-based sensing component 327, it might be preferred to use a different material in between the sensors so that it can stretch between slats of the wheelchair 321. More sensors can be distributed towards the back, where pressure injuries tend to occur, with fewer sensors distributed towards the front. For the fabric-based sensor 330, it might be preferable to evenly distribute sensors along the surface of the bed or crib 324. The fabric-based sensor network can include one or more sensors 105, 107 connected for example by a conductive textile fiber yarn (e.g., metal-clad nylon or aramid, or stainless steel). The one or more sensors 105, 107 can be connected to form a data bus within the fabric-based sensing component 327, 330. The data bus can accommodate various bus widths and simplify (or reduce) the number of conductive fiber connections between the fabric-based sensing component 327, 330 and the application 315. For example a row of twelve sensors 105, 107 can be merged into a single data bus so the application 315 can use a single conductive fiber connection to receive one or more signals sent by the sensors 105, 107.

The computing device 306 is representative of a plurality of devices that can be coupled to the network 309. The computing device 306 can comprise, for example, a processor-based system such as a computer system. Such a computer system may be embodied in the form of a desktop computer, a laptop computer, personal digital assistants, cellular telephones, smartphones, web pads, tablet computer systems, or other devices with like capability. The computing device 306 may include a display 378. The display 378 can comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The computing device 306 can be configured to execute various applications such as a caregiver application 372 and/or other applications such as an automatic intervention. The caregiver application 372 can be executed in a computing device 306, for example, to access network content served up by the computing device 306 and/or other servers, thereby rendering a user interface 375 on the display 378. To this end, the caregiver application 372 can comprise, for example, a browser, a dedicated application, etc., and the user interface 375 can comprise a network page, an application screen, etc. The computing device 306 can be configured to execute applications beyond the caregiver application 372 such as, for example, clinical application, word processors, spreadsheets, and/or other applications.

FIG. 4A depicts an example of a pressure sensing component of a fabric-based sensing component 330 that is between an individual and other equipment 324. The example of the fabric-based sensing component 330 shown includes a pressure sensing component with three layers. The pressure sensing component measures pressure where two high conductive fabrics make contact through a low conductive (high resistive) fabric. The fabric-based sensing component can be seen in FIG. 4A as a plurality of one-inch squares.

In FIG. 4A it may be noticed that the arrangement of sensors forms a 24×12 fabric-based sensor network within the fabric-based sensing component 330 with corresponding data buses. Each row has 12 sensors (again, the one-inch squares depicted in FIG. 4A). While 12 sensors are depicted, the number of sensors implemented can be more or less than 12. Similarly, the data bus can vary. A conductive textile fiber/yarn (e.g., metal-clad nylon or aramid, or stainless steel) allows each row of sensors to be connected to the system 100 (FIG. 3) which includes the network 309 (FIG. 3). While any textile fabric can be used, the fabric-based sensing component 330 shown was created using knitted fabric. Knitted fabric can stretch and provide a good recovery rate.

The fabric-based sensing component 330 can also include a moisture sensing component. The moisture sensing component can include a high conductive material which is a woven fabric. The moisture sensing component can be configured similarly as the pressure sensing component, for example the arrangement of sensors can form a 24×12 sensor array. The moisture sensing component can have two layers. The moisture sensing component for example can measure moisture where two layers of conductive fabrics make contact through moisture between the layers. As with the pressure sensing component, the number of sensors and the data bus of the moisture sensing component can vary.

With reference to FIG. 8, shown is a schematic block diagram of a computing device 303 that can be used to implement the system 100 of FIG. 3 according to various embodiments of the present disclosure. The computing device 303 includes at least one processor circuit, for example, having a processor 803 and a memory 806, both of which are coupled to a local interface 809. To this end, the computing device 303 can comprise, for example, at least one server computer or like device. The local interface 809 can comprise, for example, a data bus with an accompanying address/control bus or other bus structure as can be appreciated.

The computing device 303 can include an input/output device such as a display. The input/output device can comprise, for example, one or more devices such as a keyboard, mouse, gesture input device, touch screen (resistive, capacitive, or inductive), microphone, liquid crystal display (LCD) display, gas plasma-based flat panel display, organic light emitting diode (OLED) display, projector, or other types of input/output device, etc.

Stored in the memory 806 are both data and several components that are executable by the processor 803. In particular, stored in the memory 806 and executable by the processor 803 can be a application 315, an analytics application 318, and an operating system 812, and/or other applications. Also stored in the memory 806 can be a data store 312 and other data. The computing device 303 can also include one or more converter(s) to interface with cameras and/or system peripherals.

It is understood that there can be other applications that are stored in the memory 806 and are executable by the processor 803 as can be appreciated. For example, applications can include Apple's ResearchKit® open source software to facilitate integration with HealthKit® and take advantage of the wellness and healthcare ecosystem offered by the iOS platform. Examples of the system 100 can be implemented on the iOS platform, the Android platform, or various other operating system 812 as can be appreciated.

Where any component discussed herein is implemented in the form of software, any one of a number of programming languages can be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 806 and are executable by the processor 803. In this respect, the term "executable" means a program file that is in a form that can ultimately be run by the processor 803. Examples of executable programs can be, for example, a compiled program that can be translated into machine code in a format that can be loaded into a random access portion of the memory 806 and run by the processor 803, source code that may be expressed in proper format such as object code that is capable of being loaded into a random access portion of the memory 806 and executed by the processor 803, or source code that may be interpreted by another executable program to generate instructions in a random access portion of the memory 806 to be executed by the processor 803, etc. An executable program can be stored in any portion or component of the memory 806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 806 is defined herein as including both volatile and nonvolatile memory and data storage components. Volatile components are those that do not retain data values upon loss of power. Nonvolatile components are those that retain data upon a loss of power. Thus, the memory 806 can comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM can comprise, for example, static random access memory (SRAM), dynamic random access memory (DRAM), or magnetic random access memory (MRAM) and other such devices. The ROM can comprise, for example, a programmable read-only memory (PROM), an erasable programmable read-only memory (EPROM), an electrically erasable programmable read-only memory (EEPROM), or other like memory device.

Also, the processor 803 can represent multiple processors 803 and the memory 806 can represent multiple memories 806 that operate in parallel processing circuits, respectively. In such a case, the local interface 809 can be an appropriate network that facilitates communication between any two of the multiple processors 803, between any processor 803 and any of the memories 806, or between any two of the memories 806, etc. The local interface 809 can comprise additional systems designed to coordinate this communication, including, for example, performing load balancing. The processor 803 can be of electrical or of some other available construction.

Although the application 315, analytics application 318, caregiver application 372, and other various systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

Figure 9:
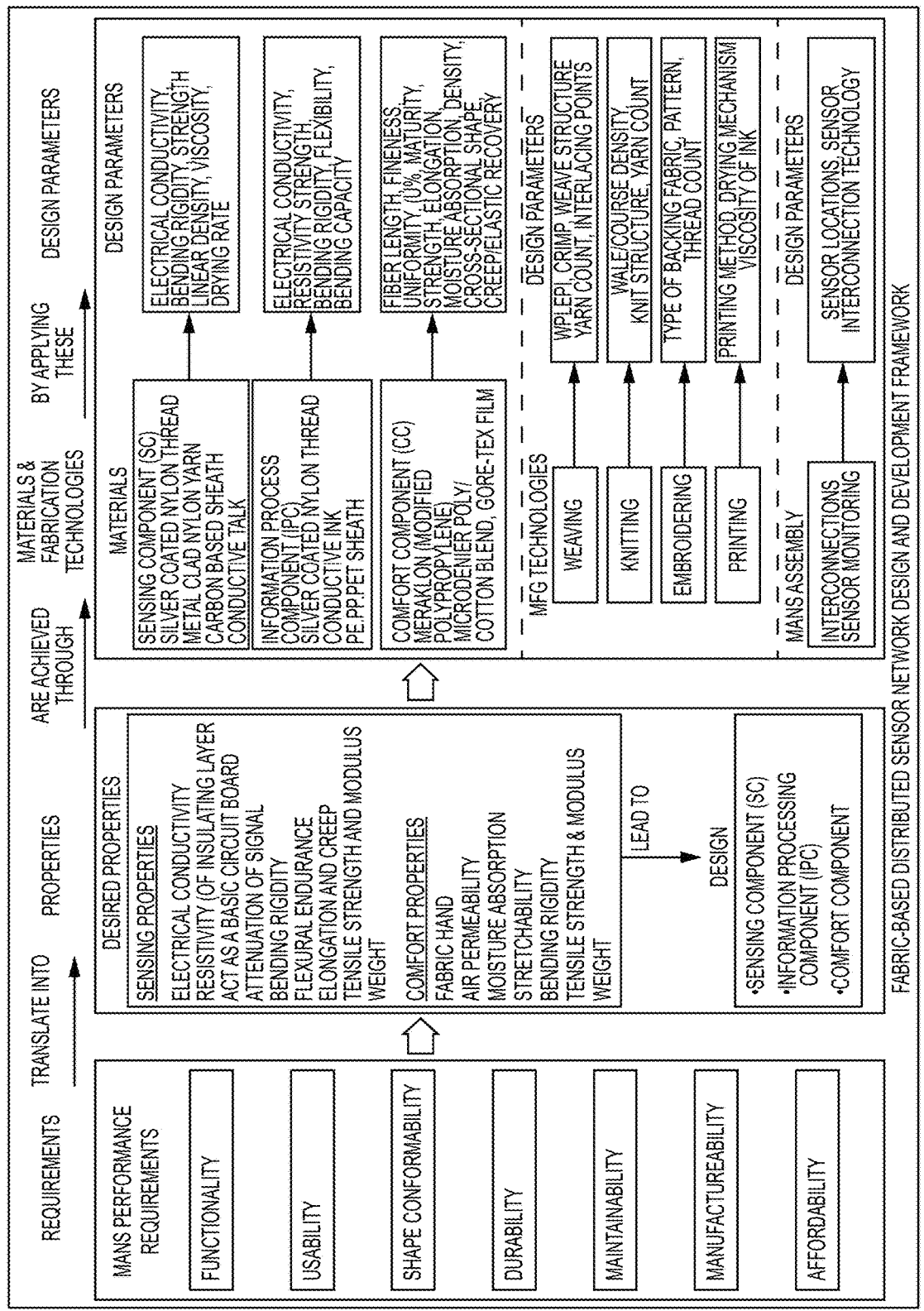
FIG. 9 shows an embodiment of a design and development framework for a prevention system of the present disclosure
Figures 10A, 10B, 10C:
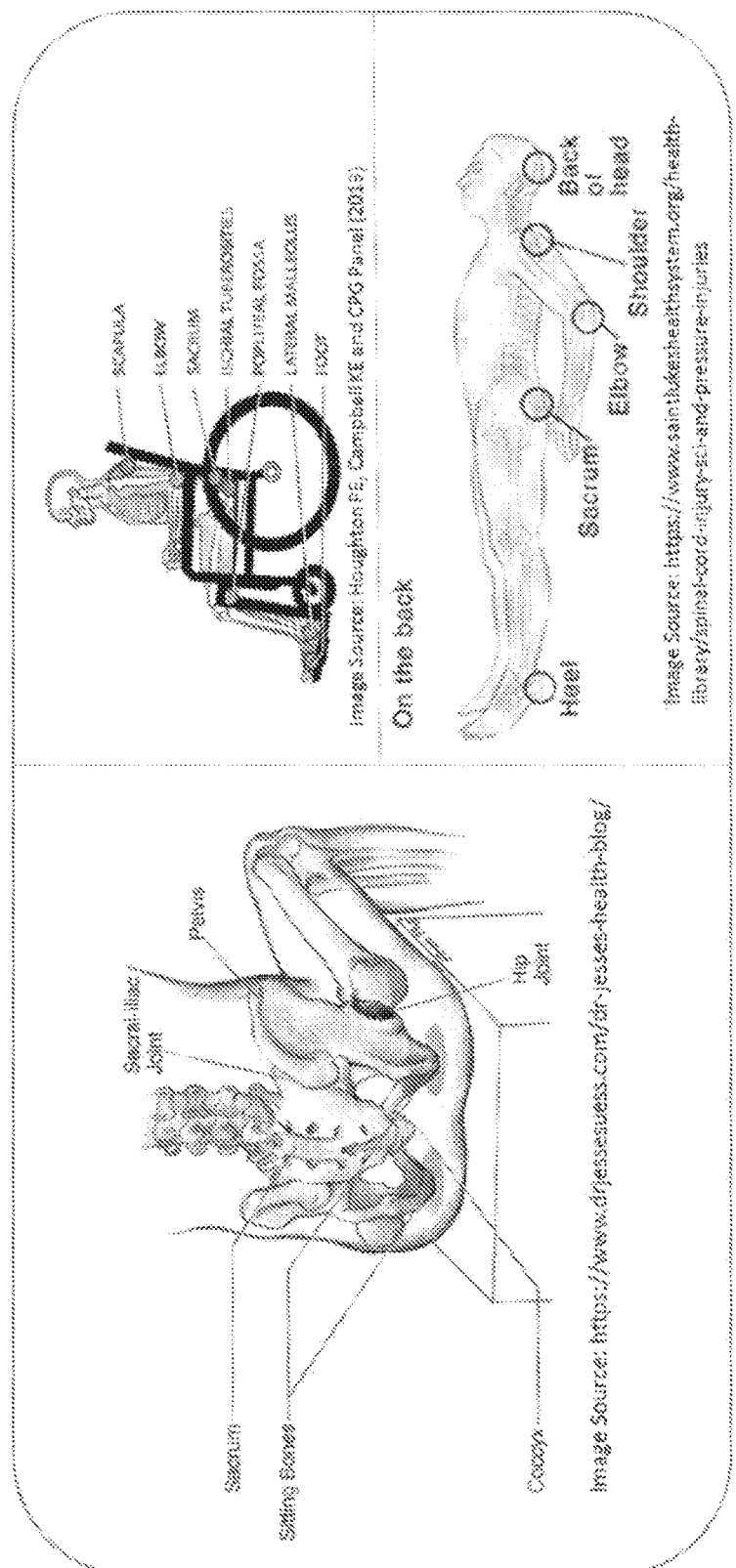
FIGS. 10A-10D illustrate the primary causes and locations of pressure injuries (aka pressure ulcers).
Figure 10D:
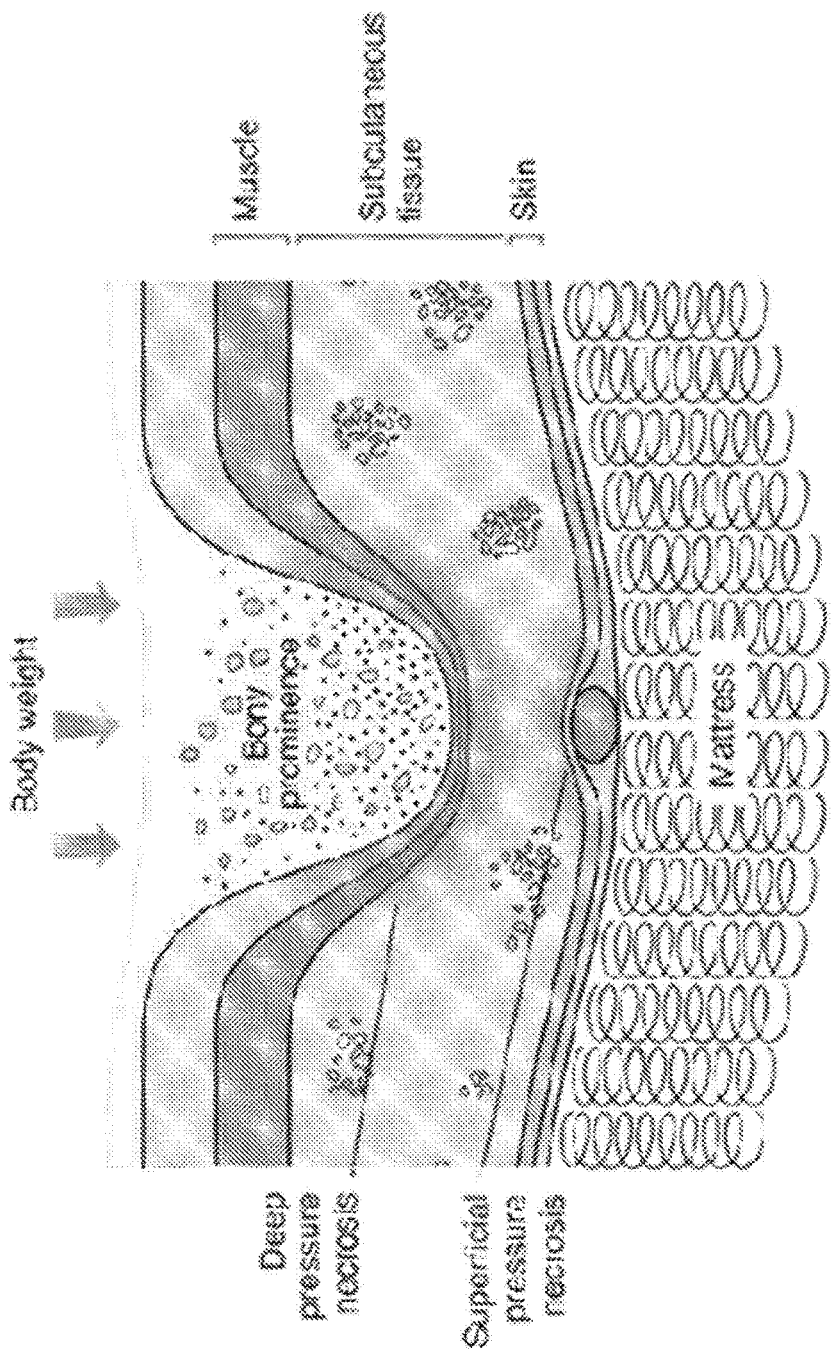

Referring now to FIG. 9, shown is a design and development framework for the system 100. As shown at the top of FIG. 9, performance requirements of the fabric-based sensor network have been identified. These requirements are translated into appropriate Properties of the system 100: Sensing and Comfort properties. The Properties lead to the specific Design for the sensing technology: an integrated structure meeting the primary requirements of sensing, information processing, and comfort. The desired Properties in the Design are achieved through the appropriate choice of Materials & Fabrication Technologies by applying the corresponding Design Parameters as shown in the figure. These major facets in the proposed framework are linked together as shown by the arrows between the dotted boxes in FIG. 9. The use of this framework for the development of system 100 is illustrated with the design of the unit cell 103 (FIGS. 1 & 2) of the fabric-based sensing component 327, 330 (FIG. 3).

FIG. 9 depicts several example materials properties of the system 100. Fabric-based sensing component 327, 330 can be composed of silver coated nylon thread, metal clad nylon or aramid yarn, carbon-based sheath, and conductive ink. Information processing components of the system 100 can be composed of silver coated nylon thread, conductive ink, and/or plastic such as Polyethylene (PE)/Polypropylene (PP)/Polyethylene terethalate (PET). Fabric-based sensing component 327, 330 can include a comfort component of meraklon (Modified Polypropylene), Microdenier Poly/Cotton Blend, and/or Gore-Tex film.

They can include a prediction/prevention application (sometimes referred to herein as a "prevention application" or simply as "an application"), an analytics application, and a caregiver application for implementation on various computing environments including a single-board computer or a server, smartphone, a tablet, laptop, or other computing device. They can trigger a manual intervention or an automated intervention regarding the individual and the individual's position on the equipment.

Example 2

Summary

Disclosed herein is GT-IntSys—a pressure injury prediction, alleviation and/or prevention system[s] and methods to address the aforementioned deficiencies. In various embodiments, the present systems and methods can optionally comprise one or more fabric-based sensors that can be placed between an individual and a wheelchair, seat, bed, crib, or other equipment or device upon which the individual can sit or lie or with which the individual is in contact. The fabric-based sensor(s) can comprise a combination of material types, fabric structures (single, multilayer, and their inherent variations), and manufacturing technologies (weaving, knitting and fabric finishing, and combinations thereof) and a combination of woven/knitted structures and sensors.

The present pressure injury prediction, alleviation and/or prevention systems and methods help predict, alleviate or slow and/or prevent the formation of pressure injuries in individuals—from newborn to the elderly. They can optionally include a prediction/prevention application, an analytics application, and/or a caregiver application for implementation on various computing environments including a single-board computer or a server, smartphone, a tablet, laptop, or other computing device.

GT-IntSys incorporates systems and methods to effect a manual intervention or an automated intervention regarding the individual and the individual's contact with the equipment to relieve the pressure and reduce the moisture level in the area individually or together, i.e., both relieve the pressure and reduce the moisture level at the desired points of contact.

The MANS Architecture

In an embodiment a Monitoring, Analysis and Notification System (MANS) is provided. The Monitoring, Analysis and Notification System (MANS) is an unobtrusive platform [optionally] using a sensor network (such as a fabric-based sensor network), which provides the foundational data to facilitate Big Data analytics that will prevent the formation of pressure injuries and further the design of the next generation of equipment for SCI individuals, such as wheelchairs and beds. MANS can give notifications and alerts to the individuals and caregivers to intervene either manually or automatically through actuator assemblies built into the system. In any one or more aspects, MANS consists of the following technology building blocks: Sensing, Signal and Knowledge Processing, Alert Processing, and Intervention Processing, respectively.

Figure 14:
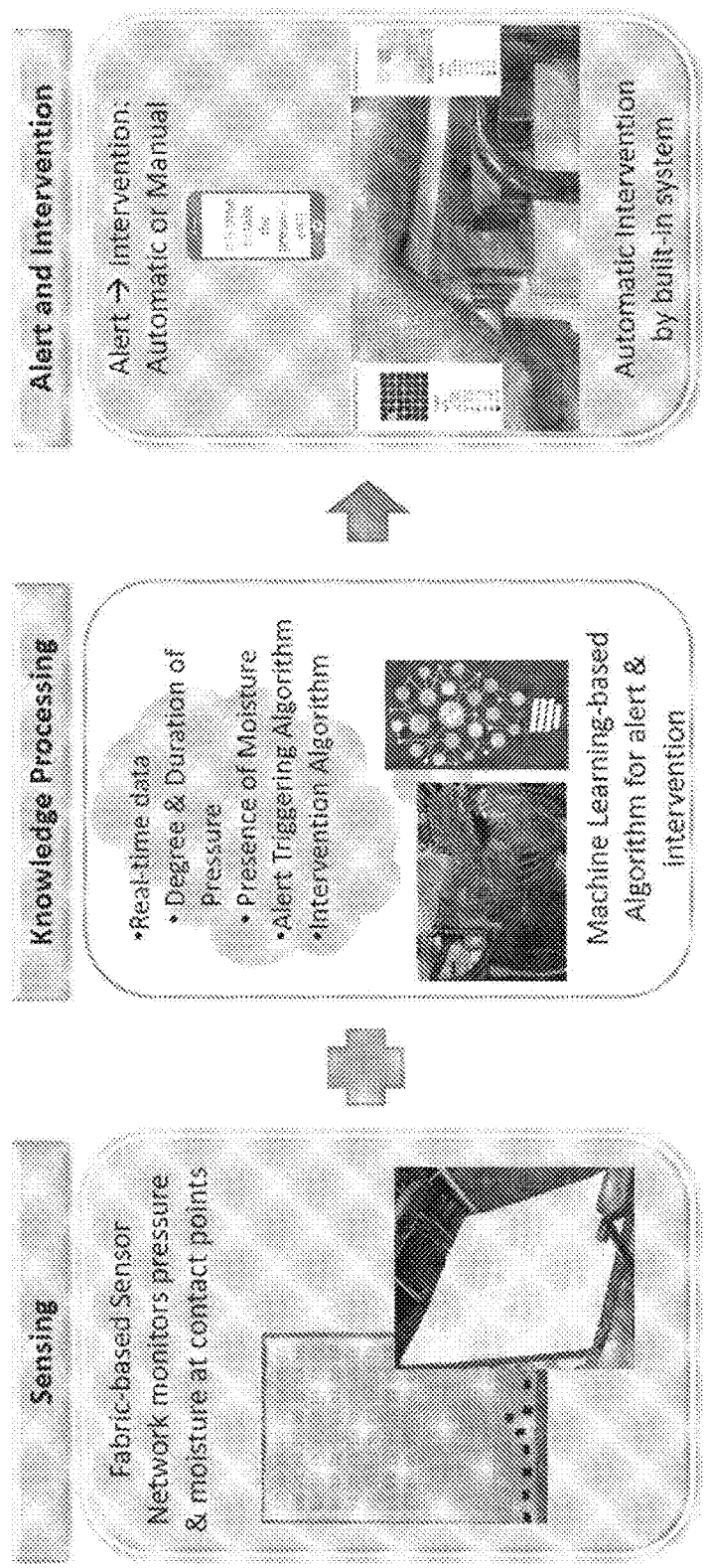
FIG. 14 is a schematic showing aspects of an embodiment of a method of the present disclosure that utilizes sensing and knowledge processing to provide alerts and interventions.

An overview of the MANS Architecture is shown in FIG. 14. As can be appreciated from FIG. 14, MANS systems and methods of use can comprise a [optional] sensing network (that can detect pressure and/or moisture at contact points between the system and a user and can be a fabric-based sensor network in embodiments) and knowledge processing architecture (in embodiments real-time data collection and processing, for example degree and duration of pressure and/or presence of moisture), intervention algorithms, alert triggering algorithms) that can lead to continuous and real-time alert and interventions (automatic or manual interventions).

Figure 15:
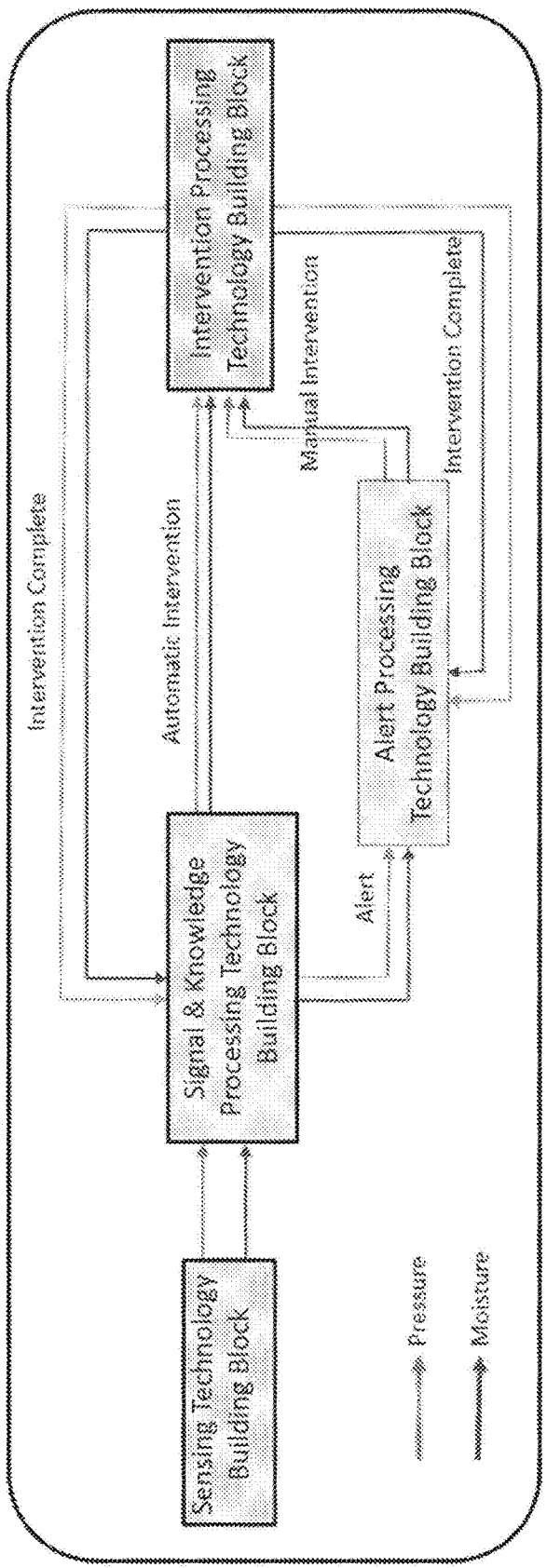
FIG. 15 is a block diagram of an embodiment of a monitoring, analysis, and notification system (MANS) according to the present disclosure.

FIG. 15 shows an embodiment of the system architecture configured to meet the goals driven by the performance requirements of the present MANS. This architecture can serve as the blueprint for the development of the various technology building blocks In an embodiment the Sensing Technology building block (See FIG. 15) consists of a fabric-based sensing system, which continuously monitors the pressure and moisture at the surface contact points of the individual seated in the wheelchair. The pressure and moisture signals from the individual sensors are transmitted to the Signal & Knowledge Processing technology building block shown in the figure. The streaming analog pressure and moisture signals are digitized and can be continuously analyzed. They can be stored to create a database for additional analyses over time. When a specific threshold is reached for one or both the parameters (pressure and moisture), which indicates the potential for a pressure injury, an appropriate alert is triggered. The alert can be handled in one of two ways depending on the user's selection when starting MANS. The user can have the option to choose either manual or automatic intervention in the MANS App on a mobile device (tablet or smartphone). If the user has chosen the automatic intervention option, the alert is transmitted directly to the Intervention Processing technology building block as shown in the figure. Otherwise, upon receiving the alert, the user must press the "Activate" icon in the MANS App to manually trigger the intervention. Depending on the type of alert (pressure or moisture or both), the Intervention Processing technology building block will carry out one of the following actions:

Activate the pressure relieving system under the identified contact points with the wheelchair;
Turn on the fan built into the system to reduce the moisture build-up under the identified contact points with the wheelchair;
Carry out both pressure and moisture interventions.

Once the personalized intervention is completed, the information is sent back to the Alert Processing and Signal & Knowledge Processing technology building blocks as shown in the figure. The specific interventions are stored for further analysis and enhancement of the MANS knowledge base. As the knowledge base is enriched over time, the data will be harnessed to explore opportunities to redesign current aids and equipment used by SCI individuals.

The Sensing Technology Building Block

In an embodiment, the sensing technology building block can consist of a sensing component (SC), the information infrastructure component (IIC), and comfort component (CC). In one embodiment, the sensing component is made of knitted fabric with silver-doped nylon yarn; the information infrastructure component consists of stainless steel and metal-clad aramid yarns. The comfort component can be cotton fabric. All the sensor network samples have been produced. The prototypes are soft, comfortable, shape-conformable and do not impede the mobility or position of the individual due to its presence under the individual when seated in the wheelchair. These features can aid in the successful adoption of MANS in the real-world. Tests have been carried out to demonstrate the successful realization of the pressure sensor network and the moisture sensor network, which together form the Sensing Technology building block of MANS.

Signal and Knowledge Processing Technology Building Block

Figure 16:
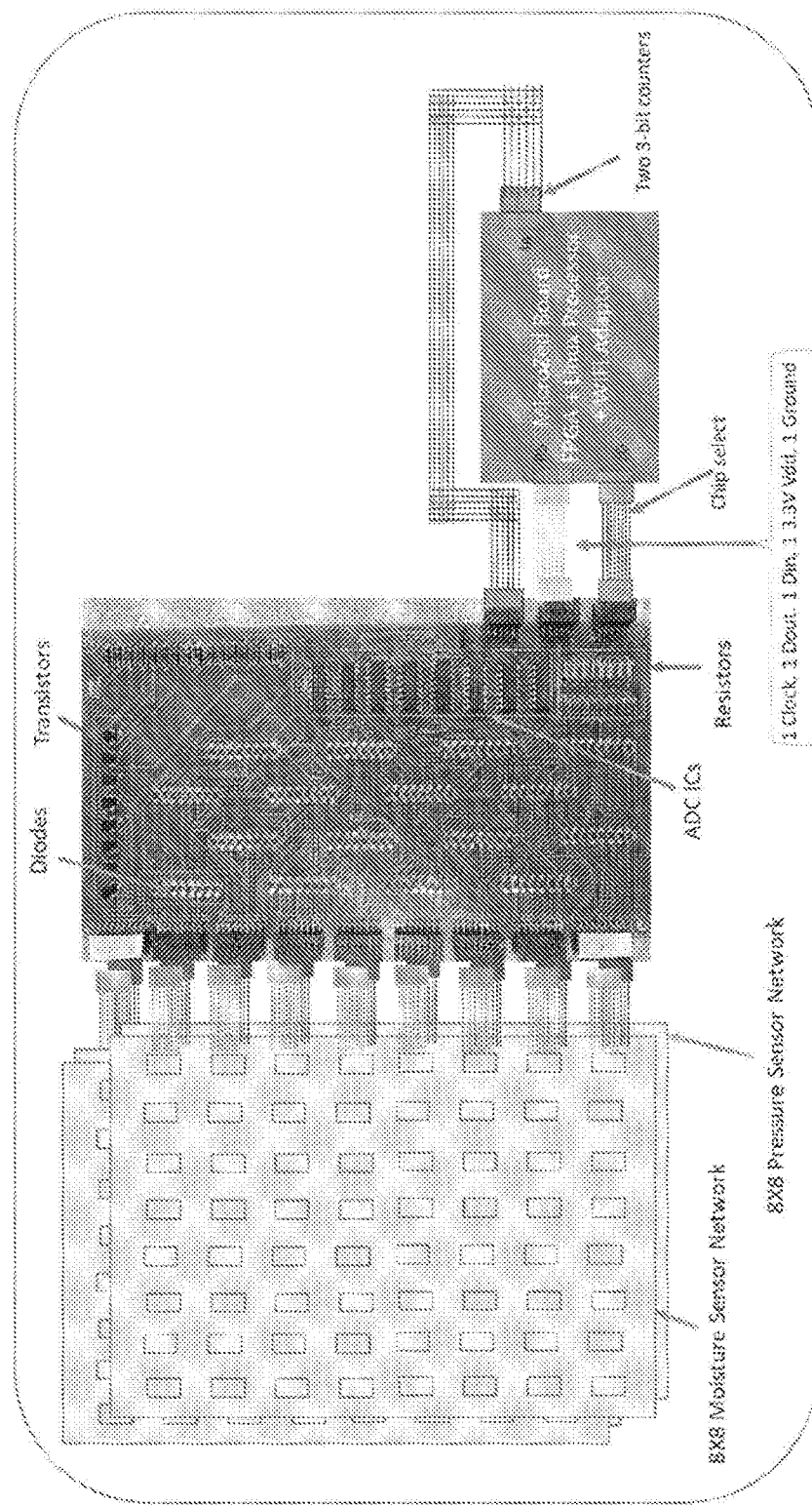
FIG. 16 is an embodiment of signal and knowledge processing technology and sensing technology building blocks according to the present disclosure.

FIG. 16 shows an embodiment of the Sensing Technology building block interfaced with a Signal & Knowledge Processing technology building block (see, FIG. 15). In the embodiment in FIG. 16, the printed circuit board (PCB) was designed in the lab using EagleCAD software. The design was sent to Advanced Circuits, Inc. in Aurora, Colorado, for fabrication. The PCB was then populated with the various components (diodes, transistors, resistors, and ADC ICs shown in the figure). For knowledge processing, a MicroZed Board FPGA (field-programmable gate array) can be used. The figure also shows the details of the various connections between the components on the PCB and the FPGA and the interface with, for example, 8×8 pressure and moisture sensor networks.

Data Flow Architecture

Figure 17:
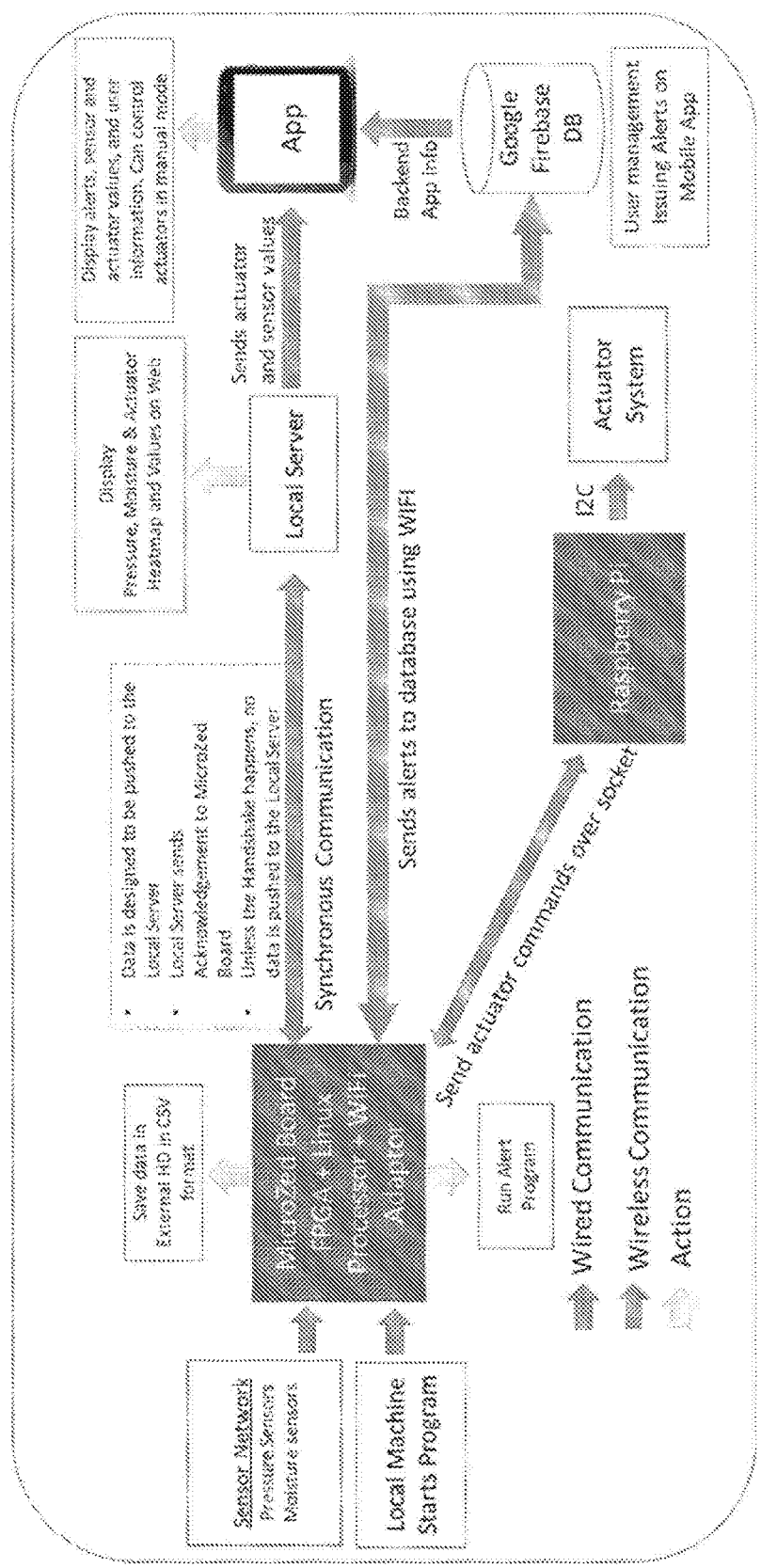
FIG. 17 is a schematic of an embodiment of data flow architecture of the signal & knowledge processing technology building block.

FIG. 17 shows an embodiment of data flow architecture of the Signal & Knowledge Processing technology building block. A combination of Verilog and Python has been used to program the FPGA and this software is responsible for signal and knowledge processing in MANS. The pressure and moisture sensors in the two networks are polled at a desired frequency by the FPGA and the analog signals are digitized. The resulting ADC values for each pressure and moisture sensor are compared with the corresponding values in the preceding sweep. If the pressure value for a specific sensor does not change after a certain period of time (this threshold value of time that is likely to cause a pressure injury is currently set as part of the MANS development process), the Alert Processing technology building block is activated. Likewise, if moisture is detected in the sensors, the Alert Processing technology building block is activated. The software also incorporates a module that does a composite assessment of pressure and moisture that is likely to cause a pressure injury and accordingly triggers an alert.

As shown in the figure, the ADC values are pushed to a local server. The data are displayed as pressure and moisture "heat maps" on the Web and on the mobile device (tablet or smartphone) in the MANS App. Ionic-4 has been chosen as the platform for the implementation of the App because it facilitates cross-platform deployment. Currently, MANS runs in the Android environment; however, it is easy to port it to the iOS platform. By choosing a deployment-agnostic development platform, it is easy to make changes and upgrades to one single version of the source code. Google's Firebase has been chosen as the database platform to track the alerts and interface with the mobile platform. As shown in the figure, only the transmission of signals from the sensor networks is through a wired or wireless connection; all other information flow is wireless. The skilled artisan would understand that data transmission can be wired or wireless in this regard. The figure shows the other major actions, such as saving the data on an external hard drive (in CSV format), triggering alerts, and communication with the Intervention Technology building block.

Figure 18:
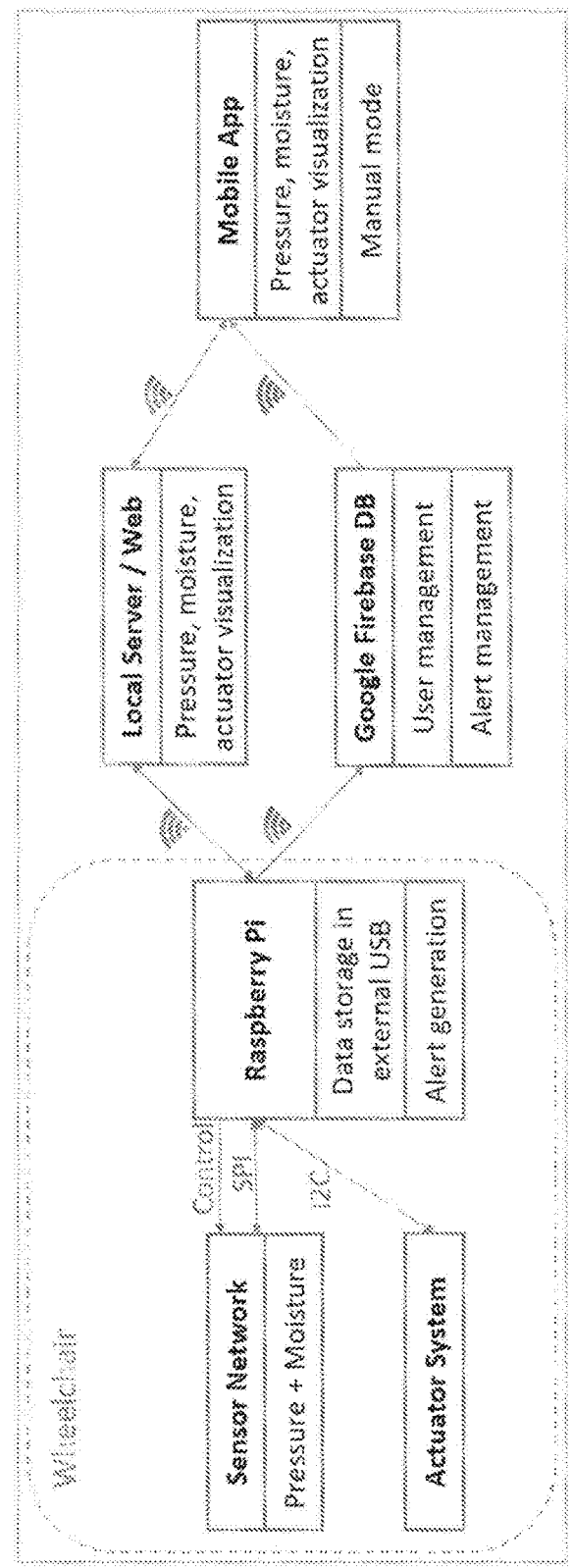
FIG. 18 is another schematic diagram showing an embodiment of MANS architecture according to the present disclosure.

An additional example of dataflow architecture is shown in FIG. 18. In the example of FIG. 18, data and instructions can be moved back and forth between an actuator system, an [optional] sensor network, a computing device (for example a Raspberry Pi), and external and/or internal storage (for example solid state drives connected via PCI or USB protocols). The computing device can then wireless interface with local and/or cloud servers and databases that can interface with applications on additional computing devices, for example mobile computing devices (smartphones and tablets) that can be used by a user (or integrated into a device in/on which the user sits or lies on.

MANS Application

Figure 19:
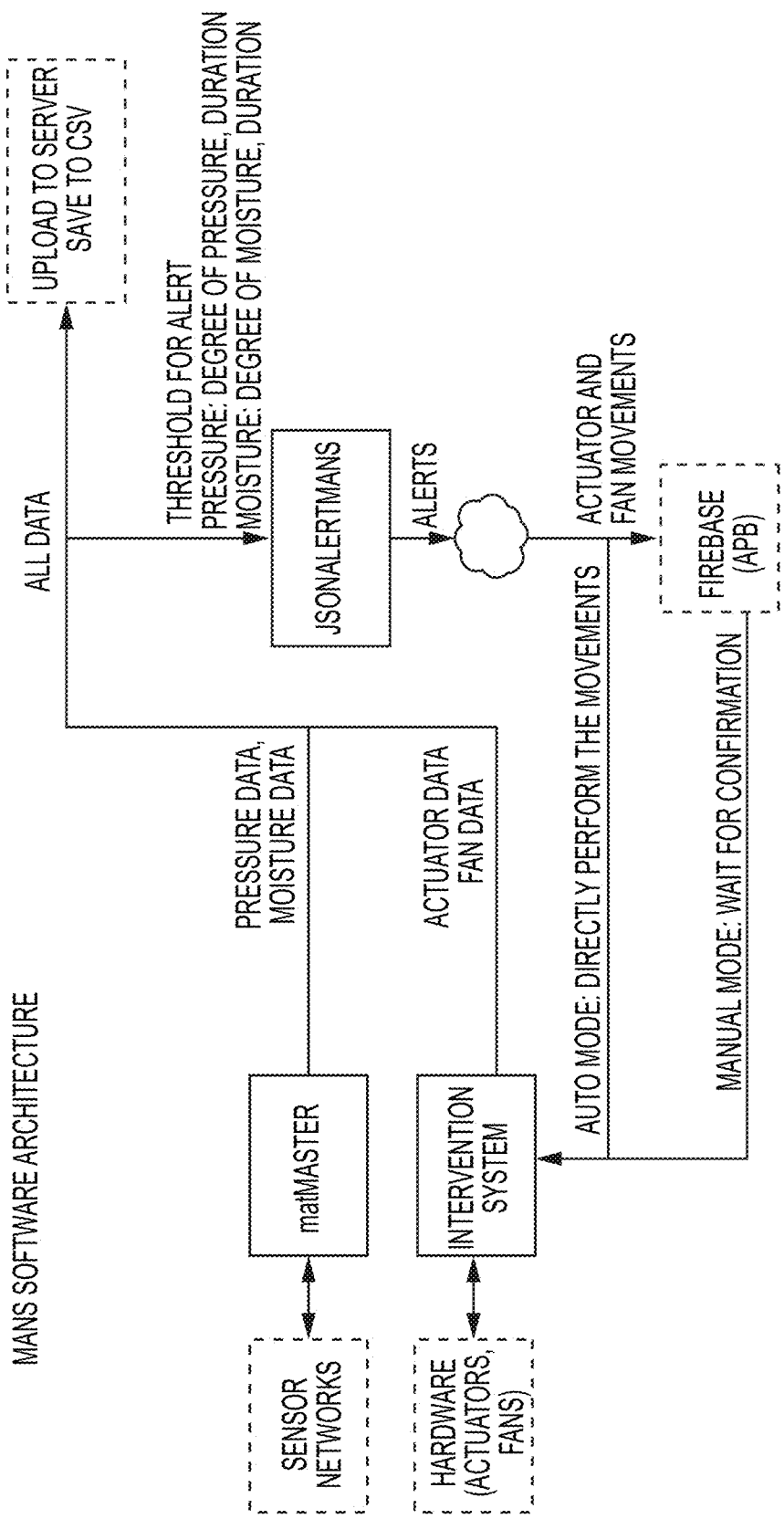
FIG. 19 is another schematic diagram of an embodiment of MANS software architecture according to the present disclosure.

An embodiment of the MANS software architecture is shown in the flowchart of FIG. 19.

Figure 20:
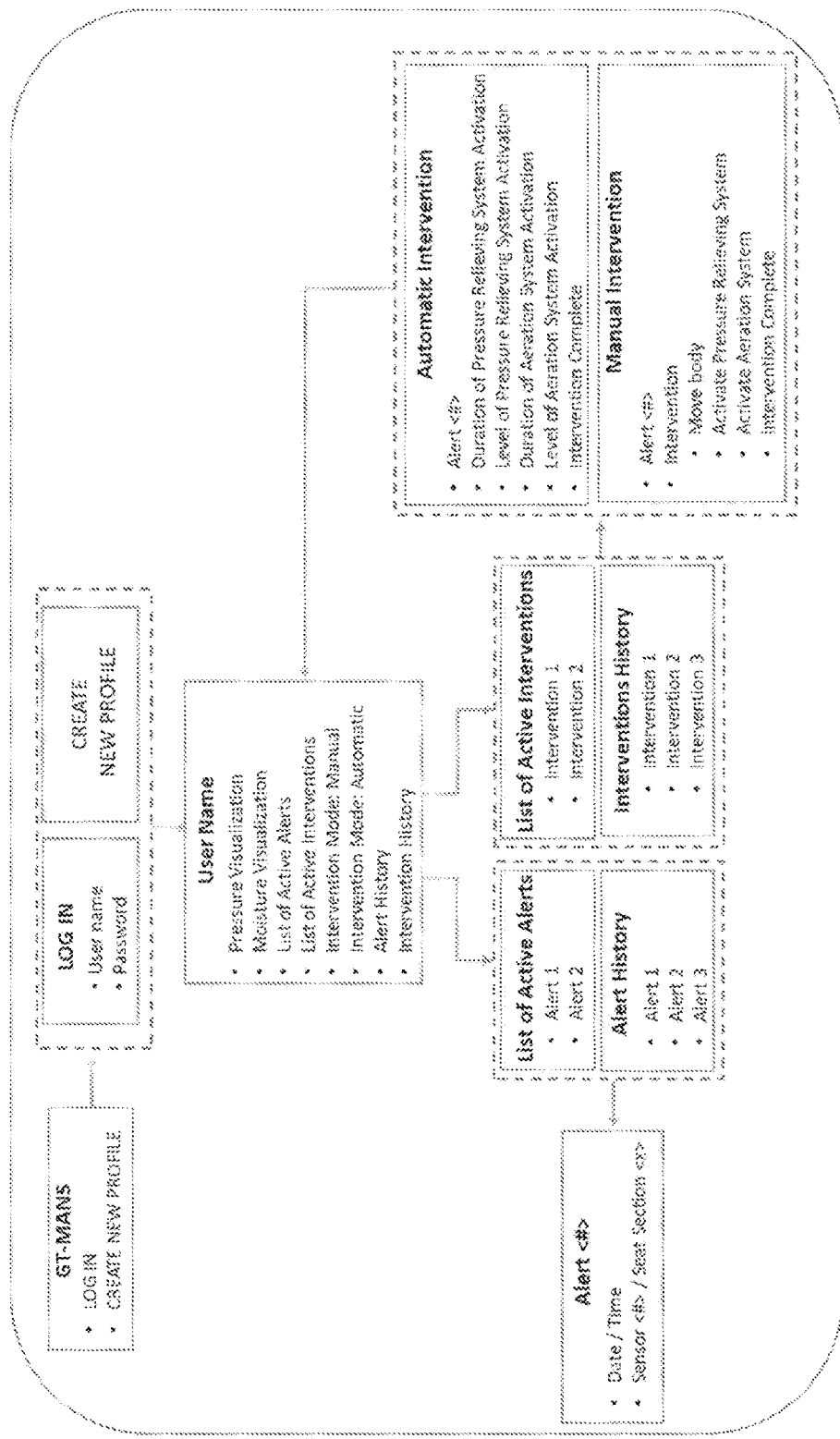
FIG. 20 is a schematic diagram showing the architecture of an embodiment of the MANS application (App).

An embodiment of the architecture of the MANS App implemented in Ionic and running on an Android mobile device is shown in FIG. 20. The user logs in and creates a personal profile. The contents of the various screens and the flow of the App are shown in the figure. From the user's screen, the user can visualize the pressure and moisture heat maps and toggle between the two. Once the user creates the profile and logs in, the main screen displays the various options for the user. From this screen, the user can choose to visualize the pressure and moisture maps, view the list of active alerts, interventions, and so on, as shown in the figure. When the user selects one of these options, the corresponding screen with additional information related to that option is displayed as shown in the figure. Functionality and ease of use have been the primary goals of this minimalist software interface in this phase of development.

Figure 21:
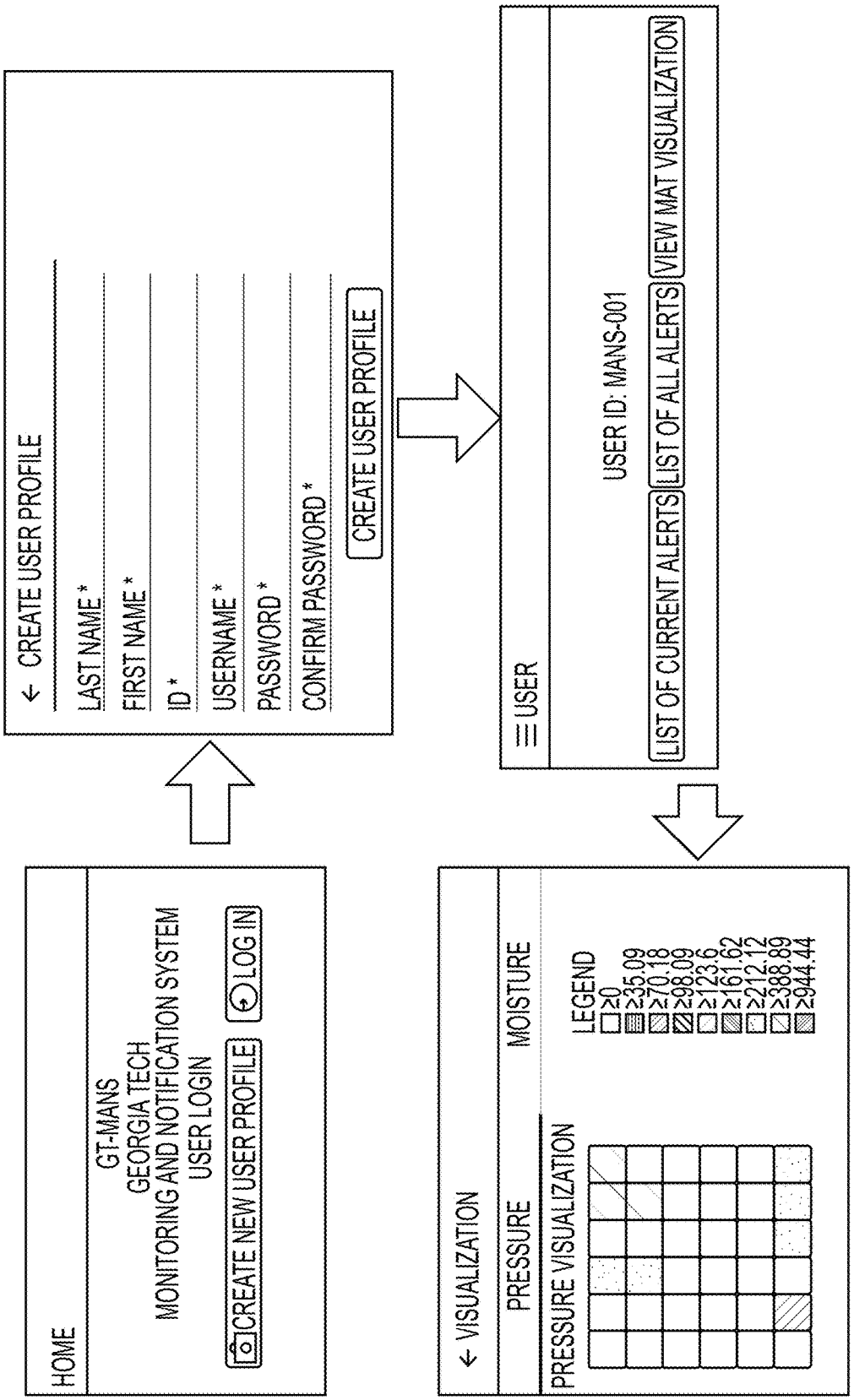
FIG. 21 show screenshots demonstrating the functionality of an embodiment of the MANS application.

FIG. 21 shows screenshots of the App highlighting the various capabilities in the working App. The pressure map shows discrete weights placed on chosen sensors in the fabric-based sensor network; the variation in the intensity of pressure is reflected in the different colors with corresponding values shown in the legend in the Pressure Visualization panel. The sequence of screenshots also illustrates the successful integration of the various technology building blocks showing how the load detected in the Sensing technology building block is processed by the Signal & Knowledge Processing technology building block and reflected in what the user sees on the MANS App. The moisture sensor network has also been successfully tested along similar lines.

Figure 22A:
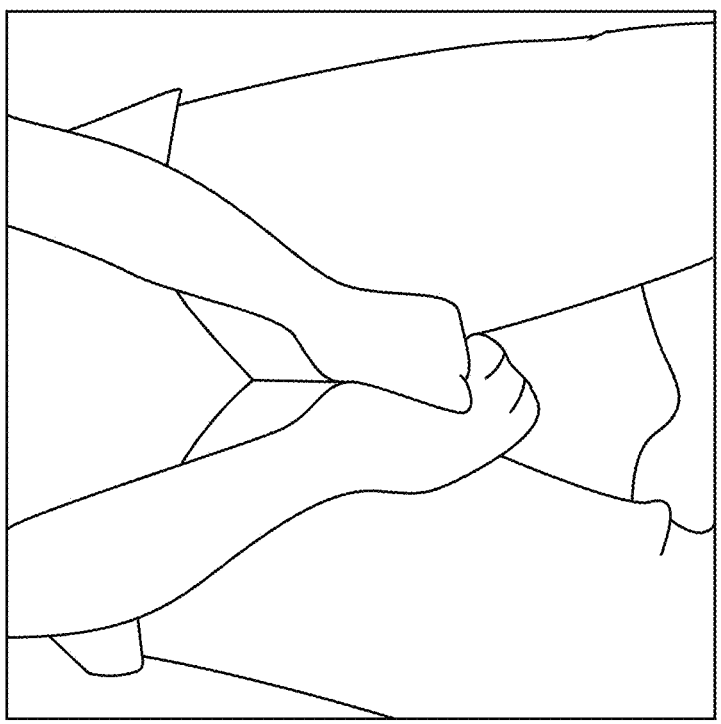

For informal testing, one of the research team members sat on a pressure sensor network prototype as shown in FIGS. 22A-22B. The resulting pressure on the prototype is processed seamlessly by the various technology building blocks and displayed on the dashboard; this successfully demonstrates the functionality and sensitivity of the system. Thus, the Signal and Knowledge Processing technology building block has been successfully designed, developed, tested, and seamlessly integrated with the Sensing Technology building block.

The Intervention Technology Building Block

One of the fundamental goals of MANS is to prevent the occurrence of pressure injuries in SCI individuals through continuous monitoring of pressure and moisture at the surface contact points thereby enabling data-driven knowledge-based intervention; as mentioned earlier, the user can elect to manually effect the intervention or have it done automatically by the system.

Need for Personalized Intervention

Groah, et al. [11], carried out a systematic review of research aimed at preventing pressure injuries among people with SCI and concluded that, "The evidence does not support conclusive guidelines on positioning or repositioning techniques for PU prevention in bed or during sitting. We conclude that PU risk is highly individualized, with the SCI population at a higher risk, which demands flexible PU prevention strategies for bed/seated positioning and pressure relief maneuvers." Based on this important finding in literature, it is clear that the intervention mechanism in MANS must be personalized. Therefore, personalization of the intervention is the first design principle in the development of the Intervention Technology building block.

Role of Shear Force on Pressure Injury

Hobson has shown that wheelchair recline causes shear force in the interface of buttock and seat cushion [12]. Shear force has also been found to be one of the causative factors of pressure injuries [13, 14]. Dinsdale found that a lower pressure was sufficient to cause injuryations in animals when pressure was combined with shear, as compared with interface pressure only [15]. Therefore, minimizing or eliminating shear force becomes the second important design principle in developing the MANS intervention mechanism.

These two design principles have guided the design and development of the mechanisms for effecting the interventions in MANS. SolidWorks has been used to model, analyze, and create numerous designs. The major features of the two exemplary designs considered for implementation are presented here.

Figure 25:
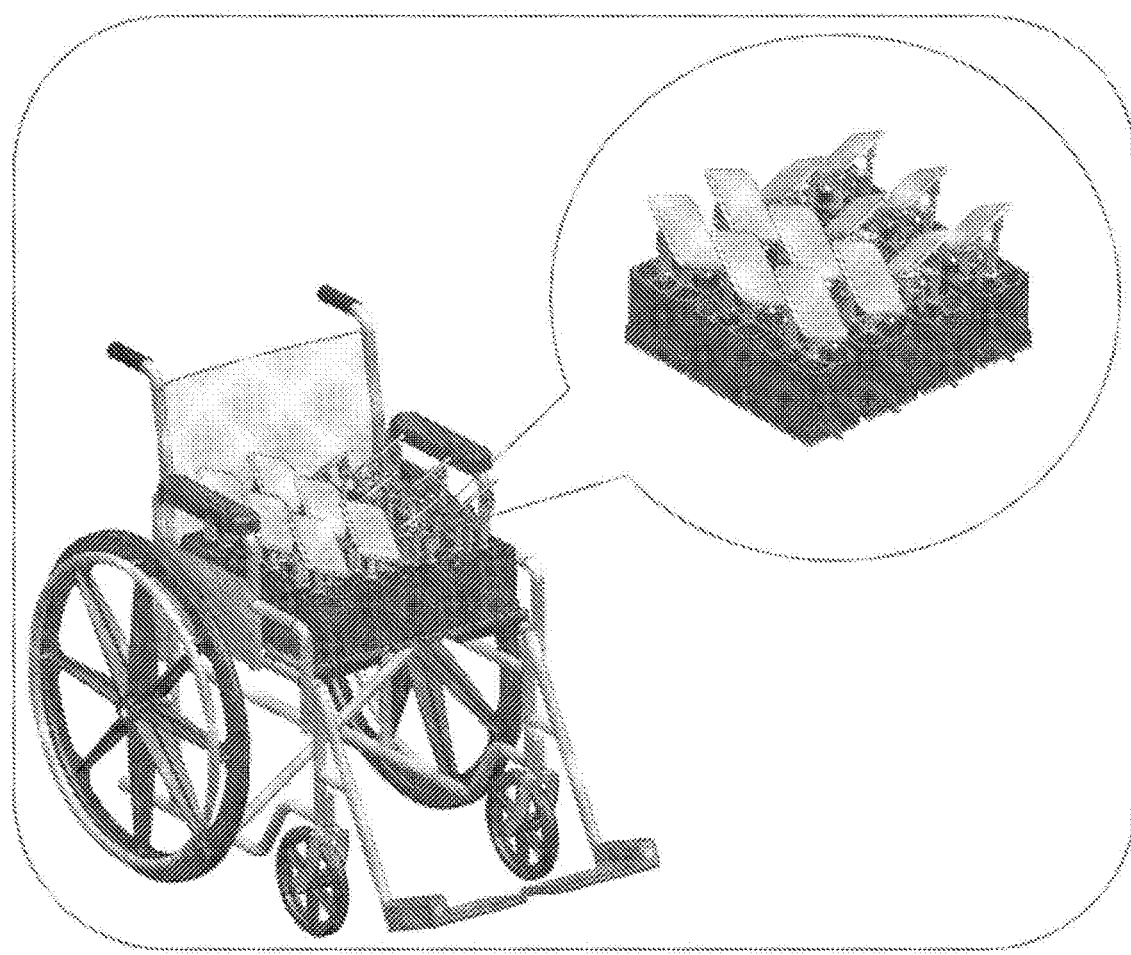
FIG. 25 shows an embodiment of part of an intervention system according to the present disclosure that can be mounted under the seat of a wheelchair. For clarity, the mechanism is shown above the seat (i.e. intervention surface) in the figure.

Design I: FIGS. 23A-23B shows an embodiment of the first design. The intervention mechanism has three actuator assemblies; two of the actuator assemblies would tilt along the X-axis and the third along the Y-axis effected by the middle actuator assembly, albeit a bit difficult to see in the figure. FIGS. 24A-24D shows additional details of the design including the housing, the fixtures to hold the actuators, the fan under the actuators/actuator assemblies, and so on. This design underwent multiple iterations using different motor sizes and features for the actuating mechanism. One of these iterations with a set of mechanisms covering the wheelchair is shown in FIG. 25. Each surface is individually controlled; this means the degree of activation characterized by the extent of movement, duration of movement, and gradient of movement, among others, is programmatically controlled thereby ensuring "personalized" intervention and meeting the first design principle.

Figure 26:
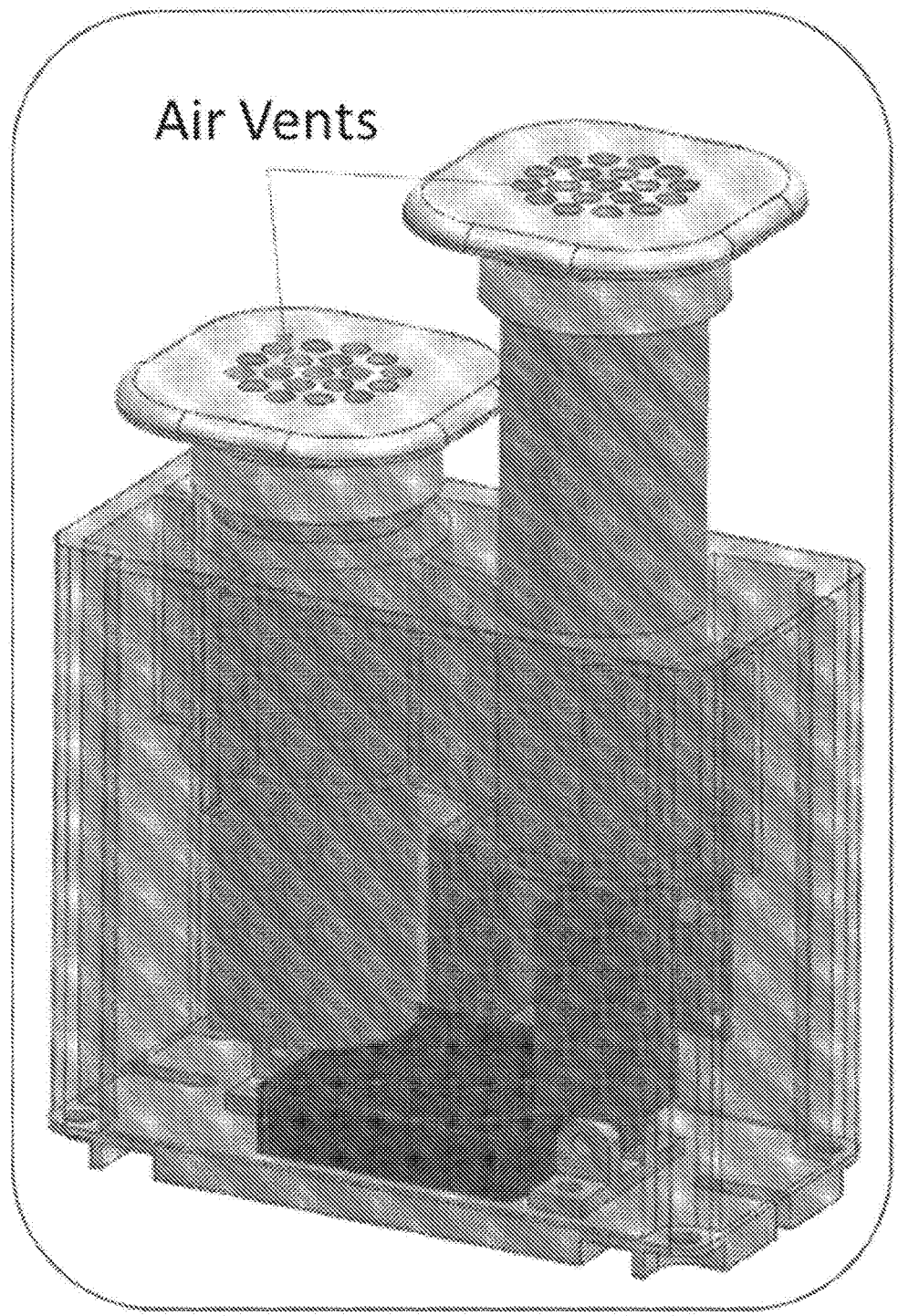
FIG. 26 is an embodiment of actuation system according to the present disclosure.

Design II: FIG. 26 shows an embodiment of a second design. The actuator assemblies only move in the vertical direction (as opposed to the X- and Y-directions in Design I). As shown in the figure, each pod has two motors and a fan. This is a simpler design to manufacture and maintain in practice as compared to Design I. The air drawn by the fan under each pod is vented through the holes in the topper of the actuator to relieve the moisture at the surface contact points.

Further analysis of the topper led to the fact that when an individual is seated, the vent holes will be blocked; so, a pathway for the air was created by having channels in the topper to augment the airflow from the vent holes. This enhanced iteration of the design is shown in FIGS. 27A-27B.

Figures 27A, 27B:
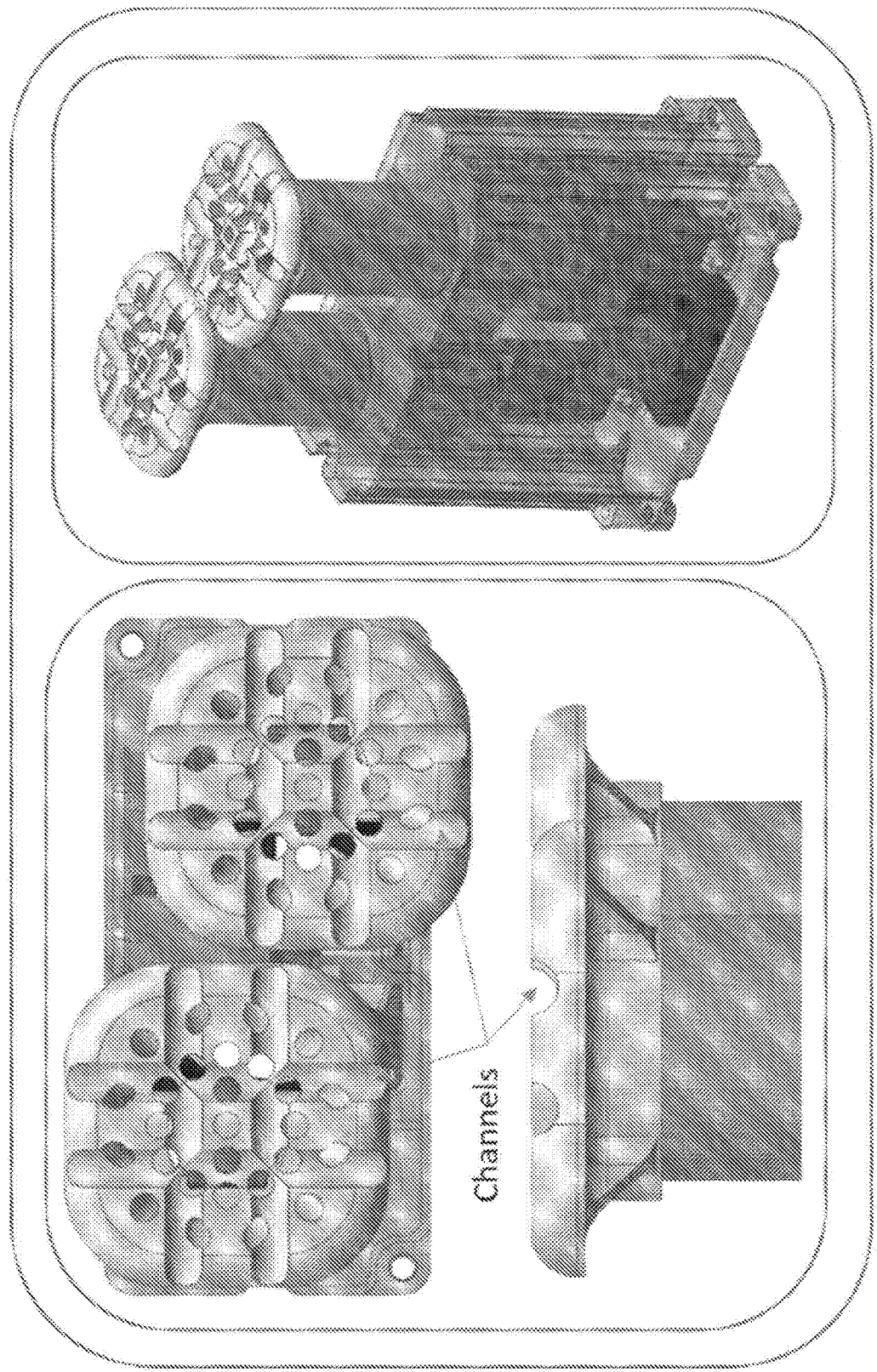
FIGS. 27A-27B show another embodiment of the actuation system described herein.

As can be appreciated from FIGS. 27A-27B, shown is an actuator pod with two actuator assemblies. The actuators, actuator heads, piston tubing, actuator assembly housing, fan, and other aspects can be seen. Details of an embodiment of the actuator heads with apertures to allow fluid to pass through the head and transverse channels going across the tops of the heads and extending the widths of the actuator heads can also be seen (interconnecting various apertures).

An embodiment of such an actuator POD is shown in FIG. 28B, which shows two actuator assemblies, each assembly comprising a linear actuator, a piston tubing surrounding the actuator body, and an actuator head, as well as a fan and an outer actuator assembly housing. An actuator of the actuator assembly is shown in FIG. 28A, an embodiment of a linear actuator.

Additional details of the actuator pod can be appreciated from the cross-sectional view of the embodiment of an actuator pod of FIG. 29. Two aperture assemblies (each with a respective actuator, piston tubing, and head), a fan, an outer housing, and other various aspects (such as bridges and transistors) can be seen. Airflow direction from the fan though the actuator assemblies can be seen as well as how the air can pass through and dissipate across the outer side of the aperture head.

Figures 30A, 30B:
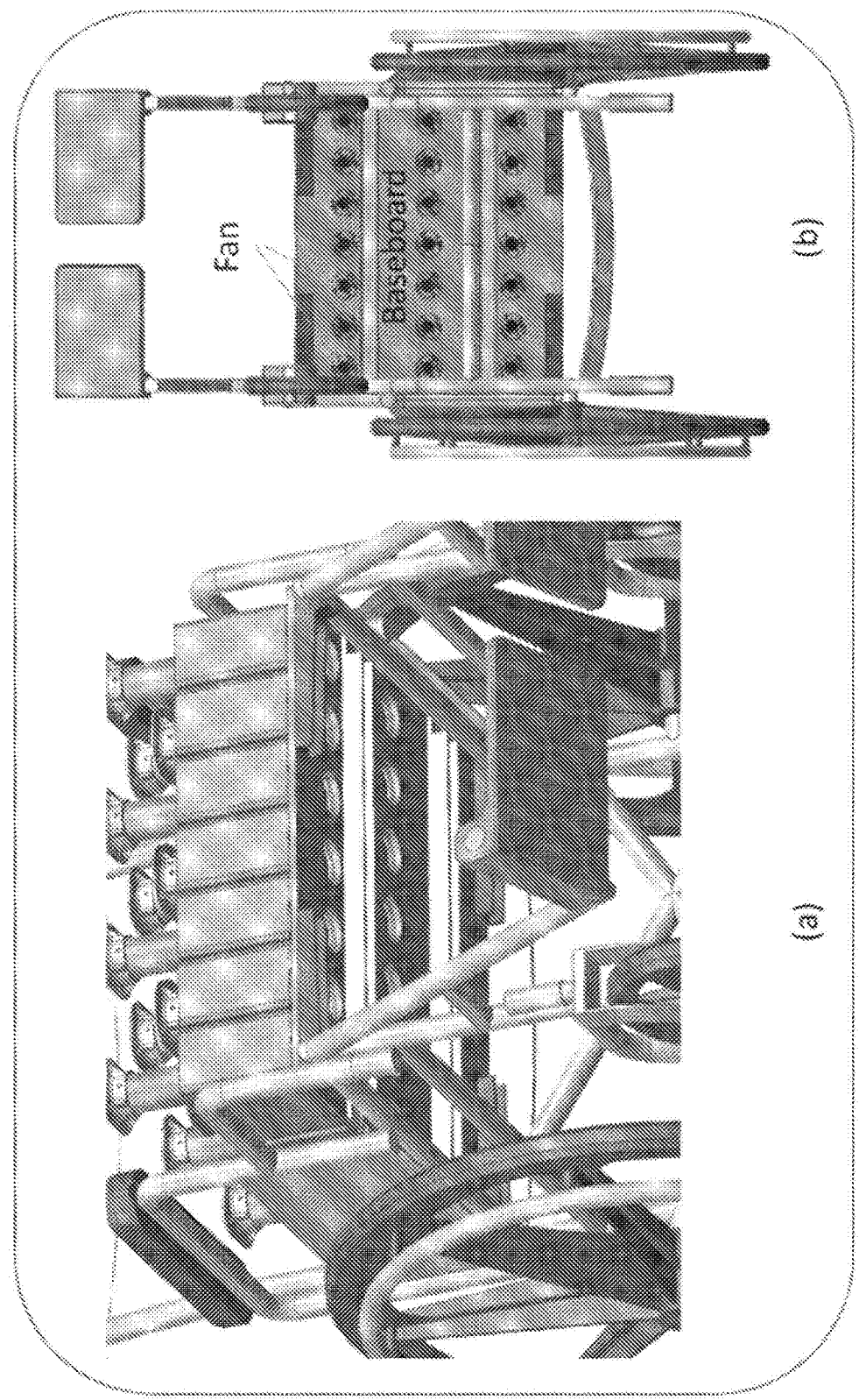
FIGS. 30A-30B show an embodiment of the intervention mechanism under the seat of the wheelchair. For clarity, the mechanism is shown above the seat in FIG. 30B.
Figure 31:
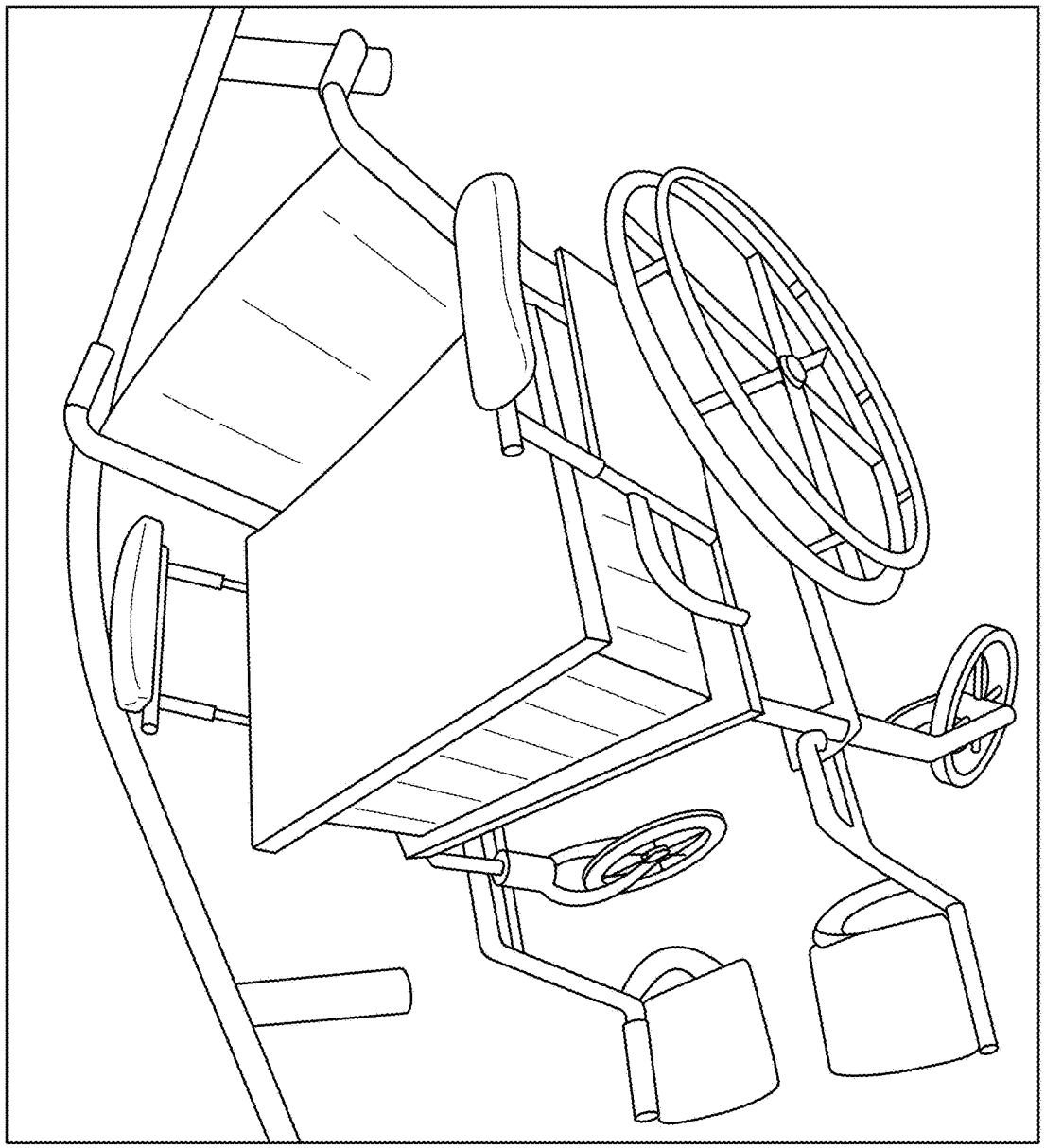
FIG. 31 is a photograph of a reduced-to-practice embodiment of a system of the present disclosure—a wheelchair with a sensor network and an intervention system.

FIGS. 30A-30B show an embodiment of the Design II mechanism under the seat of the wheelchair and a view of the underside of the mechanism mounted on a baseboard under the wheelchair. The fans under the activation pods are also seen in the figure. FIG. 31 is a photograph of a reduced-to-practice embodiment of a system of the present disclosure—a wheelchair with a sensor network and an intervention system.

Comparative Analysis of Design I and Design II: Due to the nature of movement of the support plates in X- and Y-directions (FIGS. 11-13), Design I is likely to cause shear to the occupant's bottom when the pressure is relieved by the movement of the actuator assemblies during intervention. This will violate the second design principle established earlier for the intervention mechanism. In Design II, the actuator assemblies move only in one direction; so, no such shear force will be exerted on the bottom when the pressure is relieved with the movement of the actuator assemblies. Therefore, Design II has been chosen for development of the Intervention Technology building block.

Figures 32A, 32B:
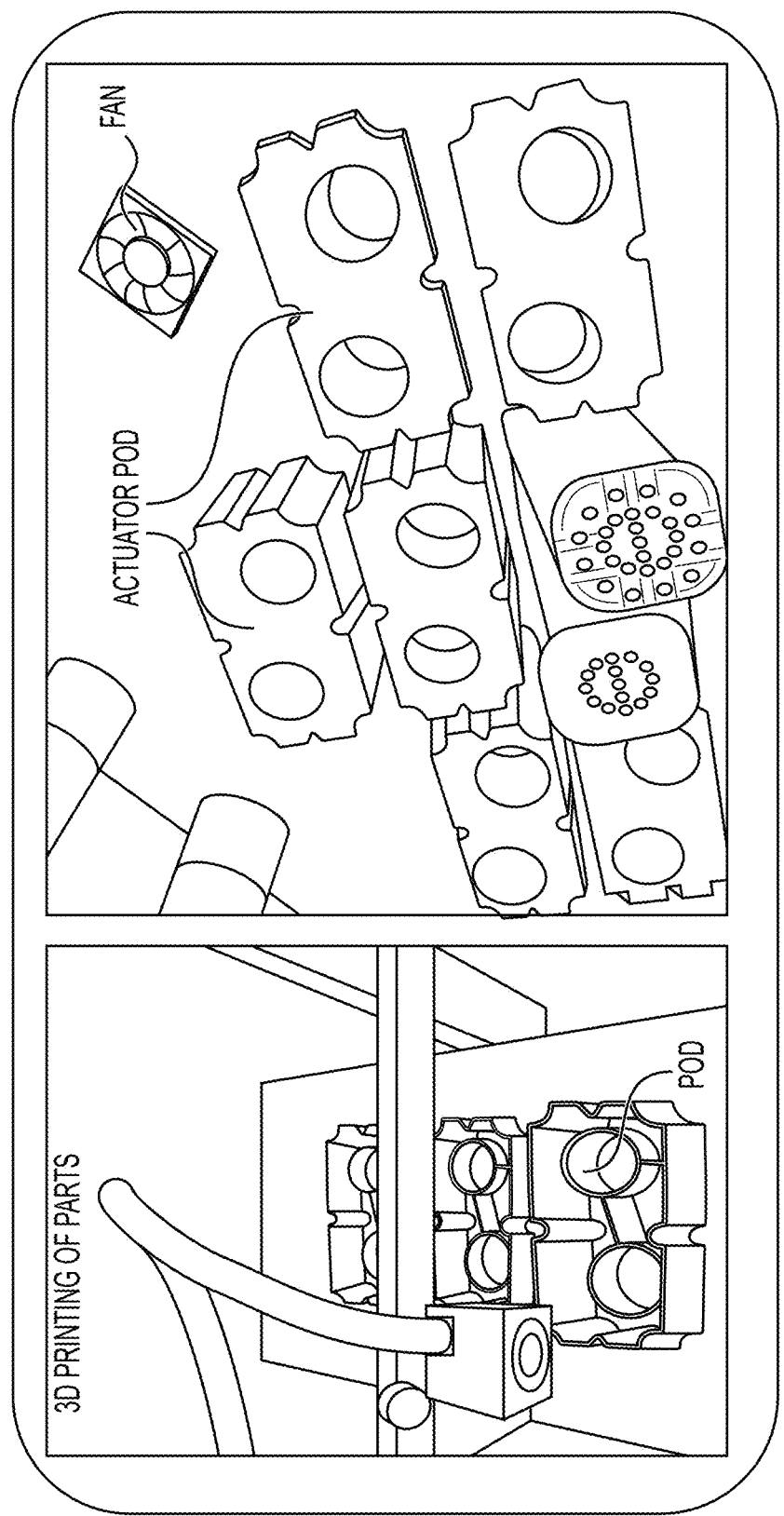
FIGS. 32A-32B show the three-dimensional printing of components of aspects of the present disclosure.

Actual Reduction to Practice of Design II: In an embodiment, the various components of the Intervention technology building blocks have been designed using SolidWorks. The parts have been fabricated using 3D printing in the lab. FIGS. 32A-32B shows the parts being printed along with a few printed parts.

Figure 33A:
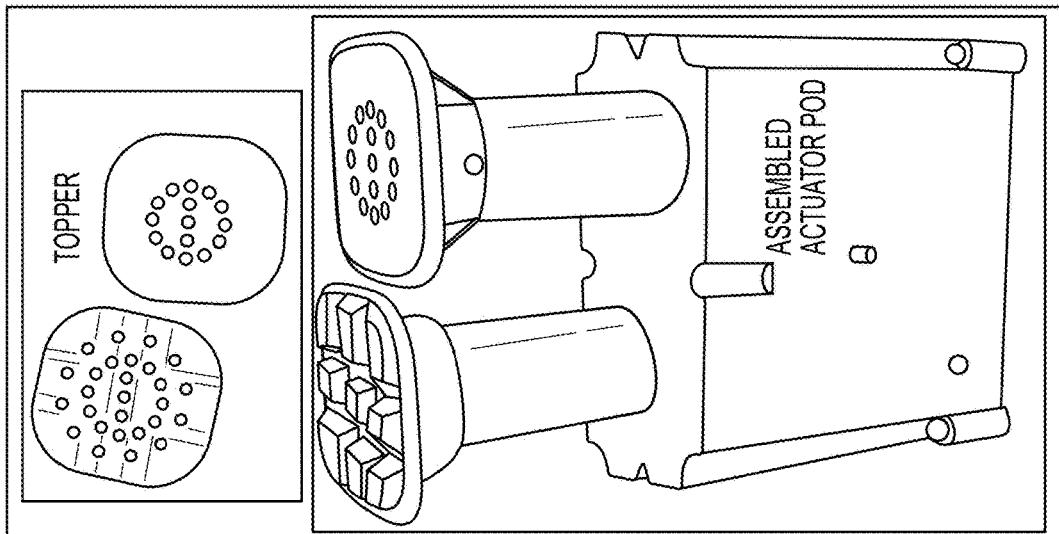
FIGS. 33A-33B are photographs showing a reduced-to-practice embodiment of an actuation system according to the present disclosure.
Figure 33B:
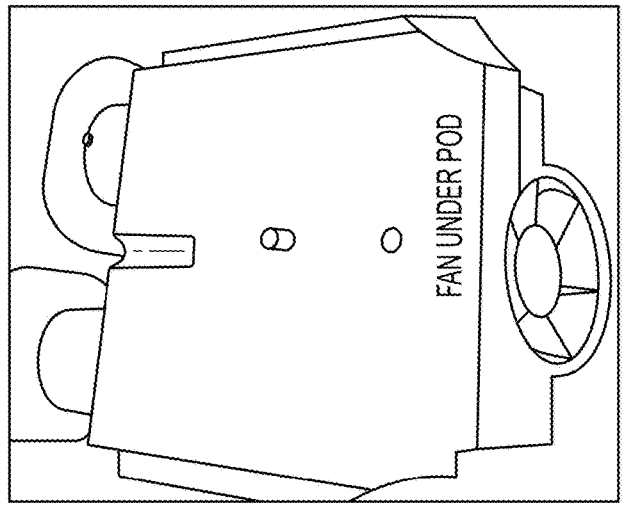

FIGS. 33A-33B shows an embodiment of a completed assembly of one of the actuator pods including two designs of the topper and the fan integrated under the pod. To test the functionality of the system, a stand-alone Arduino-based system was built. The program is written in Python. After the total system with all the pods was successfully tested, it was interfaced with the MicroZed FPGA in the Signal & Knowledge Processing technology building block; the Arduino-based development system was replaced by the FPGA and Raspberry PI combination system.

Figure 34:
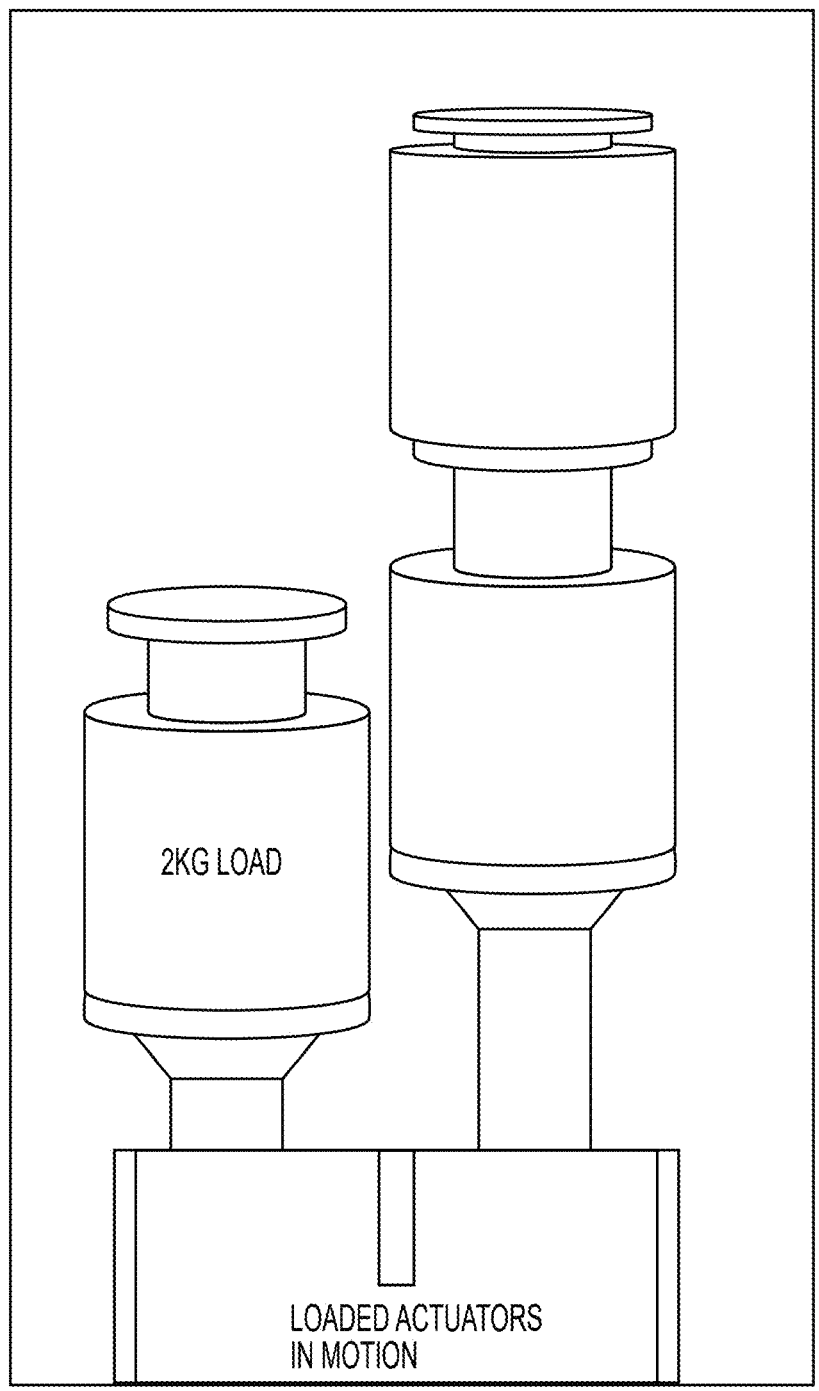
FIG. 34 is a photograph showing a reduced-to-practice embodiment of an actuation system according to the present disclosure under load.

FIG. 34 shows an embodiment of a fully-assembled actuator pod being tested with different loads on each actuator assembly. During testing, each actuator assembly was individually controlled by the Arduino-based system. The control variables for each actuator assembly—rate of vertical movement, the direction of movement, the movement distance, the duration of movement, and the turning off or on of the fan underneath—personalize the intervention and meet the first design principle mentioned earlier.

Thus, the fundamental concepts behind the Intervention technology building block have been proven and the initial prototype demonstrates the realization of personalized intervention that will be triggered by the Signal & Knowledge Processing technology building block.

Figure 35:
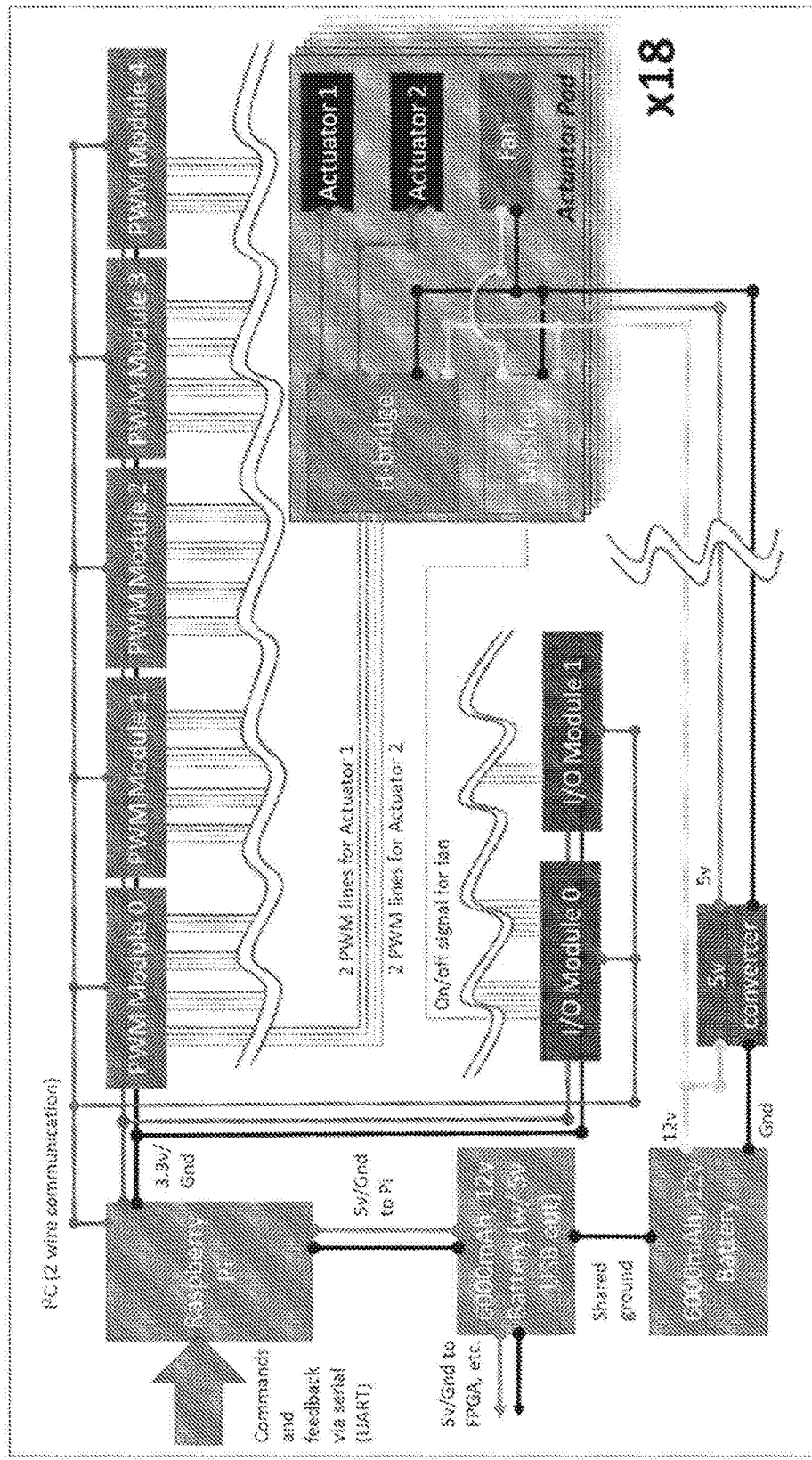
FIG. 35 is an embodiment of a schematic of an intervention system with the associated electronics modules.

FIG. 35 shows an embodiment of the schematic of the final actuation mechanism with the associated electronic modules for the actuator system/assembly block shown earlier in the data flow architecture in FIG. 17.

Figure 36:
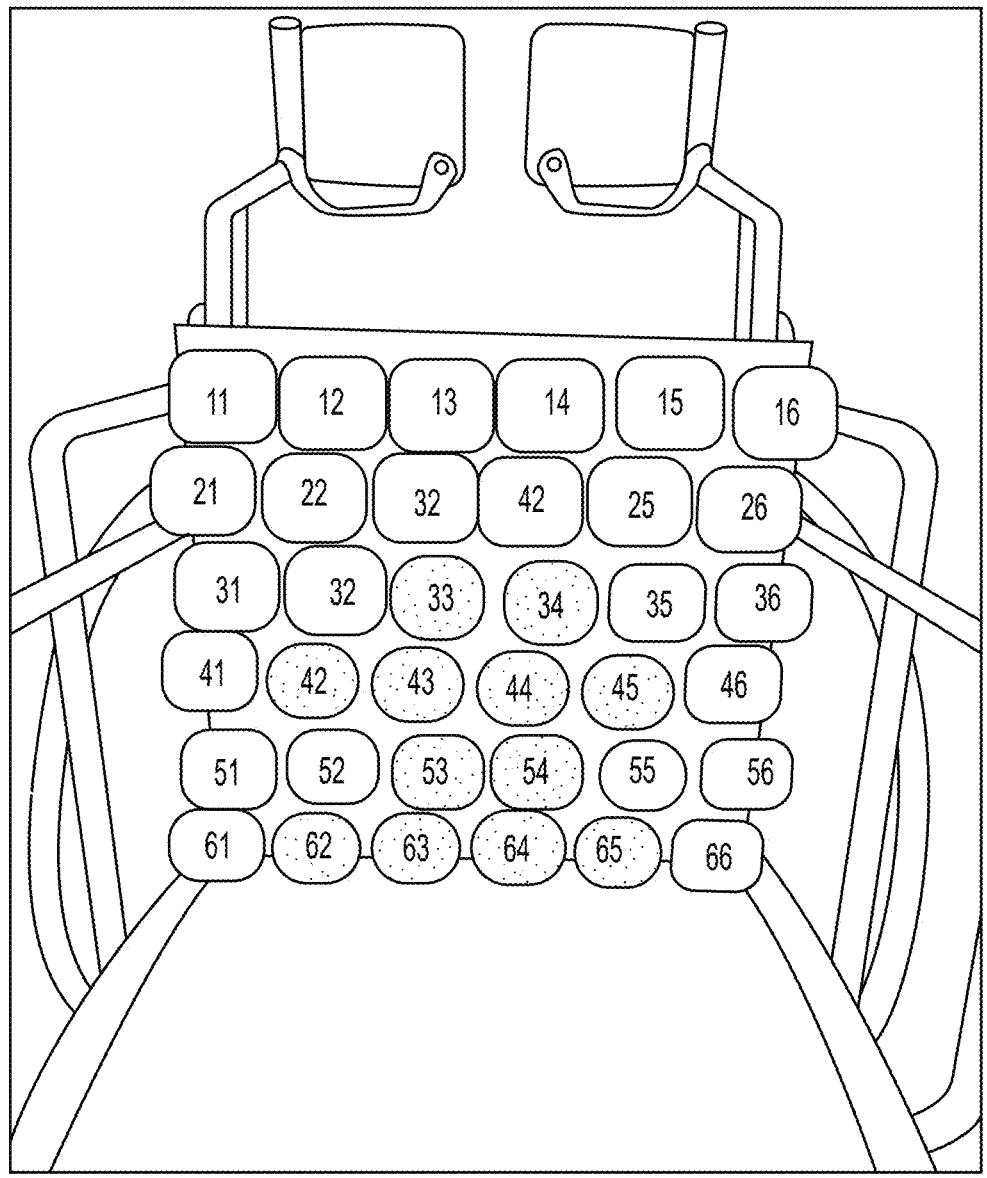
FIG. 36 is a top view of an embodiment of an intervention system as part of a wheelchair, which will be placed below the seat.

FIG. 36 shows an embodiment of the top view of the realized intervention system mounted under the seat of a wheelchair.

Figures 37A, 37B:
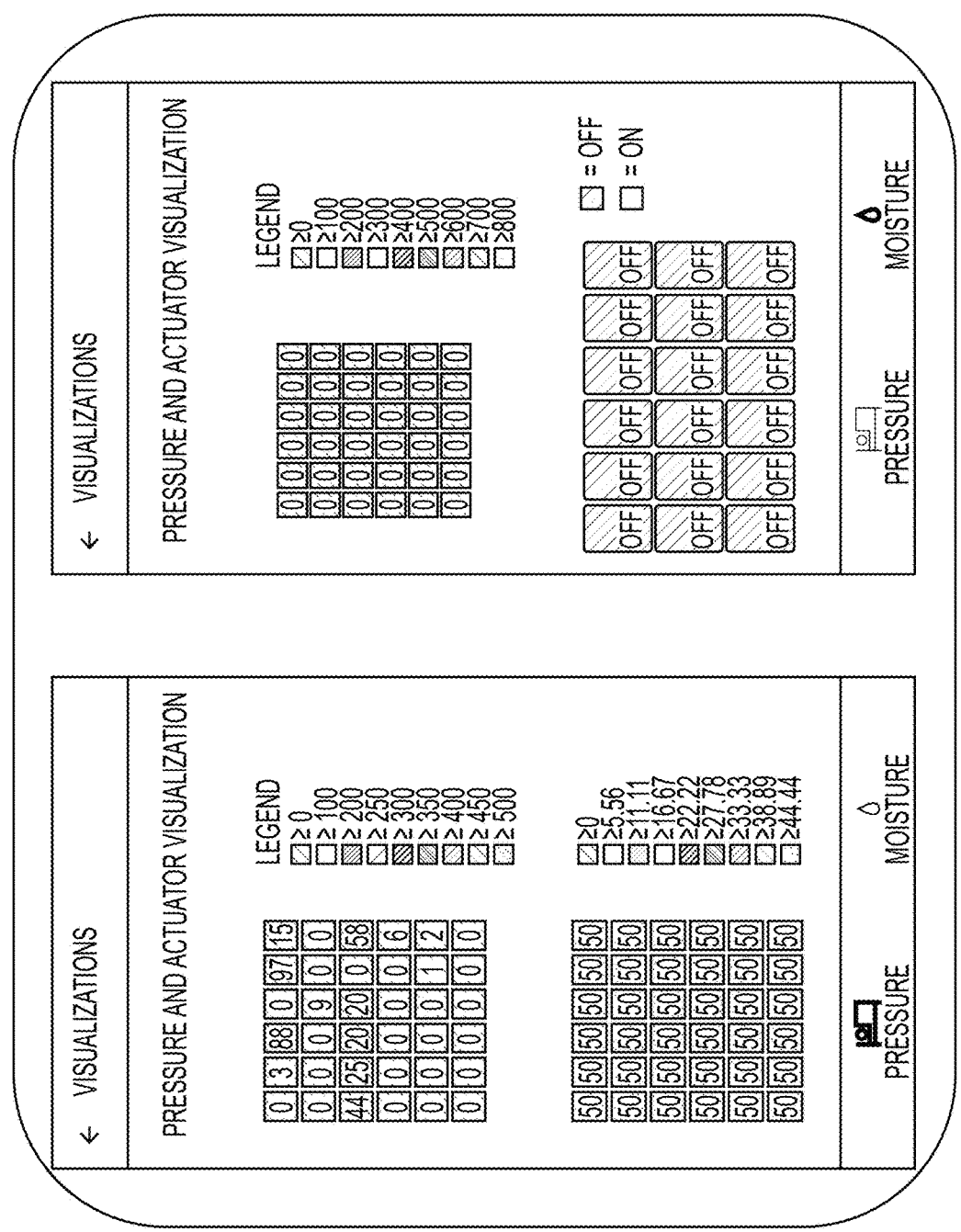
FIGS. 37A-37B show an embodiment of a visualization screen in the Android-based MANS App. The pressure and moisture maps are shown along with the positions of the actuator assemblies and the operation of the fans.

FIGS. 37A-37B shows the visualization screen in the Android-based App. The pressure and moisture maps are shown along with the positions of the actuator assemblies and the operation of the fans.

Figures 38A, 38B:
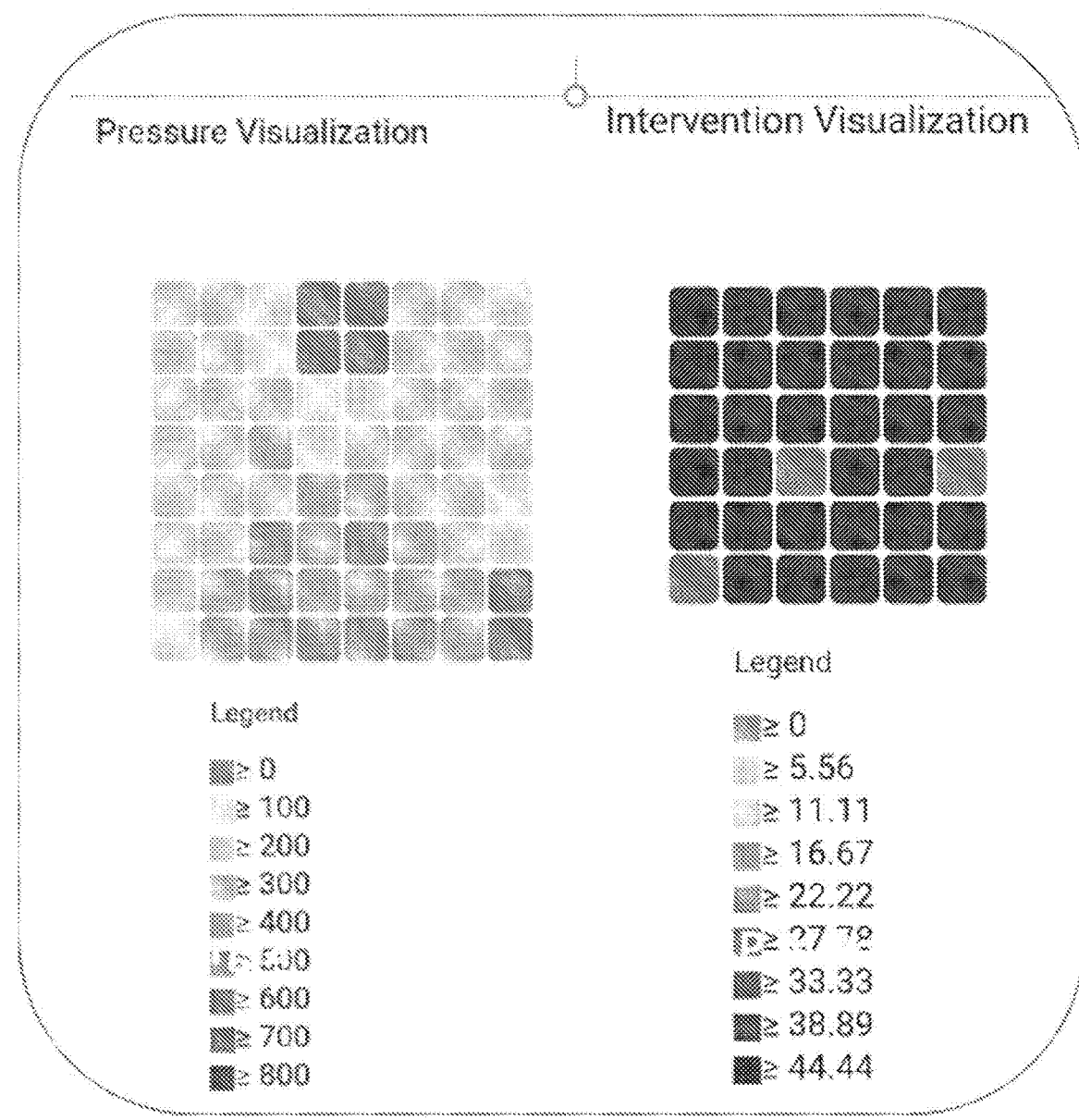
FIGS. 38A and 38B show an embodiment of a visualization map when the fabric-based sensor network is loaded and the intervention mechanism is in operation.

FIGS. 38A-38B shows an embodiment of the visualization map when the fabric-based sensor network is loaded and the intervention mechanism is in operation.

Figures 39A, 39B:
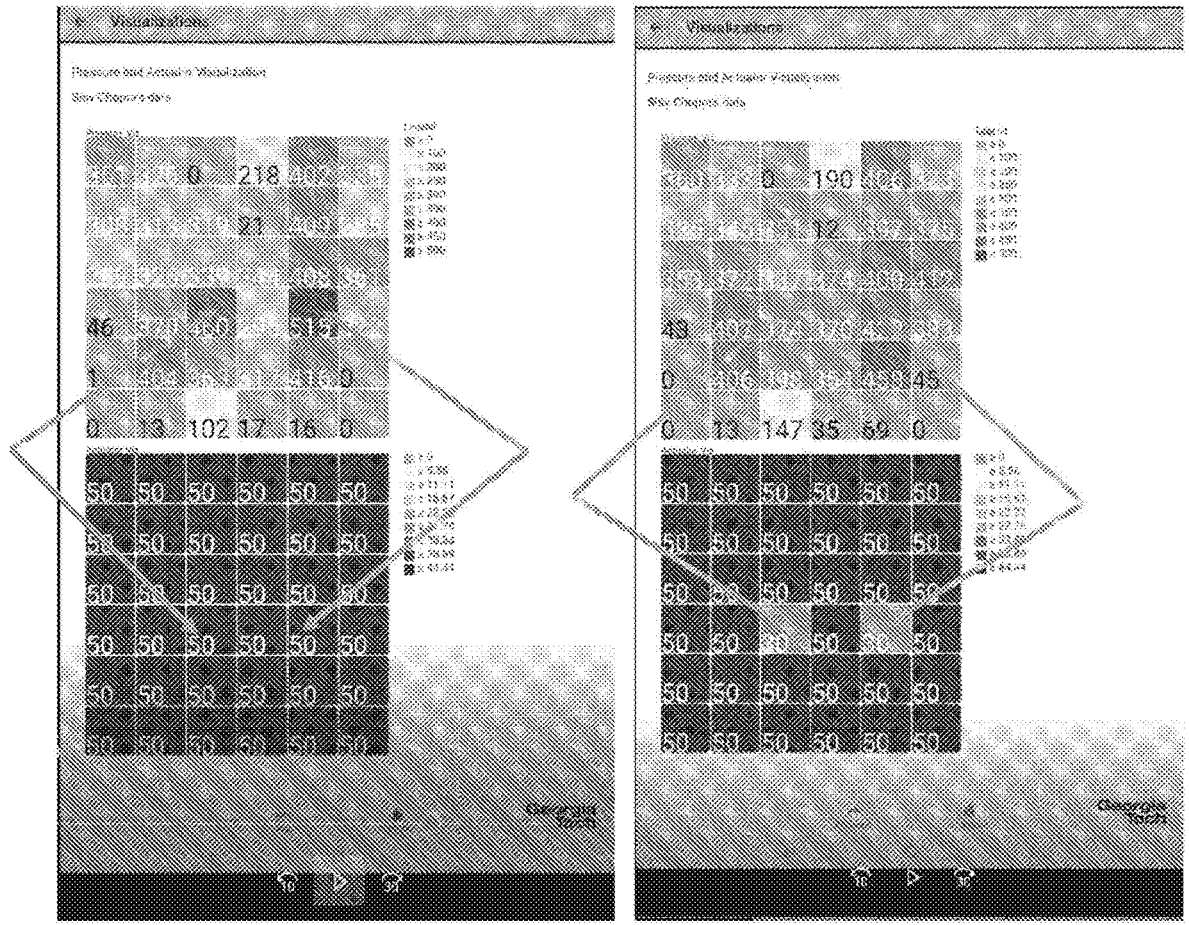
FIGS. 39A and 39B are snapshots of an embodiment of the MANS app and application interface during use, showing simultaneous immersion and offloading.

FIGS. 39A-39B are screenshots showing pressure and actuator assembly maps when the intervention system is in operation (see examples below).

Thus, an embodiment with an intervention system that can be triggered either manually by the user through the App or automatically to relieve the pressure and moisture under the seat has been successfully developed and tested.

REFERENCES FOR THE PRESENT DISCLOSURE

1. National Pressure Ulcer Advisory Panel, 2016, Washington, D.C.
2. Houghton P E, Campbell K E and CPG Panel (2013). Canadian Best Practice Guidelines for the Prevention and Management of Pressure Ulcers in People with Spinal Cord Injury: A resource handbook for Clinicians.
3. Lamid S, El Ghatit A Z. Smoking, spasticity and pressure sores in spinal cord injured patients. Amer Journ Phys Med 1983; 62 (6):300-306.
4. Crenshaw R P, Vistnes L M. A decade of pressure sore research: 1977-1987. J Rehabil Res Dev, 1989; 26:63-74.
5. Bogie K M, Nuseibeh I, Bader D L. Early progressive changes in tissue viability in the seated spinal cord injured subject. Paraplegia 1995; 33:141-147.
6. Consortium for Spinal Cord Medicine. Pressure ulcer prevention and treatment following spinal cord injury: A clinical practice guideline for health care professionals, 2000.
7. Byrne D W, Salzberg C A. Major risk factors for pressure ulcers in the spinal cord disabled: a literature review. Spinal Cord 1996; 34:255-263.
8. Centers for Medicare & Medicaid Services (CMS). Medicare program; changes to the hospital inpatient prospective payment system and fiscal year 2008 rates. Fed Register. Aug. 22, 2007; 72(162):47205.
9. https://hub.permobil.com/blog/offloading-vs-immersion-wheelchair-cushions-for-pressure-injuries, Last Accessed: Jun. 5, 2019.
10. https://www.comfortcompany.com, Last Accessed: Jun. 14, 2019.
11. Groah. S. L., Schalden, M., Pineda, C. G., and Hsieh, C. J., Prevention of Pressure Ulcers among People with Spinal Cord Injury: A Systematic Review, PM&R, Volume 7, #6, 2015, pp. 613-36.
12. Hobson D. A., Comparative effects of posture on pressure and shear at the body-seat interface. Journal of Rehabilitation Research & Development 1992; 29(4):21-31.
13. Jan, Y. K., Brienza, D., Tissue mechanics and blood flow factors in pressure ulcers of people with spinal cord injury. In: Gefen, A., editor. The Pathomechanics of Tissue Injury and Disease, and the Mechanophysiology of Healing: Research Signpost. 2009. p. 241-259.
14. Zhang M., Roberts V. C., The effect of shear forces externally applied to skin surface on underlying tissues. Journal of Biomedical Engineering 1993; 15(6):451-456.
15. Dinsdale S. M., Decubitus ulcers: role of pressure and friction in causation. Archives of Physical Medicine & Rehabilitation 1974; 55(4):147-152.

Example 3

In addition to the foregoing, the various embodiments of the present disclosure can include, but are not limited to, the embodiments set forth in the following clauses:

Clause 1. An intervention system comprising a set of actuators or actuator assemblies that can selectively relieve the pressure experienced by the individual's body part that is in contact with the surface under which the actuators or actuator assemblies are positioned.

Clause 2. The intervention system according to clause 1 comprising a set of actuators or actuator assemblies, optionally with built-in fans, that can be selectively activated to also dry the moisture experienced by the individual's body part that is in contact with the surface under which the actuators or actuator assemblies with the built-in fans are positioned.

Clause 3. The intervention system according to clause 1 or 2 that can be interfaced with a fabric-based sensor network that can monitor the pressure experienced at the body-surface contact point and triggered based on the pressure and thresholds defined in the intervention system.

Clause 4. The intervention system according to any of clauses 1-3 that can be interfaced with a fabric based sensor network that can monitor the moisture experienced at the body-surface contact point and triggered based on the moisture threshold defined in the intervention system.

Clause 5. The intervention system according to any of clauses 1-4 that can be interfaced with a Big Data analytics system, which can learn and set the thresholds for triggering the pressure-relieving intervention based on the data acquired over time.

Clause 6. The intervention system according to any of clauses 1-5 that can be interfaced with a Big Data analytics system, which can learn and set the thresholds for triggering the moisture-relieving intervention based on the data acquired over time.

Clause 7. The intervention system according to any of clauses 1-6 that can be configured with a fabric-based sensor network when first used and then use the built-in knowledge to trigger the pressure intervention during the use of the system and without the fabric-based sensor network after the initial configuration.

Clause 8. The intervention system according to any of clauses 1-7 that can be configured with a fabric-based sensor network when first used and then use the built-in knowledge to trigger the moisture intervention during the use of the system and without the fabric-based sensor network after the initial configuration.

Clause 9. The intervention system according to any of clauses 1-8 that can be configured to move the actuator assemblies in any desired or random sequence during its usage to continuously relieve the pressure experienced by the individual's body part that is in contact with the surface under which the activators are positioned.

Clause 10. The intervention system according to any of clauses 1-9 that can be configured to move the actuator assemblies and turn the fan on or off in any desired or random sequence during its usage to continuously relieve the moisture experienced by the individual's body part that is in contact with the surface under which the activators are positioned.

Clause 11. The intervention system according to any of clauses 1-10 that can be deployed in a variety of settings including but not limited to hospital beds, cribs, wheelchairs, office chairs, automobile seats, train cars.

Clause 12. The intervention system according to any of clauses 1-11 that can mitigate the risk of pressure injuries in individuals in hospital beds, cribs, wheelchairs, among others.

Clause 13. The intervention system according to any of clauses 1-12 that can mitigate the risk of DVT and back injuries among other injuries experienced by individual sitting for long periods of time by virtue of their professions.

Clause 14. The intervention system according to any of clauses 1-13 that embodies the concepts of both immersion and offloading necessary to relieve the pressure at the individual's body part that is in contact with the surface under which the activators are positioned.

Clause 15. The intervention system according to any of clauses 1-14 that changes the microclimate at the individual's body part that is in contact with the surface under which the activators are positioned.

Example 4

FIGS. 39A-39B are snapshots from an embodiment of the MANS App captured during testing showing simultaneous immersion and off-loading according to systems and methods of the present disclosure.

FIG. 39A: At start when actuator assembly is up at 50 mm position

FIG. 39B: When actuator assembly is down at 30 mm position

They show the pressures at the interface contact points (i.e., on the specific sensors) being distributed to the neighboring contact points with movement of actuator assemblies and thereby decreasing the pressures at the respective interface contact points. As a consequence, the pressures at the neighboring interface contact points increase. These are reflected in the numbers (ADC values) displayed at each interface contact point.

The higher the ADC value, higher the load, and hence higher the pressure, on the sensor. In this embodiment, the intervention system comprises 6×6 actuator assemblies.

Example 5

FIGS. 40A-40L are screenshots of an embodiment of the MANS app running on an Android device. Ionic-4 has been used for programming the App according to the present embodiment so that the codebase can be easily ported to the iOS Platform. Ionic-4 is an open source mobile UI toolkit for building high quality, cross-platform native and web app experiences (https://ionicframework.com/).

Figures 40A, 40B:
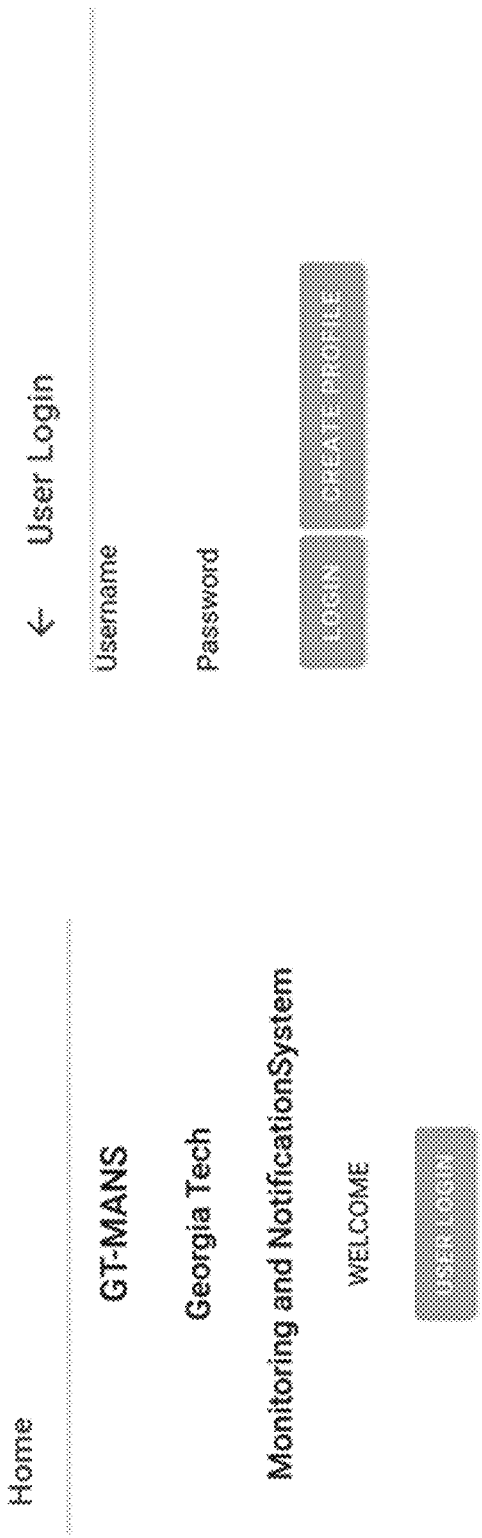

FIGS. 40A-40B show examples of welcome and login screens of an embodiment of a MANS app according to the present disclosure.

Figures 40C, 40D:
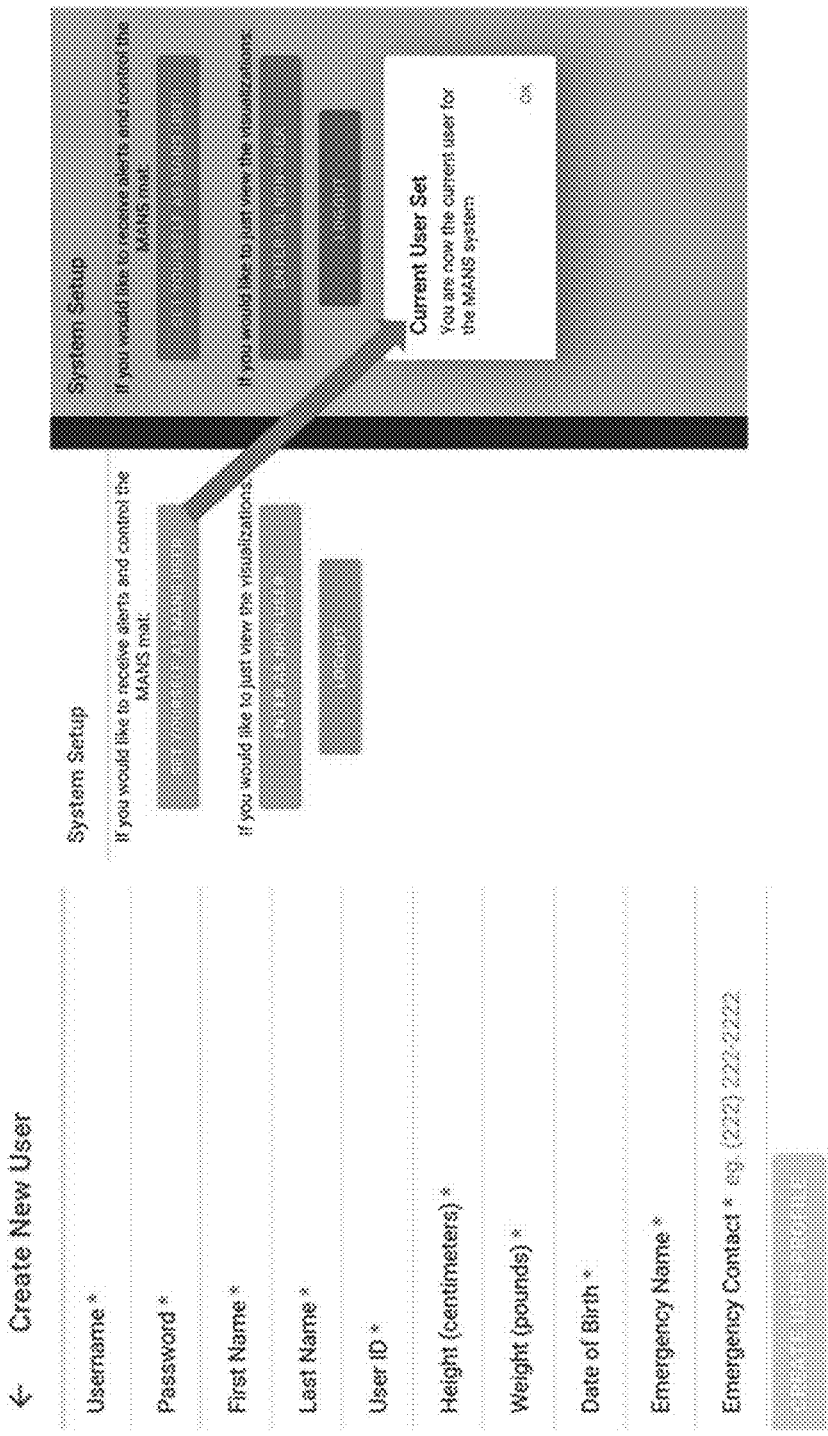

FIGS. 40C-40D show examples of profile creation and system setup screens of an embodiment of a MANS app according to the present disclosure. FIG. 40C is the first page following login according to the present embodiment. Both options in FIGS. 40C and 40D lead to the dashboard page (FIG. 40E).

Figures 40E, 40F:
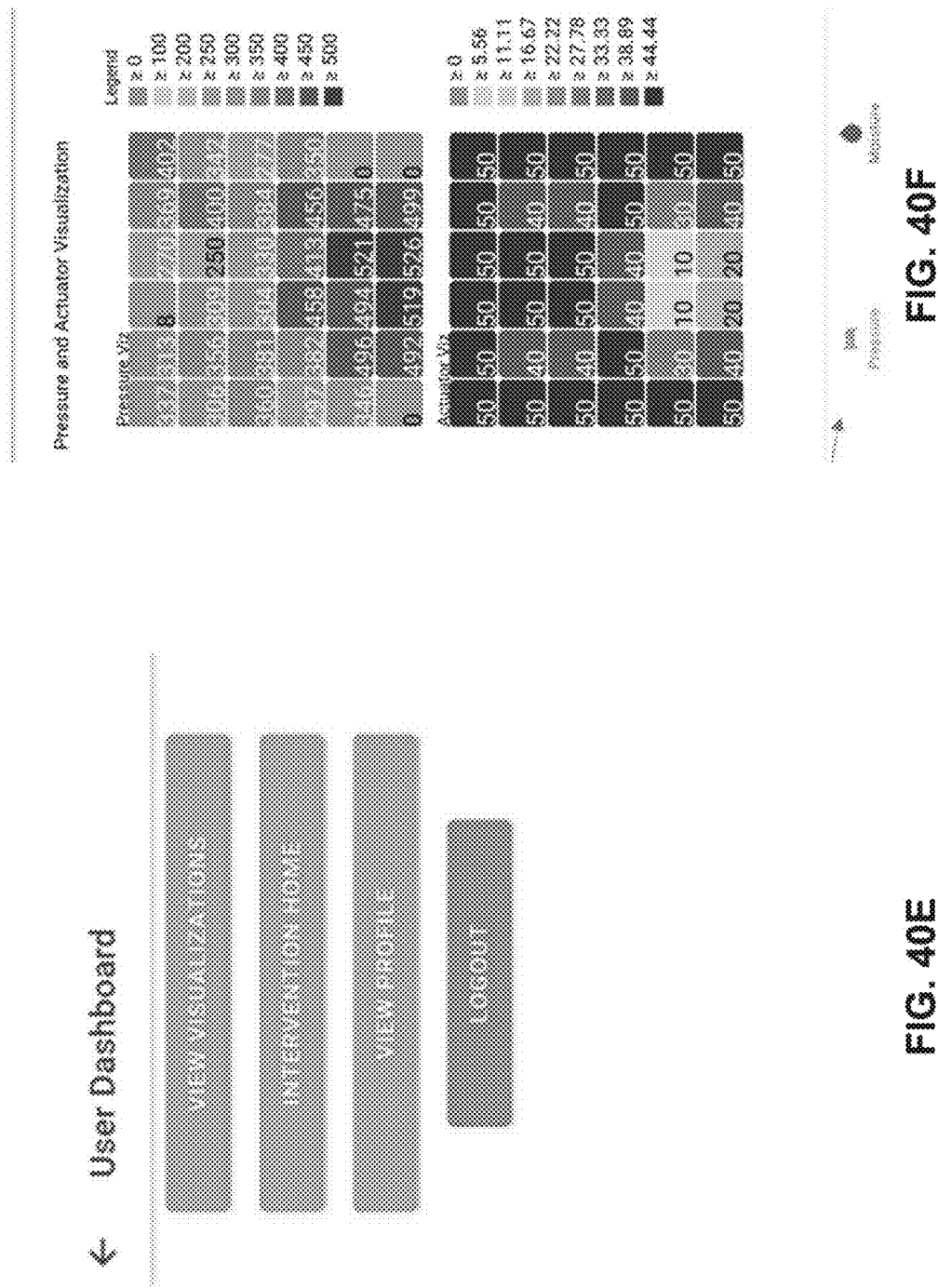

FIG. 40E shows an example of a dashboard page of an embodiment of a MANS app according to the present disclosure.

FIG. 40F shows an example of a pressure visualization page of an embodiment of a MANS app according to the present disclosure using an embodiment of a pressure intervention system according to the present disclosure. Pressure Visualization Page: Top shows the Pressure Heatmap; the bottom shows the position of the actuator assemblies. There are two Tabs at the bottom of the Visualization Page. The first tab is for Pressure; the Moisture Page can be accessed by clicking on Moisture (see FIG. 40F arrow bottom left).

Figures 40G, 40H:
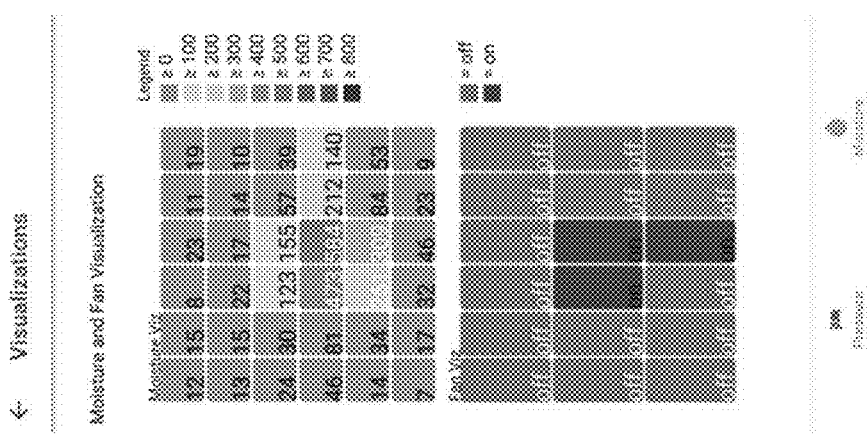

FIG. 40G shows an example of a moisture visualization page of an embodiment of a MANS app according to the present disclosure using an embodiment of a pressure intervention system according to the present disclosure. In this embodiment, the top of the page shows the moisture; the bottom shows the status of the fans (one fan for two actuator assemblies).

FIG. 40H shows examples of interventions pages of an embodiment of a MANS app according to the present disclosure using an embodiment of a pressure intervention system according to the present disclosure. Manual mode vs. auto mode is shown.

Figures 40I, 40J:
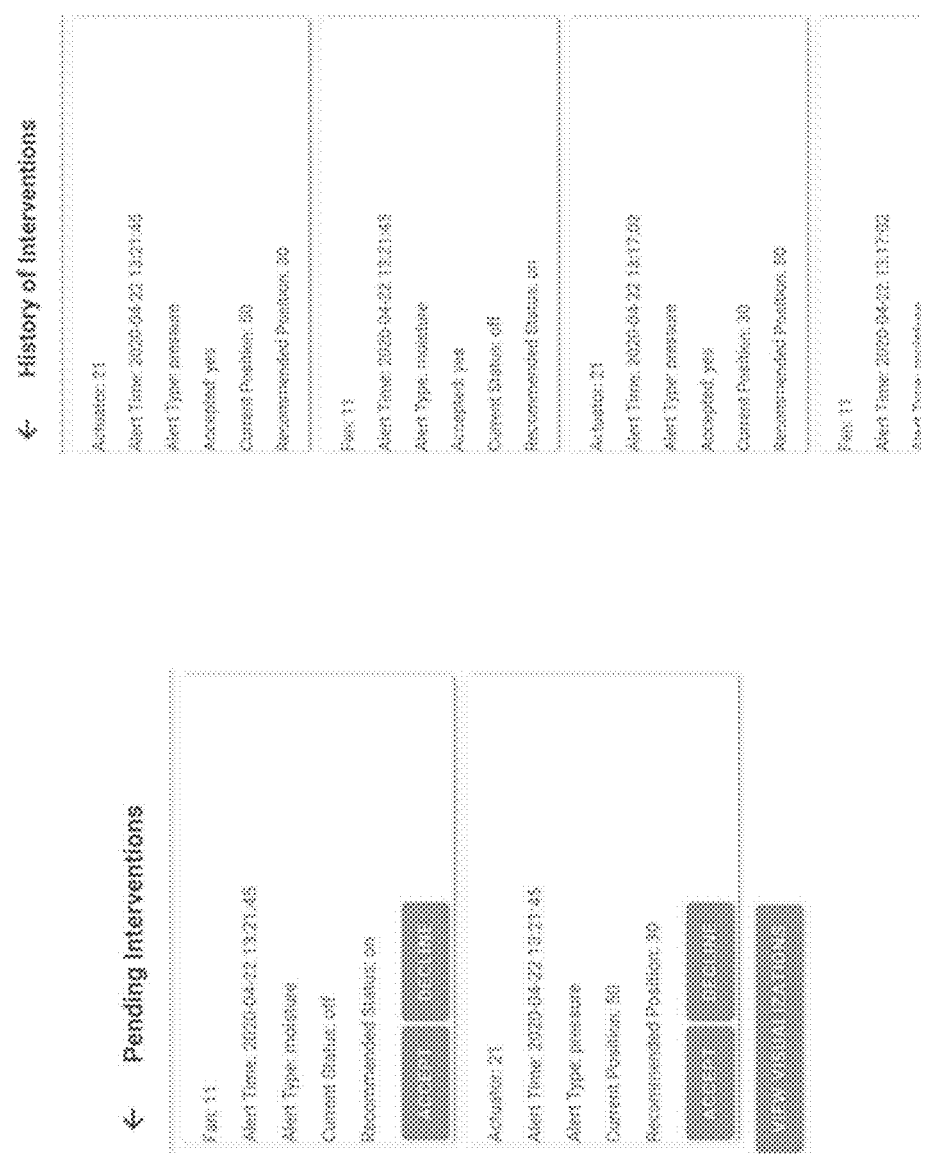

FIG. 40I shows an example of a pending intervention page of an embodiment of a MANS app according to the present disclosure using an embodiment of a pressure intervention system according to the present disclosure.

FIG. 40J shows examples of a history of intervention page of an embodiment of a MANS app according to the present disclosure using an embodiment of a pressure intervention system according to the present disclosure. As can be understood, various aspects of pressure interventions of/by the system can be visualized and history recalled.

Figure 40L:
Figure 40K:

FIG. 40K shows an example of a profile view page of an embodiment of a MANS app according to the present disclosure using an embodiment of a pressure intervention system according to the present disclosure.

FIG. 40L shows an example of a profile edit page of an embodiment of a MANS app according to the present disclosure using an embodiment of a pressure intervention system according to the present disclosure.

Example 6

Described herein are pressure injury [prevention] systems. In embodiments, a pressure injury system comprises a fabric-based sensing component; and a computing device comprising: a processor; and an application comprising program instructions stored in memory and executable by the processor that, when executed, cause the computing device to: determine that an individual is at risk for developing a pressure injury at an interface location between the individual and a surface with which the individual is in contact through the fabric-based sensing component; and in response to determining that the individual is at risk for developing a pressure injury at the interface location, alert a manual intervention or trigger an automated intervention between the individual and the surface.

In embodiments, the program instructions further cause the computing device to obtain, from the fabric-based sensing component, at least one measurement corresponding to at least one of: a pressure or a moisture value associated with at least one contact point between the individual and the surface through the fabric-based sensing component at the interface location.

In embodiments, the program instructions further cause the computing device to process the at least one measurement of the pressure or the moisture value; and wherein determining that the individual is at risk for developing the pressure injury comprises determining that the at least one measurement exceeds a designated threshold value.

In embodiments, systems further comprise a data store; the program instructions further causing the computing device to store the at least one measurement in the data store; and wherein the system further comprises: an analytics system configured to apply machine learning techniques to the at least one measurement to create a knowledge base for anticipating and avoiding formation of pressure injuries.

In embodiments, the system further comprises the program instructions further causing the computing device to obtain a reading of an environmental condition.

In embodiments, the fabric-based sensing component comprises a plurality of sensors comprising at least a pressure sensor or a moisture sensor.

In embodiments, the surface is a surface of a chair, crib, bed, body brace, body cast, wheelchair, or equipment for supporting a body or a body part of the individual, and the fabric-based sensing component is between the individual and the surface.

Embodiments of methods for alleviating pressure injuries (for example pressure injuries) are described herein. In embodiments, methods comprise obtaining, from a fabric-based sensing component, a plurality of measurements corresponding to at least one of: a pressure or a moisture value associated with at least one contact point of an individual at an interface location between the individual and a surface with which the individual is in contact through the fabric-based sensing component; determining that the individual is at risk for developing a pressure injury at the interface location based at least in part on the plurality of measurements; and in response to determining that the individual is at risk for developing the pressure injury, alerting a manual intervention or triggering an automated intervention between the individual and the surface.

In embodiments of methods according to the present disclosure, a fabric-based sensing component comprises a plurality of sensors comprising at least a pressure sensor or a moisture sensor.

In embodiment of methods according to the present disclosure, a surface is a surface of a chair, crib, bed, body brace, wheelchair, or equipment for supporting a body or a body part of the individual, and the fabric-based sensing component is placed between the individual and the surface.

In embodiments of methods of the present disclosure, methods further comprise: processing the plurality of measurements; and wherein determining that the individual is at risk for developing a pressure injury comprises determining that at least one of the plurality of measurements exceeds a designated threshold value.

In embodiments of methods according to the present disclosure, determining that the individual is at risk for developing a pressure injury comprises determining that a composite assessment of the pressure and the moisture value exceeds a designated threshold value or values.

In embodiments of methods according to the present disclosure, methods further comprise obtaining a reading of an environmental condition.

In embodiments of methods according to the present disclosure, the fabric-based sensing component comprises a pressure sensing component configured to detect a pressure or a moisture sensing component configured to detect the moisture or both at the interface location.

In embodiments of methods according to the present disclosure, methods further comprise: receiving a picture of the interface location; and rendering a user interface to allow a wound specialist to view the picture. A fabric-based sensing component, comprising:

Sensing components are described herein. In an embodiment, a sensing component is a fabric-based sensing component comprising a pressure sensing component; a moisture sensing component; and an insulator between the moisture sensing component and the pressure sensing component.

In embodiments according to the present disclosure, the pressure sensing component is configured to detect a pressure at an interface location between an individual and a surface with which the individual is in contact through the fabric-based sensing component.

In embodiments according to the present disclosure, the moisture sensing component is configured to detect a moisture at an interface location between an individual and a surface with which the individual is in contact through the fabric-based sensing component.

In embodiments of the present disclosure, the pressure sensing component comprises two high conductive fabrics configured to make electrical contact through a low conductive fabric.

In embodiments according to the present disclosure, the moisture sensing component comprises two conductive fabrics configured to make contact through moisture between the two conductive fabrics.

In embodiments according to the present disclosure, the pressure sensing component includes an array of pressure sensors and the moisture sensing component includes an array of moisture sensors configured to obtain pressure and moisture readings at multiple interface locations between the individual and the surface.

In embodiments according to the present disclosure, systems further comprise interconnections to route signals from the pressure sensing component and the moisture sensing component to a computing device.

In embodiments according to the present disclosure, the alert for a manual intervention requires a caregiver for the individual to acknowledge the alert by entering a response into the system.

In embodiments according to the present disclosure, the alert for a manual intervention comprises requiring a caregiver for the individual to acknowledge the alert by entering a response into a system.

In embodiments according to the present disclosure, the at least one measurement is transmitted to a data store for storing electronic medical records.

In embodiments according to the present disclosure, wherein the plurality of measurements are transmitted to a data store for storing electronic medical records.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

We claim:

1. An actuation system, comprising:
    two or more actuator assemblies, wherein each of the two or more actuator assemblies comprises:
        an actuator; wherein each actuator of the two or more actuator assemblies is configured for independent actuation;
        an actuator head, wherein the actuator head further has a plurality of channels extending across an outer surface of the actuator head and orthogonal to a longitudinal axis of the actuator body, wherein each of the plurality of channels fluidically connects two or more apertures; and
        a piston tubing operably connected to the actuator or actuator head
    wherein the piston tubing encircles a body of the actuator and operably connects to the actuator head and the actuator has an axis of extension along the piston tubing, and
    wherein a space exists between the actuator body and the piston tubing, and
    wherein the actuator head is fixed in position in relation to the actuator body or is pivotally connected to the actuator body.

2. The actuation system of claim 1, wherein each actuator of the two or more actuator assemblies is independently configured as pneumatic actuators, hydraulic actuators, mechanical actuators or a combination thereof.

3. The actuation system of claim 1, wherein the actuator head has a plurality of apertures in an outermost surface of the actuator head opposite the actuator body, and the plurality of apertures are configured to pass air moving along the axis of extension.

4. The actuation system of claim 1, wherein the plurality of channels have a cross-section that is concave inwardly from the outer surface of the actuator head along a longitudinal axis of the channels.

5. The actuation system of claim 1, further comprising an actuator assembly housing, wherein the actuator assembly housing is configured to contain the two or more actuator assemblies and has one or more apertures configured to secure the piston tubing of the two or more aperture assemblies, and wherein the actuators are configured to, at least in part, extend along an axis outwardly from the housing and retract inwardly into the housing.

6. The actuation system of claim 5, wherein each of the actuators has a length and the actuator is configured, at least in part, to extend outwardly from and retract inwardly into the housing longitudinally along its length.

7. The actuation system of claim 1, further comprising one or more moisture control devices.

8. The actuation system of claim 7, wherein the one or more moisture control devices comprises one or more heating coils, a thermoelectric element, or a fan secured to a side of the actuator assembly housing opposite the actuator heads.

9. The actuation system of claim 7, wherein the moisture control device is a fan configured to move air through each of the spaces between each of the actuators and the piston tubings of the two or more actuator assemblies.

10. The actuation system of claim 1, wherein the actuation system comprises an array of actuator assemblies.

11. An intervention system, comprising:
    one or more actuation systems according to claim 1, wherein the one or more actuation systems comprises an array of actuator assemblies and further comprises one or more moisture control devices;
    a computing device in data communication with the one or more actuation systems; and
    logic installed in the computing device, the logic comprising one or more sets of instructions that, when executed on the computing device, receives pressure data, moisture data, or both, and when executed on the computing device, transmits the instructions based on the received pressure data, moisture data, or both, to the one or more actuation systems, the instructions including instructions to extend or retract, at least in part, one or more of the actuators, operate one or more of the moisture control devices, or both.

12. The intervention system of claim 11, further comprising a sensor network configured to obtain the pressure data, or the moisture data, or both, and provide the pressure data, the moisture data, or both, to the computing device.

13. The intervention system of claim 12, wherein the computing device is configured to receive computing instructions from a user, the sensor network, or both.

14. The intervention system of claim 11, further comprising an intervention surface in contact with each of the actuator heads, wherein the intervention surface is configured as a seat or a mattress of a bed, crib, or bassinet, or a wheelchair, office chair, or a seat in a personal or commercial passenger transportation vehicle.

15. A method of preventing pressure injury or a pressure ulcer in a subject, comprising:
providing an intervention system according to claim 11 in contact with the subject; and
executing the instructions of the intervention system;
wherein the instructions of the intervention system comprise instructions to actuate one or more of the actuators of the two or more actuator assemblies towards or away from the subject, or instructions to operate the one or more moisture control devices, or both.

16. The method of claim 15, wherein the intervention system further comprises a sensor network configured to obtain the pressure data, or the moisture data, or both, and provide the pressure data, the moisture data, or both, to the computing device, and the method further comprises receiving pressure data from the sensor network, moisture data from the sensor network, or both.

17. The method of claim 16, further comprising comparing the received pressure data, moisture data, or both, to a set of pre-determined threshold values and providing the instructions based on the comparison.

18. The method of claim 17, further comprising generating an alert if the compared pressure data, or moisture data, or both, exceed the pre-determined threshold.

19. The method of claim 15, wherein the instructions are generated by a user, or the instructions are generated by the subject in need thereof.

20. The method of claim 15, wherein the instructions are determined based on a pre-determined profile according to a load on the intervention system caused by the subject being in contact therewith.

21. The method of claim 15, further comprising adjusting the instructions after execution by a user or by a subject.

22. The method of any of claim 15, wherein the subject is an infant, an airline passenger, a commercial truck driver, a subject working at a desk, or an individual who has sustained an injury, or wherein the subject is an individual who has sustained a spinal cord injury.

* * * * *